United States Patent
Usui et al.

(10) Patent No.: US 7,301,676 B2
(45) Date of Patent: Nov. 27, 2007

(54) PRINTING METHOD AND APPARATUS, AND BINARY-FORM DITHER MATRIX PATTERN

(75) Inventors: Nobuaki Usui, Kawasaki (JP); Akiko Nagae, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1003 days.

(21) Appl. No.: 10/177,533

(22) Filed: Jun. 24, 2002

(65) Prior Publication Data

US 2002/0196471 A1    Dec. 26, 2002

(30) Foreign Application Priority Data

Jun. 26, 2001 (JP) .............................. 2001-193657
May 28, 2002 (JP) .............................. 2002-154575

(51) Int. Cl.
H04N 1/405 (2006.01)
H04N 1/409 (2006.01)
H04N 1/52 (2006.01)
H04N 1/58 (2006.01)

(52) U.S. Cl. .................. 358/3.13; 358/3.17; 358/3.26; 358/3.23; 358/533; 358/535

(58) Field of Classification Search ................. 358/1.9, 358/3.06, 3.17, 3.13, 534–536, 3.16, 3.23, 358/3.26, 533
See application file for complete search history.

(56) References Cited

U.S. PATENT DOCUMENTS

| | | |
|---|---|---|
| 4,084,183 A | 4/1978 | Keller et al. |
| 4,084,196 A | 4/1978 | Tisue et al. |
| 4,485,397 A | 11/1984 | Scheuter et al. |
| 5,315,407 A | 5/1994 | Sakamoto et al. |
| 5,367,384 A | 11/1994 | Sakamoto |
| 5,371,612 A | 12/1994 | Sakamoto |
| 5,481,366 A | 1/1996 | Sakamoto |
| 5,541,743 A | 7/1996 | Shiomi et al. |
| 6,031,627 A | 2/2000 | Kakutani |

FOREIGN PATENT DOCUMENTS

| | | |
|---|---|---|
| GB | 2 111 342 A | 6/1983 |
| JP | 53-5561 | 2/1978 |
| JP | 53-96616 | 8/1978 |
| JP | 56-19056 | 2/1981 |
| JP | 57099865 A * | 6/1982 |
| JP | 58-189641 | 11/1983 |
| JP | 60-41343 | 9/1985 |
| JP | 62-36427 | 8/1987 |
| JP | 5-176170 | 7/1993 |
| JP | 6-30276 | 2/1994 |
| JP | 6-95393 | 4/1994 |
| JP | 6-130656 | 5/1994 |
| JP | 6-138636 | 5/1994 |
| JP | 6-311357 | 11/1994 |
| JP | 7-333822 | 12/1995 |
| JP | 09-107473 | 4/1997 |
| JP | 09-191403 | 7/1997 |
| JP | 10-157167 | 6/1998 |
| JP | 10-191038 | 7/1998 |
| JP | 2000-059625 | 2/2000 |
| JP | 2000-341521 | 12/2000 |

* cited by examiner

Primary Examiner—Scott A. Rogers
(74) Attorney, Agent, or Firm—Kratz, Quintos & Hanson, LLP

(57) ABSTRACT

A method and apparatus for printing a multivalue image in a binary-form output pattern. The printing apparatus employs a binary-form dither matrix pattern which is composed of a greater number of pixels, so that moiré patterns and other artifacts are minimized in printouts. The method includes: providing the binary-form dither matrix pattern for use in obtaining the binary-form output pattern; expanding the multivalue image in a memory area; and forming a binary image of output dot elements in accordance with the binary-form output pattern. The binary-form dither matrix pattern has a rectangular pattern in which a plurality of pattern elements that are numbered to be successively turned on are arranged in matrix. The turning-on sequence is set in such a way that plural groups of prospective output dot elements, which groups are substantially identical in shape, grow successively from a plurality of local points associated with the respective groups.

34 Claims, 36 Drawing Sheets

| 93 | 77 | 53 | 21 | 16 | 48 | 44 | 12 | 17 | 49 | 73 | 89 |
|---|---|---|---|---|---|---|---|---|---|---|---|
| 85 | 69 | 29 | 8 | 40 | 64 | 60 | 36 | 4 | 25 | 65 | 81 |
| 61 | 37 | 5 | 32 | 72 | 88 | 84 | 68 | 28 | 1 | 33 | 57 |
| 45 | 13 | 24 | 56 | 80 | 96 | 92 | 76 | 52 | 20 | 9 | 41 |
| 43 | 11 | 18 | 50 | 74 | 90 | 94 | 78 | 54 | 22 | 15 | 47 |
| 59 | 35 | 3 | 26 | 66 | 82 | 86 | 70 | 30 | 7 | 39 | 63 |
| 83 | 67 | 27 | 2 | 34 | 58 | 62 | 38 | 6 | 31 | 71 | 87 |
| 91 | 75 | 51 | 19 | 10 | 42 | 46 | 14 | 23 | 55 | 79 | 95 |

| 93 | 77 | 53 | 21 | 16 | 48 | 44 | 12 | 17 | 49 | 73 | 89 |
|---|---|---|---|---|---|---|---|---|---|---|---|
| 85 | 69 | 29 | 8 | 40 | 64 | 60 | 36 | 4 | 25 | 65 | 81 |
| 61 | 37 | 5 | 32 | 72 | 88 | 84 | 68 | 28 | 1 | 33 | 57 |
| 45 | 13 | 24 | 56 | 80 | 96 | 92 | 76 | 52 | 20 | 9 | 41 |
| 43 | 11 | 18 | 50 | 74 | 90 | 94 | 78 | 54 | 22 | 15 | 47 |
| 59 | 35 | 3 | 26 | 66 | 82 | 86 | 70 | 30 | 7 | 39 | 63 |
| 83 | 67 | 27 | 2 | 34 | 58 | 62 | 38 | 6 | 31 | 71 | 87 |
| 91 | 75 | 51 | 19 | 10 | 42 | 46 | 14 | 23 | 55 | 79 | 95 |

FIG. 3

| PIXEL VALUE BEFORE CONVERSION | PIXEL VALUE AFTER CONVERSION |
|---|---|
| 0 | 0 |
| 1 | 0 |
| 2 | 0 |
| 3 | 0 |
| 4 | 1 |
| 5 | 1 |
| 6 | 1 |
| 7 | 2 |
| 8 | 2 |
| 9 | 3 |
| 10 | 3 |
| 11 | 4 |
| 12 | 4 |
| 13 | 5 |
| 14 | 5 |
| 15 | 6 |
| 16 | 7 |
| 17 | 7 |
| 18 | 8 |
| 19 | 8 |
| 20 | 9 |
| 21 | 10 |
| 22 | 10 |
| 23 | 11 |
| 24 | 12 |
| 25 | 12 |
| 26 | 13 |
| 27 | 14 |
| 28 | 15 |
| 29 | 15 |
| 30 | 16 |
| 31 | 17 |
| 32 | 18 |
| 33 | 19 |
| 34 | 19 |
| 35 | 20 |
| 36 | 21 |
| 37 | 22 |
| 38 | 23 |
| 39 | 24 |
| 40 | 25 |
| 41 | 26 |
| 42 | 27 |
| 43 | 28 |
| 44 | 29 |
| 45 | 30 |
| 46 | 31 |
| 47 | 32 |
| 48 | 33 |
| 49 | 34 |
| 50 | 35 |
| 51 | 36 |
| 52 | 37 |
| 53 | 37 |
| 54 | 38 |
| 55 | 39 |
| 56 | 41 |
| 57 | 42 |
| 58 | 43 |
| 59 | 44 |
| 60 | 45 |
| 61 | 46 |
| 62 | 47 |
| 63 | 48 |
| 64 | 49 |
| 65 | 50 |
| 66 | 51 |
| 67 | 52 |
| 68 | 53 |
| 69 | 54 |
| 70 | 55 |
| 71 | 57 |
| 72 | 58 |
| 73 | 59 |
| 74 | 60 |
| 75 | 61 |
| 76 | 62 |
| 77 | 63 |
| 78 | 65 |
| 79 | 66 |
| 80 | 67 |
| 81 | 68 |
| 82 | 69 |
| 83 | 71 |
| 84 | 73 |
| 85 | 74 |
| 86 | 75 |
| 87 | 77 |
| 88 | 78 |
| 89 | 79 |
| 90 | 80 |
| 91 | 82 |
| 92 | 83 |
| 93 | 84 |
| 94 | 86 |
| 95 | 87 |
| 96 | 88 |
| 97 | 89 |
| 98 | 91 |
| 99 | 92 |
| 100 | 93 |
| 101 | 95 |
| 102 | 96 |
| 103 | 97 |
| 104 | 99 |
| 105 | 100 |
| 106 | 101 |
| 107 | 103 |
| 108 | 104 |
| 109 | 105 |
| 110 | 107 |
| 111 | 108 |
| 112 | 109 |
| 113 | 111 |
| 114 | 112 |
| 115 | 114 |
| 116 | 115 |
| 117 | 116 |
| 118 | 119 |
| 119 | 121 |
| 120 | 122 |
| 121 | 123 |
| 122 | 125 |
| 123 | 126 |
| 124 | 128 |
| 125 | 129 |
| 126 | 131 |
| 127 | 132 |
| 128 | 133 |
| 129 | 136 |
| 130 | 139 |
| 131 | 140 |
| 132 | 142 |
| 133 | 142 |
| 134 | 143 |
| 135 | 145 |
| 136 | 146 |
| 137 | 147 |
| 138 | 149 |
| 139 | 150 |
| 140 | 151 |
| 141 | 153 |
| 142 | 143 |
| 143 | 145 |
| 144 | 146 |
| 145 | 147 |
| 146 | 149 |
| 147 | 150 |
| 148 | 151 |
| 149 | 153 |
| 150 | 154 |
| 151 | 155 |
| 152 | 157 |
| 153 | 158 |
| 154 | 159 |
| 155 | 161 |
| 156 | 162 |
| 157 | 163 |
| 158 | 165 |
| 159 | 166 |
| 160 | 167 |
| 161 | 168 |
| 162 | 170 |
| 163 | 171 |
| 164 | 172 |
| 165 | 174 |
| 166 | 175 |
| 167 | 176 |
| 168 | 177 |
| 169 | 179 |
| 170 | 180 |
| 171 | 181 |
| 172 | 182 |
| 173 | 183 |
| 174 | 185 |
| 175 | 186 |
| 176 | 187 |
| 177 | 188 |
| 178 | 189 |
| 179 | 191 |
| 180 | 192 |
| 181 | 193 |
| 182 | 194 |
| 183 | 195 |
| 184 | 196 |
| 185 | 197 |
| 186 | 199 |
| 187 | 200 |
| 188 | 201 |
| 189 | 202 |
| 190 | 203 |
| 191 | 204 |
| 192 | 205 |
| 193 | 206 |
| 194 | 207 |
| 195 | 208 |
| 196 | 209 |
| 197 | 210 |
| 198 | 211 |
| 199 | 212 |
| 200 | 213 |
| 201 | 215 |
| 202 | 216 |
| 203 | 217 |
| 204 | 218 |
| 205 | 219 |
| 206 | 220 |
| 207 | 221 |
| 208 | 222 |
| 209 | 223 |
| 210 | 224 |
| 211 | 225 |
| 212 | 226 |
| 213 | 227 |
| 214 | 228 |
| 215 | 229 |
| 216 | 230 |
| 217 | 231 |
| 218 | 232 |
| 219 | 233 |
| 220 | 234 |
| 221 | 235 |
| 222 | 235 |
| 223 | 236 |
| 224 | 237 |
| 225 | 238 |
| 226 | 239 |
| 227 | 239 |
| 228 | 240 |
| 229 | 241 |
| 230 | 242 |
| 231 | 242 |
| 232 | 243 |
| 233 | 244 |
| 234 | 245 |
| 235 | 246 |
| 236 | 246 |
| 237 | 247 |
| 238 | 247 |
| 239 | 248 |
| 240 | 249 |
| 241 | 249 |
| 242 | 250 |
| 243 | 250 |
| 244 | 251 |
| 245 | 251 |
| 246 | 252 |
| 247 | 252 |
| 248 | 253 |
| 249 | 253 |
| 250 | 253 |
| 251 | 254 |
| 252 | 254 |
| 253 | 254 |
| 254 | 254 |
| 255 | 255 |

FIG. 5

| 14 | 50 | 82 | 90 | 94 | 74 | 42 | 2 | — 12cc |
|----|----|----|----|----|----|----|----|---|
| 30 | 54 | 66 | 78 | 86 | 70 | 22 | 6 | |
| 11 | 34 | 26 | 46 | 58 | 62 | 38 | 19 | |
| 47 | 27 | 35 | 10 | 18 | 39 | 63 | 59 | |
| 79 | 67 | 55 | 31 | 7 | 23 | 71 | 87 | |
| 91 | 83 | 51 | 15 | 3 | 43 | 75 | 95 | |
| 93 | 73 | 41 | 1 | 13 | 49 | 81 | 89 | |
| 85 | 69 | 21 | 5 | 29 | 53 | 65 | 77 | |
| 57 | 61 | 37 | 20 | 12 | 33 | 25 | 45 | |
| 17 | 40 | 64 | 60 | 48 | 28 | 36 | 9 | |
| 8 | 24 | 72 | 88 | 80 | 68 | 56 | 32 | — 12cc |
| 4 | 44 | 76 | 96 | 92 | 84 | 52 | 16 | |

| 14 | 38 | 74 | 90 | 94 | 82 | 42 | 2  |
|----|----|----|----|----|----|----|----|
| 18 | 34 | 62 | 78 | 86 | 70 | 46 | 10 |
| 7  | 22 | 26 | 50 | 58 | 66 | 54 | 31 |
| 51 | 27 | 23 | 6  | 30 | 55 | 67 | 59 |
| 79 | 63 | 35 | 19 | 11 | 47 | 71 | 87 |
| 91 | 75 | 39 | 15 | 3  | 43 | 83 | 95 |
| 93 | 81 | 41 | 1  | 13 | 37 | 73 | 89 |
| 85 | 69 | 45 | 9  | 17 | 33 | 61 | 77 |
| 57 | 65 | 53 | 32 | 8  | 21 | 25 | 49 |
| 29 | 56 | 68 | 60 | 52 | 28 | 24 | 5  |
| 12 | 48 | 72 | 88 | 80 | 64 | 36 | 20 |
| 4  | 44 | 84 | 96 | 92 | 76 | 40 | 16 |

| 260 | 68 | 98 | 290 | 434 | 530 | 554 | 458 | 314 | 122 | 92 | 284 | 261 | 69 | 99 | 291 | 435 | 531 | 555 | 459 | 315 | 123 | 93 | 285 |
|---|---|---|---|---|---|---|---|---|---|---|---|---|---|---|---|---|---|---|---|---|---|---|---|
| 356 | 212 | 20 | 146 | 386 | 482 | 506 | 410 | 170 | 44 | 236 | 380 | 357 | 213 | 21 | 147 | 387 | 483 | 507 | 411 | 171 | 45 | 237 | 381 |
| 500 | 404 | 164 | 2 | 194 | 338 | 362 | 218 | 26 | 188 | 428 | 524 | 501 | 405 | 165 | 3 | 195 | 339 | 363 | 219 | 27 | 189 | 429 | 525 |
| 548 | 452 | 308 | 116 | 50 | 242 | 266 | 74 | 140 | 332 | 476 | 572 | 549 | 453 | 309 | 117 | 51 | 243 | 267 | 75 | 141 | 333 | 477 | 573 |
| 560 | 464 | 320 | 128 | 86 | 278 | 254 | 62 | 104 | 296 | 440 | 536 | 561 | 465 | 321 | 129 | 87 | 279 | 255 | 63 | 105 | 297 | 441 | 537 |
| 512 | 416 | 176 | | 38 | 230 | 374 | 350 | 206 | 14 | 152 | 392 | 488 | 513 | 417 | 177 | 39 | 231 | 375 | 351 | 207 | 15 | 153 | 393 | 489 |
| 368 | 224 | 32 | 182 | 422 | 518 | 494 | 398 | 158 | 8 | 200 | 344 | 369 | 225 | 33 | 183 | 423 | 519 | 495 | 399 | 159 | 9 | 201 | 345 |
| 272 | 80 | 134 | 326 | 470 | 566 | 542 | 446 | 302 | 110 | 56 | 248 | 273 | 81 | 135 | 327 | 471 | 567 | 543 | 447 | 303 | 111 | 57 | 249 |
| 264 | 72 | 102 | 294 | 438 | 534 | 558 | 462 | 318 | 126 | 96 | 288 | 265 | 73 | 101 | 293 | 437 | 533 | 557 | 461 | 317 | 125 | 95 | 287 |
| 360 | 216 | 24 | 150 | 390 | 486 | 510 | 414 | 174 | 48 | 240 | 384 | 359 | 215 | 23 | 149 | 389 | 485 | 509 | 413 | 173 | 47 | 239 | 383 |
| 504 | 408 | 168 | 6 | 198 | 342 | 366 | 222 | 30 | 192 | 432 | 528 | 503 | 407 | 167 | 5 | 197 | 341 | 365 | 221 | 29 | 191 | 431 | 527 |
| 552 | 456 | 312 | 120 | 54 | 246 | 270 | 78 | 144 | 336 | 480 | 576 | 551 | 455 | 311 | 119 | 53 | 245 | 269 | 77 | 143 | 335 | 479 | 575 |
| 564 | 468 | 324 | 132 | 90 | 282 | 258 | 66 | 108 | 300 | 444 | 540 | 563 | 467 | 323 | 131 | 89 | 281 | 257 | 65 | 107 | 299 | 443 | 539 |
| 516 | 420 | 180 | | 42 | 234 | 378 | 354 | 210 | 18 | 156 | 396 | 492 | 515 | 419 | 179 | 41 | 233 | 377 | 353 | 209 | 17 | 155 | 395 | 491 |
| 372 | 228 | 36 | 186 | 426 | 522 | 498 | 402 | 162 | 12 | 204 | 348 | 371 | 227 | 35 | 185 | 425 | 521 | 497 | 401 | 161 | 11 | 203 | 347 |
| 276 | 84 | 138 | 330 | 474 | 570 | 546 | 450 | 306 | 114 | 60 | 252 | 275 | 83 | 137 | 329 | 473 | 569 | 545 | 449 | 305 | 113 | 59 | 251 |
| 262 | 70 | 100 | 292 | 436 | 532 | 556 | 460 | 316 | 124 | 94 | 286 | 259 | 67 | 97 | 289 | 433 | 529 | 553 | 457 | 313 | 121 | 91 | 283 |
| 358 | 214 | 22 | 148 | 388 | 484 | 508 | 412 | 172 | 46 | 238 | 382 | 355 | 211 | 19 | 145 | 385 | 481 | 505 | 409 | 169 | 43 | 235 | 379 |
| 502 | 406 | 166 | 4 | 196 | 340 | 364 | 220 | 28 | 190 | 430 | 526 | 499 | 403 | 163 | 1 | 193 | 337 | 361 | 217 | 25 | 187 | 427 | 523 |
| 550 | 454 | 310 | 118 | 52 | 244 | 268 | 76 | 142 | 334 | 478 | 574 | 547 | 451 | 307 | 115 | 49 | 241 | 265 | 73 | 139 | 331 | 475 | 571 |
| 562 | 466 | 322 | 130 | 88 | 280 | 256 | 64 | 106 | 298 | 442 | 538 | 559 | 463 | 319 | 127 | 85 | 277 | 253 | 61 | 103 | 295 | 439 | 535 |
| 514 | 418 | 178 | | 40 | 232 | 376 | 352 | 208 | 16 | 154 | 394 | 490 | 511 | 415 | 175 | 37 | 229 | 373 | 349 | 205 | 13 | 151 | 391 | 487 |
| 370 | 226 | 34 | 184 | 424 | 520 | 496 | 400 | 160 | 10 | 202 | 346 | 367 | 223 | 31 | 181 | 421 | 517 | 493 | 397 | 157 | 7 | 199 | 343 |
| 274 | 82 | 136 | 328 | 472 | 568 | 544 | 448 | 304 | 112 | 58 | 250 | 271 | 79 | 133 | 325 | 469 | 565 | 541 | 445 | 301 | 109 | 55 | 247 |

| 82 | 298 | 490 | 538 | 562 | 442 | 250 | 10 | 84 | 300 | 492 | 540 | 564 | 444 | 252 | 12 | 80 | 296 | 488 | 536 | 560 | 440 | 248 | 8 |
|---|---|---|---|---|---|---|---|---|---|---|---|---|---|---|---|---|---|---|---|---|---|---|---|
| 178 | 322 | 394 | 466 | 514 | 418 | 130 | 34 | 180 | 324 | 396 | 468 | 516 | 420 | 132 | 36 | 176 | 320 | 392 | 464 | 512 | 416 | 128 | 32 |
| 64 | 202 | 154 | 274 | 346 | 370 | 226 | 112 | 66 | 204 | 156 | 276 | 348 | 372 | 228 | 114 | 62 | 200 | 152 | 272 | 344 | 368 | 224 | 110 |
| 280 | 160 | 208 | 58 | 106 | 232 | 376 | 352 | 282 | 162 | 210 | 60 | 108 | 234 | 378 | 354 | 278 | 158 | 206 | 56 | 104 | 230 | 374 | 350 |
| 472 | 400 | 328 | 184 | 40 | 136 | 424 | 520 | 474 | 402 | 330 | 186 | 42 | 138 | 426 | 522 | 470 | 398 | 326 | 182 | 38 | 134 | 422 | 518 |
| 544 | 496 | 304 | 88 | 16 | 256 | 448 | 568 | 546 | 498 | 306 | 90 | 18 | 258 | 450 | 570 | 542 | 494 | 302 | 86 | 14 | 254 | 446 | 566 |
| 556 | 436 | 244 | 4 | 76 | 292 | 484 | 532 | 558 | 438 | 246 | 6 | 78 | 294 | 486 | 534 | 554 | 434 | 242 | 2 | 74 | 290 | 482 | 530 |
| 508 | 412 | 124 | 28 | 172 | 316 | 388 | 460 | 510 | 414 | 126 | 30 | 174 | 318 | 390 | 462 | 506 | 410 | 122 | 26 | 170 | 314 | 386 | 458 |
| 340 | 364 | 220 | 118 | 70 | 196 | 148 | 268 | 342 | 366 | 222 | 120 | 72 | 198 | 150 | 270 | 338 | 362 | 218 | 116 | 68 | 194 | 146 | 266 |
| 100 | 238 | 382 | 358 | 286 | 166 | 214 | 52 | 102 | 240 | 384 | 360 | 288 | 168 | 216 | 54 | 98 | 236 | 380 | 356 | 284 | 164 | 212 | 50 |
| 46 | 142 | 430 | 526 | 478 | 406 | 334 | 190 | 48 | 144 | 432 | 528 | 480 | 408 | 336 | 192 | 44 | 140 | 428 | 524 | 476 | 404 | 332 | 188 |
| 22 | 262 | 454 | 574 | 550 | 502 | 310 | 94 | 24 | 264 | 456 | 576 | 552 | 504 | 312 | 96 | 20 | 260 | 452 | 572 | 548 | 500 | 308 | 92 |
| 79 | 295 | 487 | 535 | 559 | 439 | 247 | 7 | 83 | 299 | 491 | 539 | 563 | 443 | 251 | 11 | 81 | 297 | 489 | 537 | 561 | 441 | 249 | 9 |
| 175 | 319 | 391 | 463 | 511 | 415 | 127 | 31 | 179 | 323 | 395 | 467 | 515 | 419 | 131 | 35 | 177 | 321 | 393 | 465 | 513 | 417 | 129 | 33 |
| 61 | 199 | 151 | 271 | 343 | 367 | 223 | 109 | 65 | 203 | 155 | 275 | 347 | 371 | 227 | 113 | 63 | 201 | 153 | 273 | 345 | 369 | 225 | 111 |
| 277 | 157 | 205 | 55 | 103 | 229 | 373 | 349 | 281 | 161 | 209 | 59 | 107 | 233 | 377 | 353 | 279 | 159 | 207 | 57 | 105 | 231 | 375 | 351 |
| 469 | 397 | 325 | 181 | 37 | 133 | 421 | 517 | 473 | 401 | 329 | 185 | 41 | 137 | 425 | 521 | 471 | 399 | 327 | 183 | 39 | 135 | 423 | 519 |
| 541 | 493 | 301 | 85 | 13 | 253 | 445 | 565 | 545 | 497 | 305 | 89 | 17 | 257 | 449 | 569 | 543 | 495 | 303 | 87 | 15 | 255 | 447 | 567 |
| 553 | 433 | 241 | 1 | 73 | 289 | 481 | 529 | 557 | 437 | 245 | 5 | 77 | 293 | 485 | 533 | 555 | 435 | 243 | 3 | 75 | 291 | 483 | 531 |
| 505 | 409 | 121 | 25 | 169 | 313 | 385 | 457 | 509 | 413 | 125 | 29 | 173 | 317 | 389 | 461 | 507 | 411 | 123 | 27 | 171 | 315 | 387 | 459 |
| 337 | 361 | 217 | 115 | 67 | 193 | 145 | 265 | 341 | 365 | 221 | 119 | 71 | 197 | 149 | 269 | 339 | 363 | 219 | 117 | 69 | 195 | 147 | 267 |
| 97 | 235 | 379 | 355 | 283 | 163 | 211 | 49 | 101 | 239 | 383 | 359 | 287 | 167 | 215 | 53 | 99 | 237 | 381 | 357 | 285 | 165 | 213 | 51 |
| 43 | 139 | 427 | 523 | 475 | 403 | 331 | 187 | 47 | 143 | 431 | 527 | 479 | 407 | 335 | 191 | 45 | 141 | 429 | 525 | 477 | 405 | 333 | 189 |
| 19 | 259 | 451 | 571 | 547 | 499 | 307 | 91 | 23 | 263 | 455 | 575 | 551 | 503 | 311 | 95 | 21 | 261 | 453 | 573 | 549 | 501 | 309 | 93 |

| 94 | 334 | 502 | 550 | 538 | 484 | 282 | 34 | 96 | 336 | 504 | 552 | 540 | 456 | 284 | 36 | 92 | 332 | 500 | 548 | 536 | 482 | 280 | 32 |
|---|---|---|---|---|---|---|---|---|---|---|---|---|---|---|---|---|---|---|---|---|---|---|---|
| 202 | 322 | 406 | 442 | 490 | 394 | 142 | 22 | 204 | 324 | 408 | 444 | 492 | 396 | 144 | 24 | 200 | 320 | 404 | 440 | 488 | 392 | 140 | 20 |
| 64 | 190 | 130 | 250 | 310 | 298 | 178 | 112 | 66 | 192 | 132 | 252 | 312 | 300 | 180 | 114 | 62 | 188 | 128 | 248 | 308 | 296 | 176 | 110 |
| 280 | 160 | 220 | 10 | 82 | 232 | 376 | 364 | 282 | 162 | 222 | 12 | 84 | 234 | 378 | 366 | 278 | 158 | 218 | 8 | 80 | 230 | 374 | 362 |
| 472 | 412 | 352 | 208 | 52 | 148 | 424 | 520 | 474 | 414 | 354 | 210 | 54 | 150 | 426 | 522 | 470 | 410 | 350 | 206 | 50 | 146 | 422 | 518 |
| 556 | 508 | 340 | 100 | 40 | 268 | 460 | 568 | 558 | 510 | 342 | 102 | 42 | 270 | 462 | 570 | 554 | 506 | 338 | 98 | 38 | 266 | 458 | 566 |
| 532 | 448 | 256 | 28 | 88 | 328 | 496 | 544 | 534 | 450 | 258 | 30 | 90 | 330 | 498 | 546 | 530 | 446 | 254 | 26 | 86 | 326 | 494 | 542 |
| 484 | 388 | 136 | 16 | 196 | 316 | 400 | 436 | 486 | 390 | 138 | 18 | 198 | 318 | 402 | 438 | 482 | 386 | 134 | 14 | 194 | 314 | 398 | 434 |
| 304 | 292 | 172 | 118 | 70 | 184 | 124 | 244 | 306 | 294 | 174 | 120 | 72 | 186 | 126 | 246 | 302 | 290 | 170 | 116 | 68 | 182 | 122 | 242 |
| 76 | 238 | 382 | 370 | 286 | 166 | 226 | 4 | 78 | 240 | 384 | 372 | 288 | 168 | 228 | 6 | 74 | 236 | 380 | 368 | 284 | 164 | 224 | 2 |
| 58 | 154 | 430 | 526 | 478 | 418 | 358 | 214 | 60 | 156 | 432 | 528 | 480 | 420 | 360 | 216 | 56 | 152 | 428 | 524 | 476 | 416 | 356 | 212 |
| 46 | 274 | 466 | 574 | 562 | 514 | 346 | 106 | 48 | 276 | 468 | 576 | 564 | 516 | 348 | 108 | 44 | 272 | 464 | 572 | 560 | 512 | 344 | 104 |
| 91 | 331 | 499 | 547 | 535 | 451 | 259 | 31 | 95 | 335 | 503 | 551 | 539 | 455 | 263 | 35 | 93 | 333 | 501 | 549 | 537 | 453 | 261 | 33 |
| 199 | 319 | 403 | 439 | 487 | 391 | 139 | 19 | 203 | 323 | 407 | 443 | 491 | 395 | 143 | 23 | 201 | 321 | 405 | 441 | 489 | 393 | 141 | 21 |
| 61 | 187 | 127 | 247 | 307 | 295 | 175 | 109 | 65 | 191 | 131 | 251 | 311 | 299 | 179 | 113 | 63 | 189 | 129 | 249 | 309 | 297 | 177 | 111 |
| 277 | 157 | 217 | 7 | 79 | 229 | 373 | 361 | 281 | 161 | 221 | 11 | 83 | 233 | 377 | 365 | 279 | 159 | 219 | 9 | 81 | 231 | 375 | 363 |
| 469 | 409 | 349 | 205 | 49 | 145 | 421 | 517 | 473 | 413 | 353 | 209 | 53 | 149 | 425 | 521 | 471 | 411 | 351 | 207 | 51 | 147 | 423 | 519 |
| 553 | 505 | 337 | 97 | 37 | 265 | 457 | 565 | 557 | 509 | 341 | 101 | 41 | 269 | 461 | 569 | 555 | 507 | 339 | 99 | 39 | 267 | 459 | 567 |
| 529 | 445 | 253 | 25 | 85 | 325 | 493 | 541 | 533 | 449 | 257 | 29 | 89 | 329 | 497 | 545 | 531 | 447 | 255 | 27 | 87 | 327 | 495 | 543 |
| 481 | 385 | 133 | 13 | 193 | 313 | 397 | 433 | 485 | 389 | 137 | 17 | 197 | 317 | 401 | 437 | 483 | 387 | 135 | 15 | 195 | 315 | 399 | 435 |
| 301 | 289 | 169 | 115 | 67 | 181 | 121 | 241 | 305 | 293 | 173 | 119 | 71 | 185 | 125 | 245 | 303 | 291 | 171 | 117 | 69 | 183 | 123 | 243 |
| 73 | 235 | 379 | 367 | 283 | 163 | 223 | 1 | 77 | 239 | 383 | 371 | 287 | 167 | 227 | 5 | 75 | 237 | 381 | 369 | 285 | 165 | 225 | 3 |
| 55 | 151 | 427 | 523 | 475 | 415 | 355 | 211 | 59 | 155 | 431 | 527 | 479 | 419 | 359 | 215 | 57 | 153 | 429 | 525 | 477 | 417 | 357 | 213 |
| 43 | 271 | 463 | 571 | 559 | 511 | 343 | 103 | 47 | 275 | 467 | 575 | 563 | 515 | 347 | 107 | 45 | 273 | 465 | 573 | 561 | 513 | 345 | 105 |

| | | | | | | | | | | | | | | | | | | | | | |
|---|---|---|---|---|---|---|---|---|---|---|---|---|---|---|---|---|---|---|---|---|---|
| 12pp → | 82 | 262 | 454 | 538 | 562 | 490 | 250 | 10 | 84 | 264 | 456 | 540 | 564 | 492 | 252 | 12 | 80 | 260 | 452 | 536 | 560 | 488 | 248 | 8 |
| | 118 | 202 | 370 | 442 | 514 | 418 | 238 | 58 | 120 | 204 | 372 | 444 | 516 | 420 | 240 | 60 | 116 | 200 | 368 | 440 | 512 | 416 | 236 | 56 |
| | 40 | 106 | 166 | 226 | 346 | 394 | 322 | 184 | 42 | 108 | 168 | 228 | 348 | 396 | 324 | 186 | 38 | 104 | 164 | 224 | 344 | 392 | 320 | 182 |
| | 304 | 172 | 136 | 34 | 154 | 328 | 400 | 352 | 306 | 174 | 138 | 36 | 156 | 330 | 402 | 354 | 302 | 170 | 134 | 32 | 152 | 326 | 398 | 350 |
| | 472 | 376 | 208 | 124 | 64 | 292 | 424 | 520 | 474 | 378 | 210 | 126 | 66 | 294 | 426 | 522 | 470 | 374 | 206 | 122 | 62 | 290 | 422 | 518 |
| | 544 | 460 | 268 | 88 | 16 | 280 | 496 | 568 | 546 | 462 | 270 | 90 | 18 | 282 | 498 | 570 | 542 | 458 | 266 | 86 | 14 | 278 | 494 | 566 |
| | 556 | 484 | 244 | 4 | 76 | 256 | 448 | 532 | 558 | 486 | 246 | 6 | 78 | 258 | 450 | 534 | 554 | 482 | 242 | 2 | 74 | 254 | 446 | 530 |
| | 508 | 412 | 232 | 52 | 112 | 196 | 364 | 436 | 510 | 414 | 234 | 54 | 114 | 198 | 366 | 438 | 506 | 410 | 230 | 50 | 110 | 194 | 362 | 434 |
| | 340 | 388 | 316 | 190 | 46 | 100 | 160 | 220 | 342 | 390 | 318 | 192 | 48 | 102 | 162 | 222 | 338 | 386 | 314 | 188 | 44 | 98 | 158 | 218 |
| | 148 | 334 | 406 | 358 | 310 | 178 | 142 | 28 | 150 | 336 | 408 | 360 | 312 | 180 | 144 | 30 | 146 | 332 | 404 | 356 | 308 | 176 | 140 | 26 |
| | 70 | 298 | 430 | 526 | 478 | 382 | 214 | 130 | 72 | 300 | 432 | 528 | 480 | 384 | 216 | 132 | 68 | 296 | 428 | 524 | 476 | 380 | 212 | 128 |
| | 22 | 286 | 502 | 574 | 550 | 466 | 274 | 94 | 24 | 288 | 504 | 576 | 552 | 468 | 276 | 96 | 20 | 284 | 500 | 572 | 548 | 464 | 272 | 92 |
| 12pp → | 79 | 259 | 451 | 535 | 559 | 487 | 247 | 7 | 83 | 263 | 455 | 539 | 563 | 491 | 251 | 11 | 81 | 261 | 453 | 537 | 561 | 489 | 249 | 9 |
| | 115 | 199 | 367 | 439 | 511 | 415 | 235 | 55 | 119 | 203 | 371 | 443 | 515 | 419 | 239 | 59 | 117 | 201 | 369 | 441 | 513 | 417 | 237 | 57 |
| | 37 | 103 | 163 | 223 | 343 | 391 | 319 | 181 | 41 | 107 | 167 | 227 | 347 | 395 | 323 | 185 | 39 | 105 | 165 | 225 | 345 | 393 | 321 | 183 |
| | 301 | 169 | 133 | 31 | 151 | 325 | 397 | 349 | 305 | 173 | 137 | 35 | 155 | 329 | 401 | 353 | 303 | 171 | 135 | 33 | 153 | 327 | 399 | 351 |
| | 469 | 373 | 205 | 121 | 61 | 289 | 421 | 517 | 473 | 377 | 209 | 125 | 65 | 293 | 425 | 521 | 471 | 375 | 207 | 123 | 63 | 291 | 423 | 519 |
| | 541 | 457 | 265 | 85 | 13 | 277 | 493 | 565 | 545 | 461 | 269 | 89 | 17 | 281 | 497 | 569 | 543 | 459 | 267 | 87 | 15 | 279 | 495 | 567 |
| | 553 | 481 | 241 | 1 | 73 | 253 | 445 | 529 | 557 | 485 | 245 | 5 | 77 | 257 | 449 | 533 | 555 | 483 | 243 | 3 | 75 | 255 | 447 | 531 |
| | 505 | 409 | 229 | 49 | 109 | 193 | 361 | 433 | 509 | 413 | 233 | 53 | 113 | 197 | 365 | 437 | 507 | 411 | 231 | 51 | 111 | 195 | 363 | 435 |
| | 337 | 385 | 313 | 187 | 43 | 97 | 157 | 217 | 341 | 389 | 317 | 191 | 47 | 101 | 161 | 221 | 339 | 387 | 315 | 189 | 45 | 99 | 159 | 219 |
| | 145 | 331 | 403 | 355 | 307 | 175 | 139 | 25 | 149 | 335 | 407 | 359 | 311 | 179 | 143 | 29 | 147 | 333 | 405 | 357 | 309 | 177 | 141 | 27 |
| | 67 | 295 | 427 | 523 | 475 | 379 | 211 | 127 | 71 | 299 | 431 | 527 | 479 | 383 | 215 | 131 | 69 | 297 | 429 | 525 | 477 | 381 | 213 | 129 |
| 12pp → | 19 | 283 | 499 | 571 | 547 | 463 | 271 | 91 | 23 | 287 | 503 | 575 | 551 | 467 | 275 | 95 | 21 | 285 | 501 | 573 | 549 | 465 | 273 | 93 |

| 83 | 59 | 23 | 7 | 3 | 15 | 55 | 95 | ← 12dd' |
|----|----|----|----|----|----|----|----|---|
| 79 | 63 | 35 | 19 | 11 | 27 | 51 | 87 | |
| 90 | 75 | 71 | 47 | 39 | 31 | 43 | 66 | |
| 46 | 70 | 74 | 91 | 67 | 42 | 30 | 38 | |
| 18 | 34 | 62 | 78 | 86 | 50 | 26 | 10 | |
| 6 | 22 | 58 | 82 | 94 | 54 | 14 | 2 | |
| 4 | 16 | 56 | 96 | 84 | 60 | 24 | 8 | |
| 12 | 28 | 52 | 88 | 80 | 64 | 36 | 20 | |
| 40 | 32 | 44 | 65 | 89 | 76 | 72 | 48 | |
| 68 | 41 | 29 | 37 | 45 | 69 | 73 | 92 | |
| 85 | 49 | 25 | 9 | 17 | 33 | 61 | 77 | ← 12dd' |
| 93 | 53 | 13 | 1 | 5 | 21 | 57 | 81 | |

| | | | | | | | | | | | | | | | | | | | | | | |
|---|---|---|---|---|---|---|---|---|---|---|---|---|---|---|---|---|---|---|---|---|---|---|
|495|279|87|39|15|135|327|567|493|277|85|37|13|133|325|565|497|281|89|41|17|137|329|569|
|399|255|183|111|63|159|447|543|397|253|101|109|61|157|445|541|401|257|185|113|65|161|449|545|
|513|375|423|303|231|207|351|465|511|373|421|301|229|205|349|463|515|377|425|305|233|209|353|467|
|297|417|369|519|471|345|201|225|295|415|367|517|469|343|199|223|299|419|371|521|473|347|203|227|
|105|177|249|393|537|441|153|57|103|175|247|391|535|439|151|55|107|179|251|395|539|443|155|59|
|33|81|273|489|561|321|129|9|31|79|271|487|559|319|127|7|35|83|275|491|563|323|131|11|
|21|141|333|573|501|285|93|45|19|139|331|571|499|283|91|43|23|143|335|575|503|287|95|47|
|69|165|453|549|405|261|189|117|67|163|451|547|403|259|187|115|71|167|455|551|407|263|191|119|
|237|213|357|459|507|381|429|309|235|211|355|457|505|379|427|307|239|215|359|461|509|383|431|311|
|477|339|195|219|291|411|363|525|475|337|193|217|289|409|361|523|479|341|197|221|293|413|365|527|
|531|435|147|51|99|171|243|387|529|433|145|49|97|169|241|385|533|437|149|53|101|173|245|389|
|555|315|123|3|27|75|267|483|553|313|121|1|25|73|265|481|557|317|125|5|29|77|269|485|
|498|282|90|42|18|138|330|570|494|278|86|38|14|134|326|566|496|280|88|40|16|136|328|568|
|402|258|186|114|66|162|450|546|398|254|102|110|62|158|446|542|400|256|184|112|64|160|448|544|
|516|378|426|306|234|210|354|468|512|374|422|302|230|206|350|464|514|376|424|304|232|208|352|466|
|300|420|372|522|474|348|204|228|296|416|368|518|470|344|200|224|298|418|370|520|472|346|202|226|
|108|180|252|396|540|444|156|60|104|176|248|392|536|440|152|56|106|178|250|394|538|442|154|58|
|36|84|276|492|564|324|132|12|32|80|272|488|560|320|128|8|34|82|274|490|562|322|130|10|
|24|144|336|576|504|288|96|48|20|140|332|572|500|284|92|44|22|142|334|574|502|286|94|46|
|72|168|456|552|408|264|192|120|68|164|452|548|404|260|188|116|70|166|454|550|406|262|190|118|
|240|216|360|462|510|384|432|312|236|212|356|458|506|380|428|308|238|214|358|460|508|382|430|310|
|480|342|198|222|294|414|366|528|476|338|194|218|290|410|362|524|478|340|196|220|292|412|364|526|
|534|438|150|54|102|174|246|390|530|434|146|50|98|170|242|386|532|436|148|52|100|172|244|388|
|558|318|126|6|30|78|270|486|554|314|122|2|26|74|266|482|556|316|124|4|28|76|268|484|

| (93) | 77 | 53 | 21 | 16 | 48 | 44 | 12 | 17 | 49 | 73 | 89 |
|---|---|---|---|---|---|---|---|---|---|---|---|
| 85 | 69 | 29 | 8 | 40 | 64 | 60 | 36 | 4 | 25 | 65 | 81 |
| 61 | 37 | 5 | 32 | 72 | 88 | 84 | 68 | 28 | 1 | 33 | 57 |
| 45 | 13 | 24 | 56 | 80 | (96) | (92) | 76 | 52 | 20 | 9 | 41 |
| 43 | 11 | 18 | 50 | 74 | 90 | (94) | 78 | 54 | 22 | 15 | 47 |
| 59 | 35 | 3 | 26 | 66 | 82 | 86 | 70 | 30 | 7 | 39 | 63 |
| 83 | 67 | 27 | 2 | 34 | 58 | 62 | 38 | 6 | 31 | 71 | 87 |
| 91 | 75 | 51 | 19 | 10 | 42 | 46 | 14 | 23 | 55 | 79 | (95) |

↑
12aa

↑
12a

12aa
12a

PRINTING METHOD AND APPARATUS, AND BINARY-FORM DITHER MATRIX PATTERN

BACKGROUND OF THE INVENTION

1. Field of the Invention

The present invention relates to a binary-form dither matrix pattern (dither pattern table) for use in converting continuous tone images (natural images, graphic images, colored characters, and others) into binary images—hereinafter this process will be also called "binary-coding". The invention also relates to a printing method and a printing apparatus using the binary-form dither matrix pattern.

2. Description of the Related Art

When continuous tone images (natural images, graphic images, and colored characters), which are generated or input from input devices such as scanners, are output from output devices such as printers, the multilevel images must be converted into binary images, so that their continuous tone is expressed by ON/OFF of coloring materials (ink, toner, or the like).

Dithering is a well-known method of such conversion (binary-coding). In dithering, the value of one specific pixel (object pixel) of a continuous tone image (multilevel image) is compared with a predetermined threshold to decide the intensity level of the pixel. In accordance with this intensity level, the ON/OFF of the dot corresponding to the object pixel is determined using a binary-coding dither matrix pattern which has been prepared previously.

For example, Japanese Examined Patent Application Publication No. SHO 53-5561 discloses dither patterns that are tiled in such a way that the centroid of an area to which color materials are to be fixed is at an angle of $\tan\theta=\frac{1}{3}$ (approximately 18.43°). In this technique, a dither pattern is rotated at an angle other than 45° so as to avoid moire patterns or other artifacts (artificial striped patterns).

In the dither pattern of Japanese Examined Patent Application Publication No. SHO 53-5561, however, a unit pattern, which is generated by tiling the dither pattern, is composed of a small number (10) of pixels, and thus it is difficult to printout a high quality image of a large number of gray levels. More precisely, to handle images with 256 gray levels (8-bit coded image pixels), it is preferable to use a dither pattern which realizes a unit pattern composed of a larger number of pixels.

SUMMARY OF THE INVENTION

With the foregoing problems in view, one object of the present invention is to provide a binary-coding dither matrix pattern which is composed of a greater number of pixels and which can minimize moiré patterns and other artifacts in printouts.

Another object of the invention is to provide a printing method and apparatus employing the binary-coding dither matrix pattern.

In order to accomplish the above object, according to the present invention, there is provided a method of printing a given multivalue image in a binary-form output pattern, which method comprises the steps of: (a) providing a binary-form dither matrix pattern which is used to obtain the binary-form output pattern, said binary-form dither matrix pattern having a rectangular pattern in which a plurality of pixels that are numbered to be successively turned on are arranged in matrix, the sequence of turning on of said plural pattern elements being set in such a way that a plurality of groups of prospective output dot elements, which groups are substantially identical in shape, grow successively from a plurality of local points associated with the respective groups and successively from a center dot element in each group; and (b) forming a binary image of said output dot elements in accordance with said binary-form output pattern obtained by turning on the individual pattern elements of said binary-form dither matrix pattern, based on the given multivalue image, in such a manner that said output dot elements of an individual print dot of the binary image which correspond to said pattern elements of said binary-form dither matrix pattern grow successively from said center dot element at the associated local point in each group in the sequence the corresponding pattern elements of said binary-form dither matrix pattern are numbered.

Further, there is provided a method of printing a given multivalue image in a binary-form output pattern, which method comprises the steps of: (a) providing a binary-form dither matrix pattern which is used to obtain the binary-form output pattern, said binary-form dither matrix pattern having a rectangular pattern in which a plurality of pattern elements that are numbered to be successively turned on are arranged in matrix, the sequence of turning on of said plural pattern elements being set in such a way that a plurality of groups of prospective output dot elements, which groups are substantially identical in shape, grow successively from a plurality of local points associated with the respective groups and successively from a center dot element in each group; (b) expanding the given multivalue image in a memory area of a storage device; and (c) forming a binary image of said output dot elements in accordance with said binary-form output pattern obtained by turning on the individual pattern elements of said binary-form dither matrix pattern, based on the given multivalue image which has been expended in the memory area, in such a manner that said output dot elements of an individual print dot of the binary image which correspond to said pattern elements of said binary-form dither matrix pattern grow successively from said center dot element at the associated local point in each group in the sequence the corresponding pattern elements of said binary-form dither matrix pattern are numbered.

Still further, there is provided an apparatus for printing a given multivalue image in a binary-form output pattern, which apparatus comprises: (a) means for providing a binary-form dither matrix pattern which is used to obtain the binary-form output pattern, said binary-form dither matrix pattern having a rectangular pattern in which a plurality of pattern elements that are numbered to be successively turned on are arranged in matrix, the sequence of turning on of said plural pattern elements being set in such a way that a plurality of groups of prospective output dot elements, which dot elements are substantially identical in shape, grow successively from a plurality of local points associated with the respective groups and successively from a center dot element in each group; (b) a storage device having a memory area in which the given multivalue image is to be expanded; and (c) means for forming a binary image of said output dot elements in accordance with said binary-form output pattern obtained by turning on the individual pattern elements of said binary-form dither matrix pattern, based on the given multivalue image which has been expended in the memory area, in such a manner that said output dot elements of an individual print dot of the binary image which correspond to said pattern elements of said binary-form dither matrix pattern grow successively from said center dot element at the associated local point in each group in the sequence the corresponding pattern elements of said binary-form dither matrix pattern are numbered.

Furthermore, there is provided an apparatus for printing a given multivalue image in a binary-form output pattern, which apparatus comprises: (a) means for providing a binary-form dither matrix pattern which is used to obtain the binary-form output pattern, said binary-form dither matrix pattern having a rectangular pattern in which a plurality of pattern elements that are numbered to be successively turned on are arranged in matrix, the sequence of turning on of said plural pattern elements being set in such a way that a plurality of groups of prospective output dot elements, which dot elements are substantially identical in shape, grow successively from a plurality of local points associated with the respective groups and successively from a center dot element in each group; and (b) means for forming a binary image of said output dot elements in accordance with said binary-form output pattern obtained by turning on the individual pattern elements of said binary-form dither matrix pattern, based on the given multivalue image, in such a manner that said output dot elements of an individual print dot of the binary image which correspond to said pattern elements of said binary-form dither matrix pattern grow successively from said center dot element at the associated local point in each group in the sequence the corresponding pattern elements of said binary-form dither matrix pattern are numbered.

Further, there is provided a binary-form dither matrix pattern for use in printing a given multivalue image in a binary-form output pattern, said binary-form dither matrix pattern having a rectangular pattern in which a plurality of pattern elements that are numbered to be successively turned on are arranged in matrix, the sequence of turning on of said plural pattern elements being set in such a way that a plurality of groups of prospective output dot elements, which groups are substantially identical in shape, grow successively from a plurality of local points associated with the respective groups and successively from a center dot element in each group.

As a preferred feature, the rectangular pattern may be composed of 96 pattern elements arranged in a matrix of 8 rows×12 columns that are turned on in the following manner: the 1st to 12th pattern elements composing the first row of the rectangular pattern are turned on 4th, 20th, 44th, 76th, 81st, 49th, 53rd, 85th, 80th, 48th, 24th, and 8th, respectively; the 1st to 12th pattern elements composing the second row of the rectangular pattern are turned on 12th, 28th, 68th, 89th, 57th, 33rd, 37th, 61st, 93rd, 72nd, 32nd, and 16th, respectively; the 1st to 12th pattern elements composing the third row of the rectangular pattern are turned on 36th, 60th, 92nd, 65th, 25th, 9th, 13th, 29th, 69th, 96th, 64th, and 40th, respectively; the 1st to 12th pattern elements composing the fourth row of the rectangular pattern are turned on 52nd, 84th, 73rd, 41st, 17th, 1st, 5th, 21st, 45th, 77th, 88th, and 56th, respectively; the 1st to 12th pattern elements composing the fifth row of the rectangular pattern are turned on 54th, 86th, 79th, 47th, 23rd, 7th, 3rd, 19th, 43rd, 75th, 82nd, and 50th, respectively; the 1st to 12th pattern elements composing the sixth row of the rectangular pattern are turned on 38th, 62nd, 94th, 71st, 31st, 15th, 11th, 27th, 67th, 90th, 58th, and 34th, respectively; the 1st to 12th pattern elements composing the seventh row of the rectangular pattern are turned on 14th, 30th, 70th, 95th, 63rd, 39th, 35th, 59th, 91st, 66th, 26th, and 10th, respectively; and the 1st to 12th pattern elements composing the eighth row of the rectangular pattern are turned on 6th, 22nd, 46th, 78th, 87th, 55th, 51st, 83rd, 74th, 42nd, 18th, and 2nd, respectively.

As another preferred feature, the order of turning-on set for an arbitrary pattern element in said rectangular pattern and that set for the pattern element disposed in a position diametrically symmetrical to said arbitrary pattern element with respect to the center of said rectangular pattern are substituted for each other.

A printing method and apparatus, and a binary-form dither matrix pattern of the present invention guarantee the following advantageous results:

(1) The sequence of turning on a plurality of pattern elements in the binary-form dither matrix pattern is set in such a way that a plurality of groups of prospective output dot elements, which groups are substantially identical in shape, grow successively from a plurality of local points associated with the respective groups and successively from a center dot element in each group. Such a binary-form dither matrix pattern is used to binarize a given multilevel image, and an output image is formed based on the binarization result. As a result, moiré patterns and other artifacts are minimized in printouts.

(2) Even if the order of turning-on set for an arbitrary pattern element in said rectangular pattern and that set for the pattern element disposed in a position diametrically symmetrical to said arbitrary pattern element with respect to the center of said rectangular pattern are substituted for each other, it is still possible to minimize moiré patterns and other artifacts.

(3) Even if said rectangular pattern for which the sequence of turning-on is set is angularly moved about the pattern center by 90°, clockwise or counterclockwise, it is still possible to minimize moiré patterns and other artifacts.

(4) Even if the sequence of turning on said plural pattern elements is changed using a look-up table, it is still possible to minimize moiré patterns and other artifacts.

Other objects and further features of the present invention will be apparent from the following detailed description when read in conjunction with the accompanying drawings.

BRIEF DESCRIPTION OF THE DRAWINGS

FIG. 3 is an example of one-dimensional look-up table used in a printing apparatus of the embodiment;

FIG. 5 is a modified example of a binary-form dither matrix pattern used in a printing apparatus of the embodiment;

FIG. 6 is a modified example of a binary-form dither matrix pattern used in a printing apparatus of the embodiment;

FIG. 11 is a modified example of a binary-form dither matrix pattern used in a printing apparatus of the embodiment;

FIG. 12 is a modified example of a binary-form dither matrix pattern used in a printing apparatus of the embodiment;

FIG. 13 is a modified example of a binary-form dither matrix pattern used in a printing apparatus of the embodiment;

FIG. 14 is a modified example of a binary-form dither matrix pattern used in a printing apparatus of the embodiment;

FIG. 15 is a modified example of a binary-form dither matrix pattern used in a printing apparatus of the embodiment;

FIG. 16 is a modified example of a binary-form dither matrix pattern used in a printing apparatus of the embodiment;

FIG. 17 is a modified example of a binary-form dither matrix pattern used in a printing apparatus of the embodiment;

FIG. 18 is a modified example of a binary-form dither matrix pattern used in a printing apparatus of the embodiment;

FIG. 22 is another modified example of a binary-coding dither matrix pattern used in a printing apparatus of the embodiment;

Figure 27:
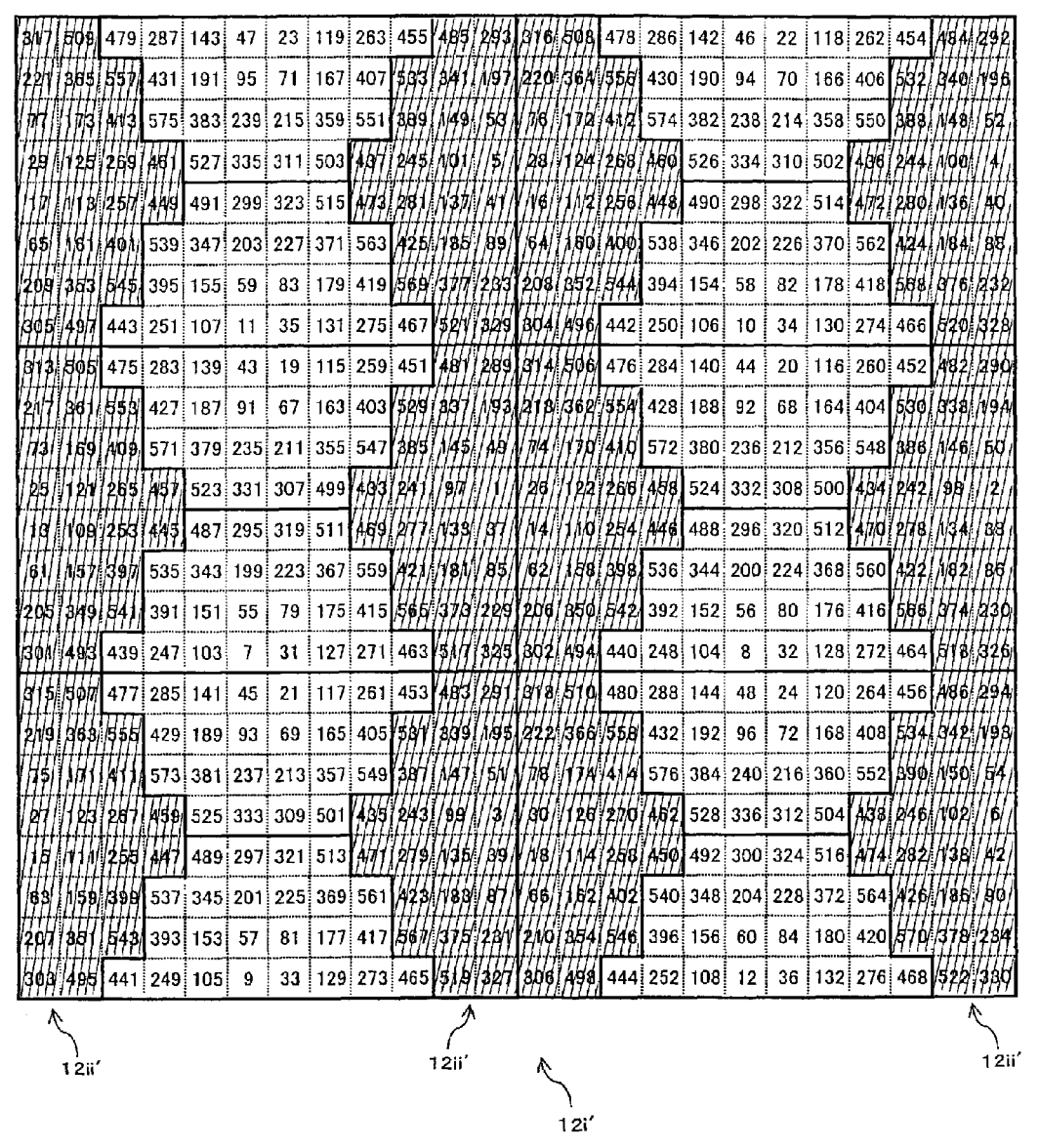

FIG. 27 is another modified example of a binary-coding dither matrix pattern used in a printing apparatus of the embodiment;

Figure 28:
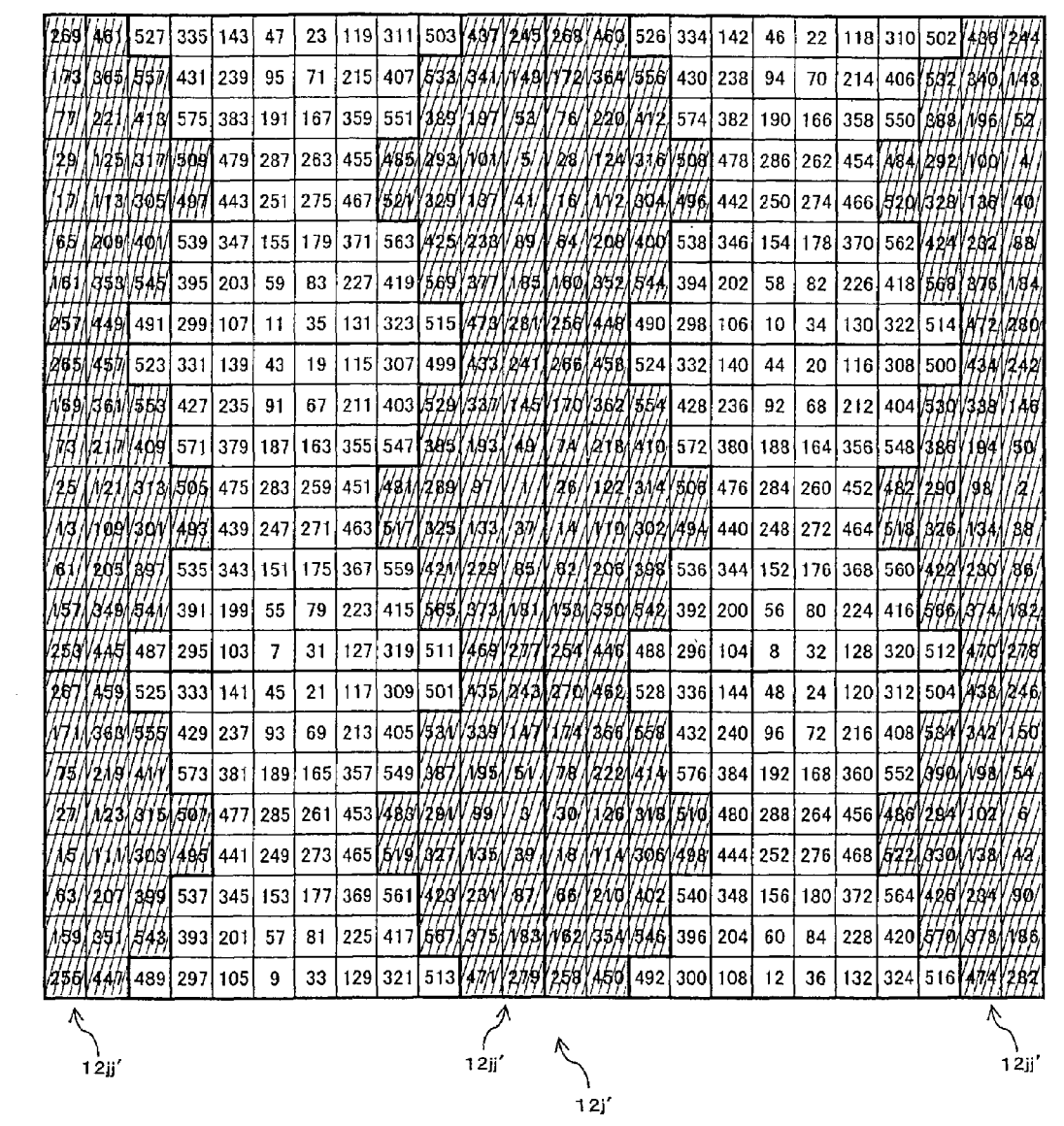

FIG. 28 is another modified example of a binary-coding dither matrix pattern used in a printing apparatus of the embodiment;

FIG. 29 is another modified example of a binary-coding dither matrix pattern used in a printing apparatus of the embodiment;

Figure 30:
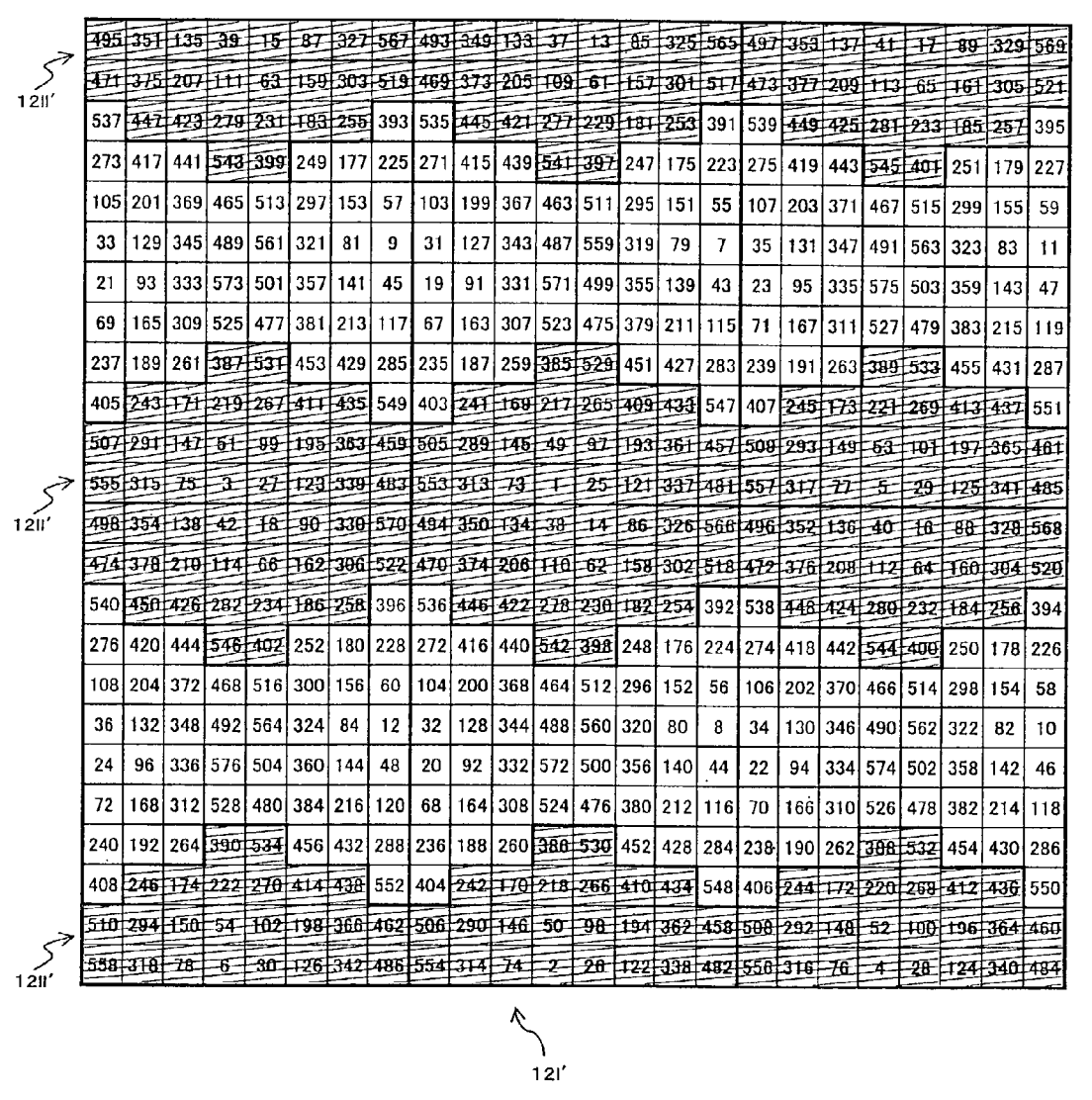

FIG. 30 is another modified example of a binary-coding dither matrix pattern used in a printing apparatus of the embodiment;

Figure 31:
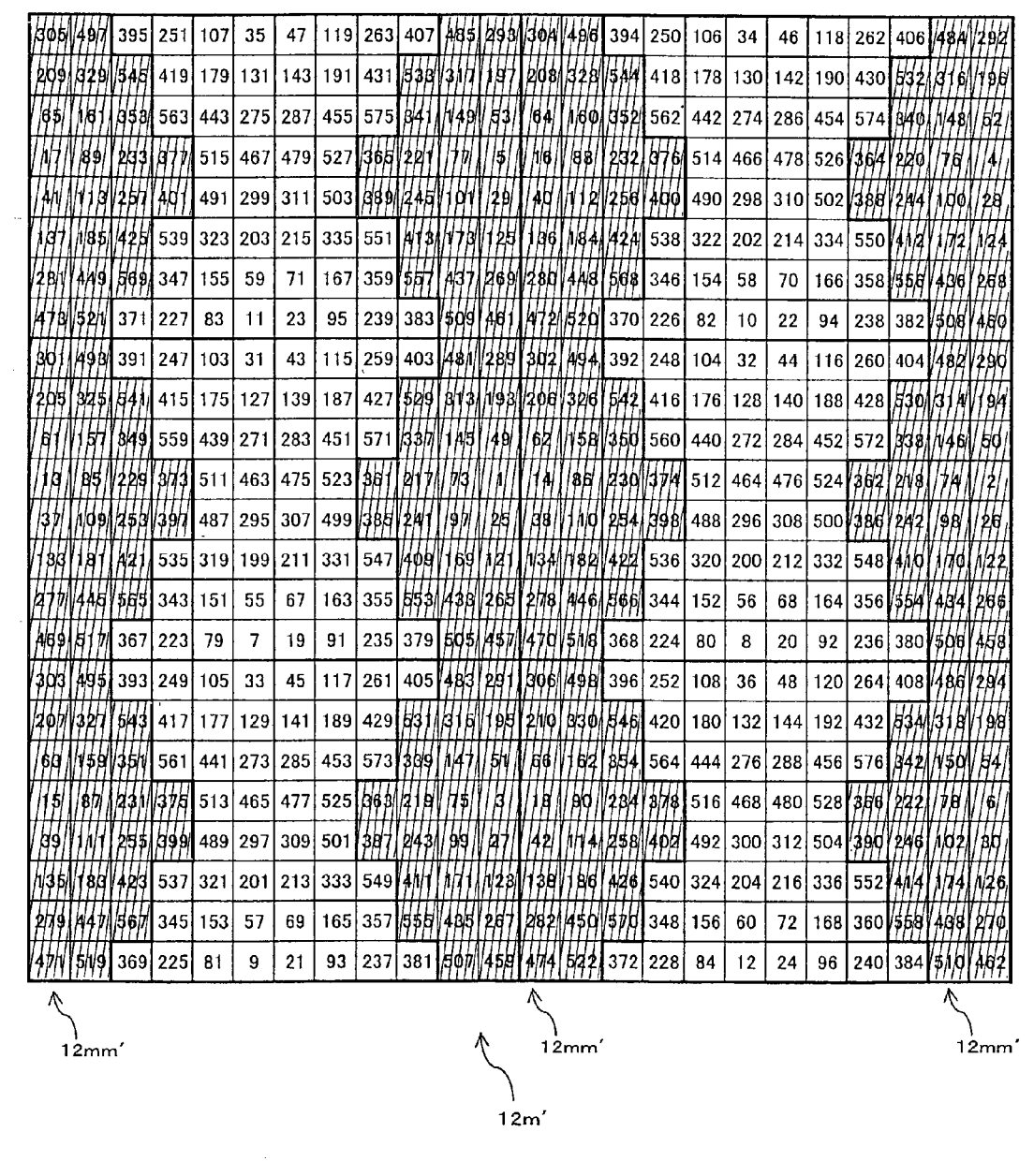

FIG. 31 is another modified example of a binary-coding dither matrix pattern used in a printing apparatus of the embodiment;

Figure 32:
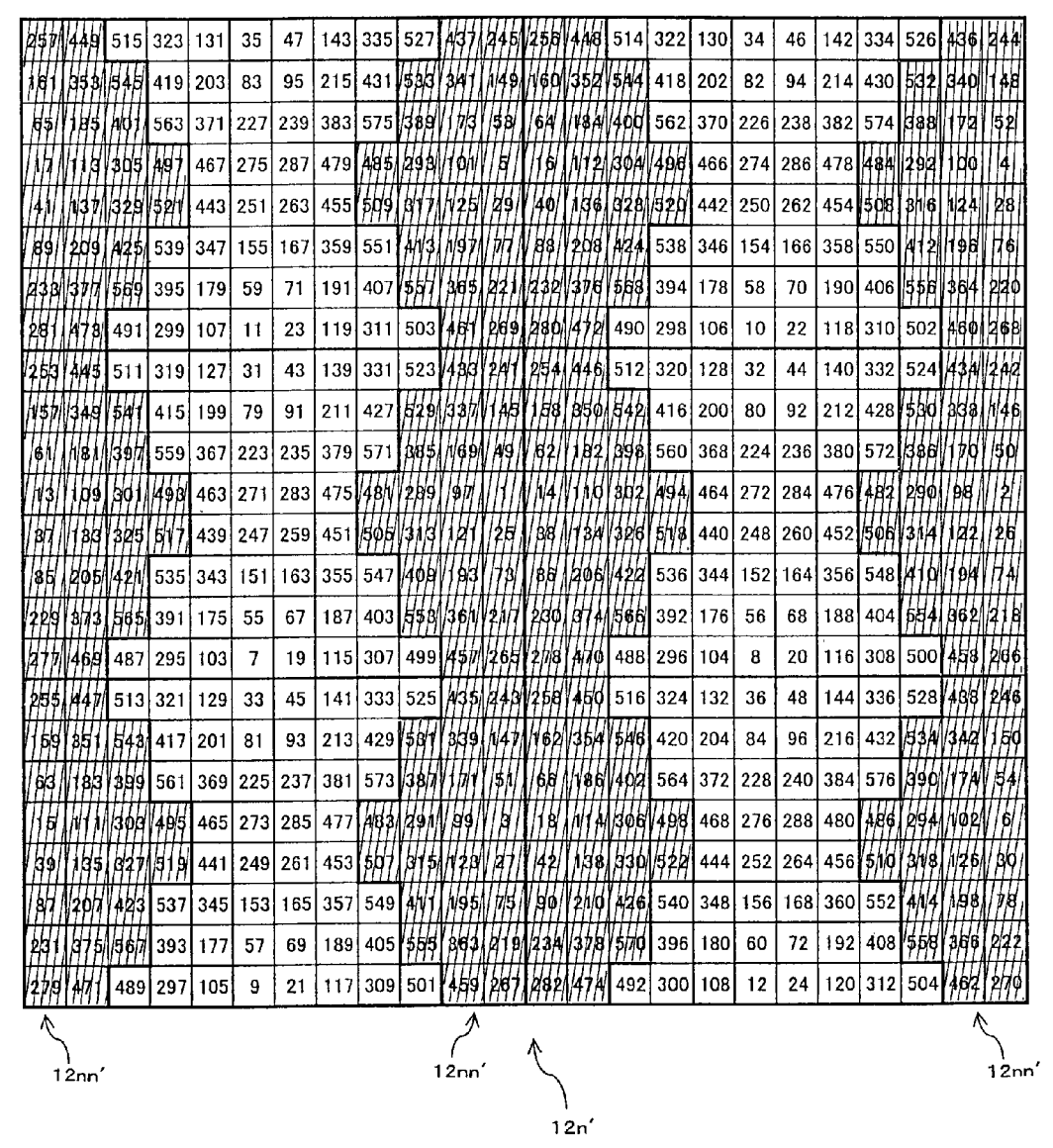

FIG. 32 is another modified example of a binary-coding dither matrix pattern used in a printing apparatus of the embodiment;

Figure 33:
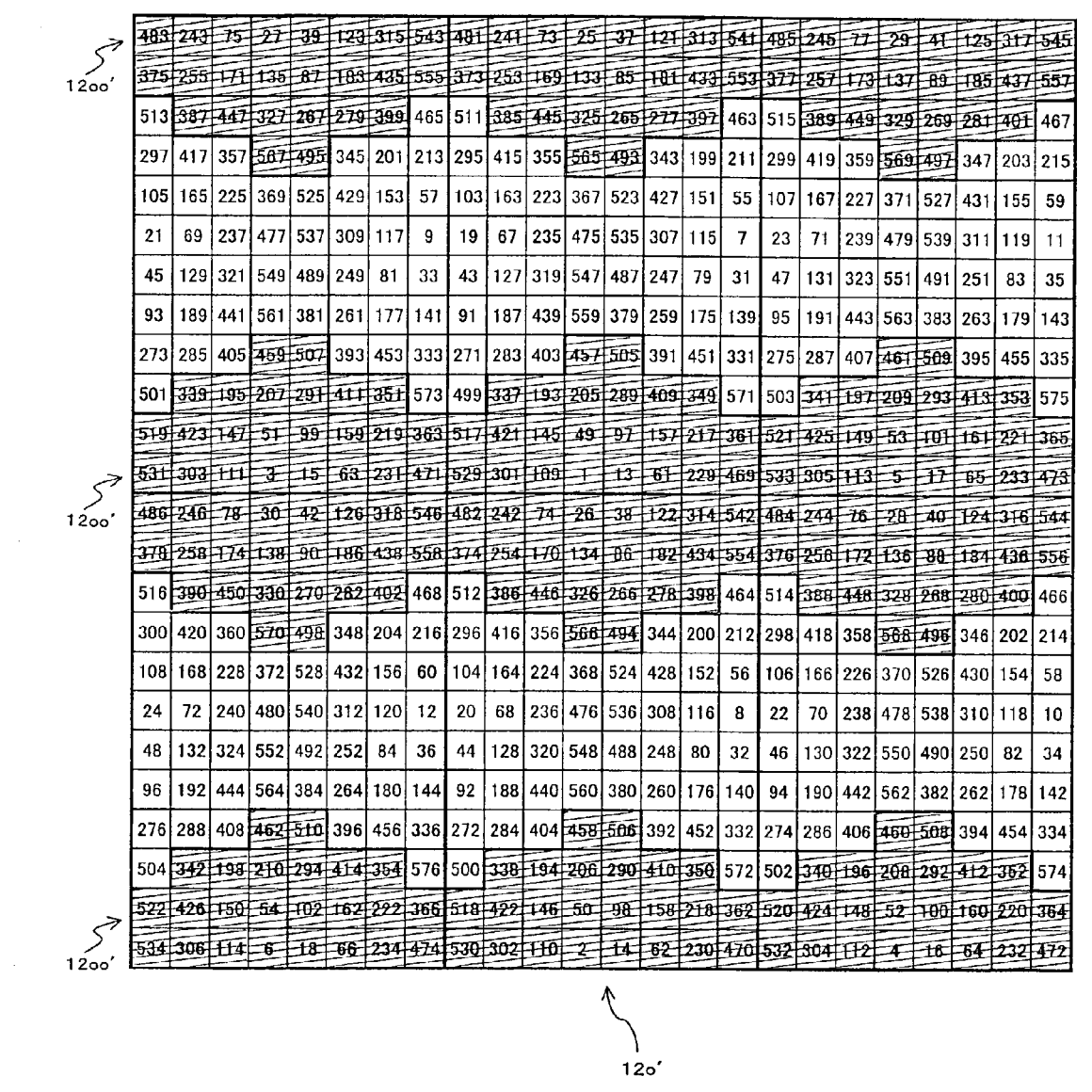

FIG. 33 is another modified example of a binary-coding dither matrix pattern used in a printing apparatus of the embodiment;

Figure 34:
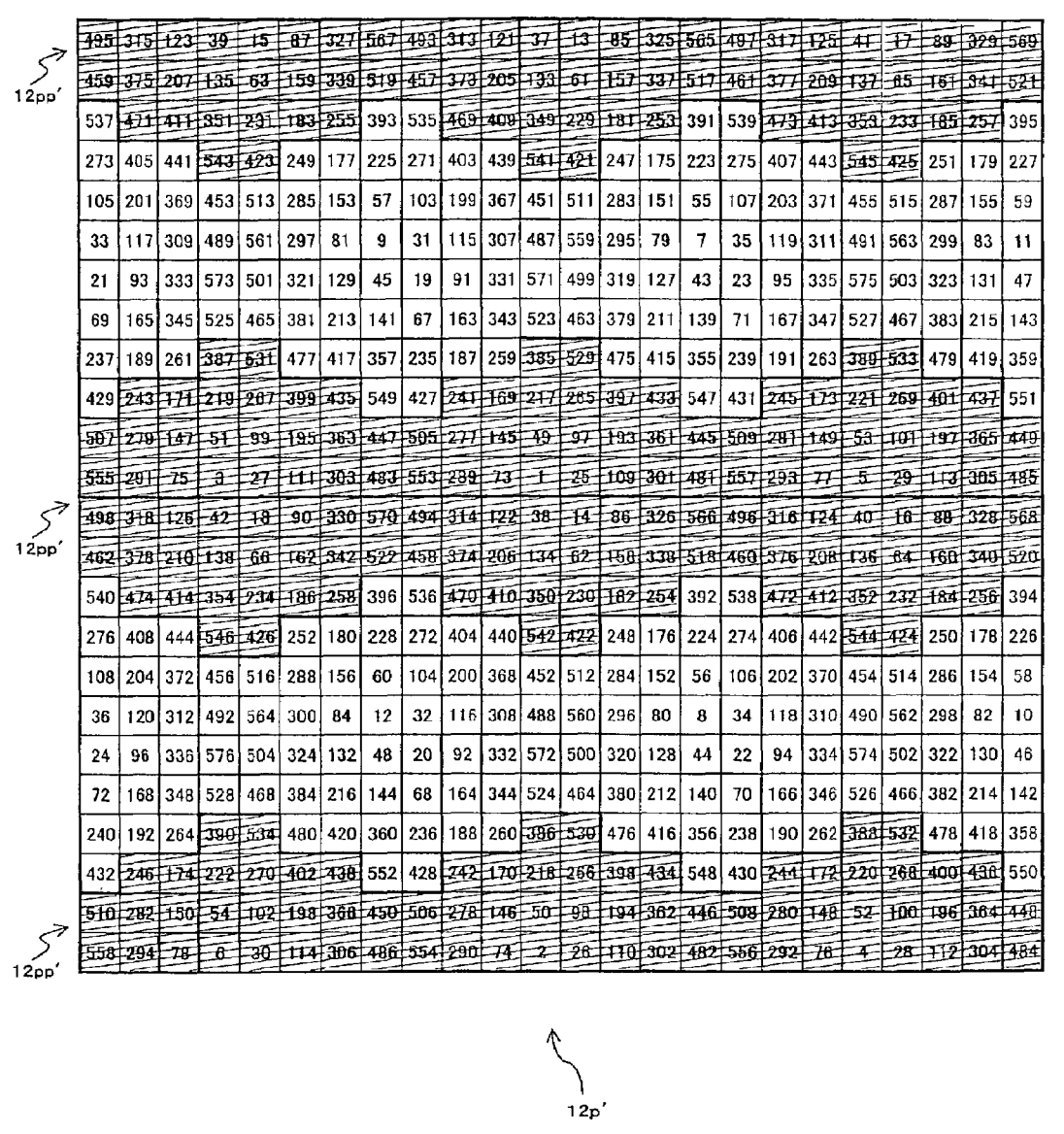

FIG. 34 is another modified example of a binary-coding dither matrix pattern used in a printing apparatus of the embodiment;

FIG. 35 is a view for describing binary-coding processing carried out in a printing apparatus of the embodiment.

DESCRIPTION OF THE PREFERRED EMBODIMENT(S)

One preferred embodiment of the present invention will be hereinafter described with reference to the relevant accompanying drawings.

Figure 1:
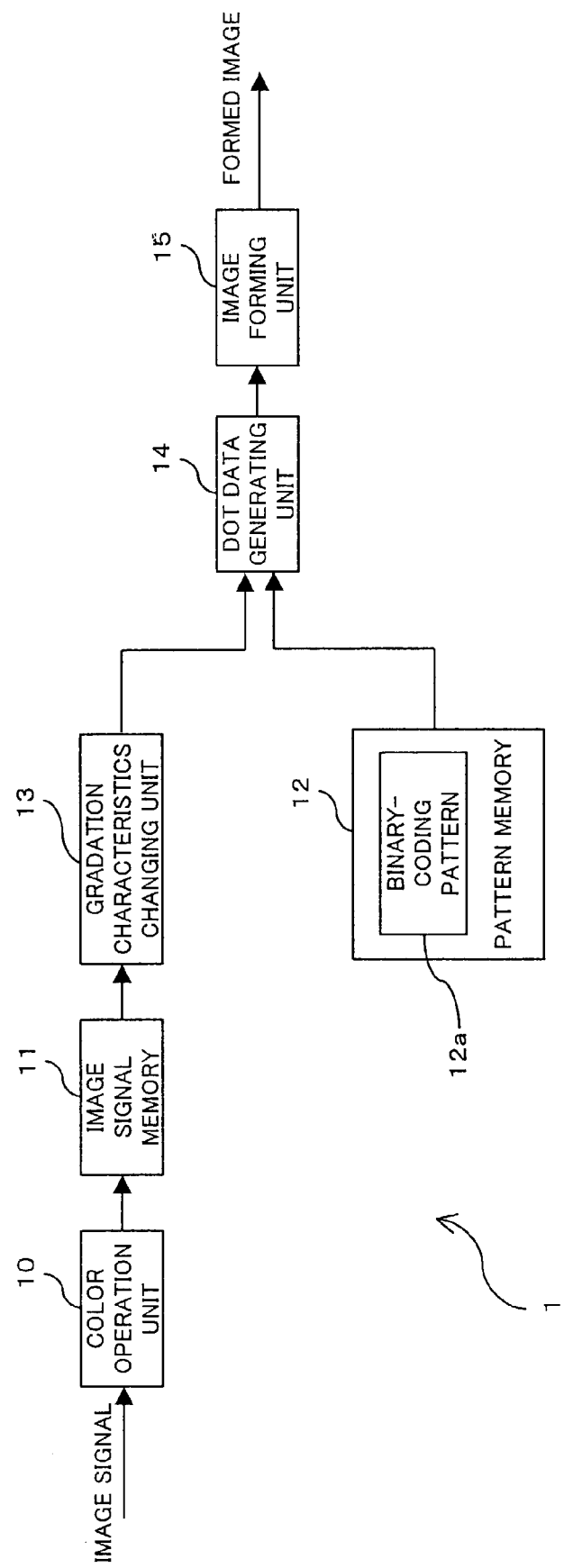
FIG. 1 is a block diagram showing the essential part of dot generating unit 1 of a printing apparatus according to one preferred embodiment of the present invention.

FIG. 1 depicts the essential part of dot generating unit 1 of a printing apparatus (hereinafter called a printer) according to one preferred embodiment of the present invention.

The present printer converts a multi-level image (continuous tone image) into a binary image—hereinafter this conversion will also be called "binary-coding"—using a binary-coding dither matrix pattern (binary-form dither matrix pattern; described later in detail). On the basis of the resulting binary image, the ON/OFF of coloring material is controlled to form (print) an output image. The printer controls the size of tiny dots (halftone dots) of coloring material to reproduce various shades of color of a continuous tone image on the surface of a paper sheet, film, or printing plate. In other words, gray levels of the image are represented by the proportion each dot occupies in a unit area.

The present printer (for example, an inkjet printer, a laser beam printer, a thermal transfer printer, dye-sublimation printer, and an LED printer) forms (prints) an image on a medium (for example, a print sheet) by forming (making marks) color materials (toner, ink, and so on) on the medium. In the present printer, different shades of gray in a multilevel image (continuous tone image) are reproduced as different areas of color materials (dots).

In the present embodiment, the pixels to be binarized have pixel values of 0 to 255 (multilevel) while the pixels after being binarized have pixel values of 0 or 255 (binary). This definition would never affect the generality of the description.

The present printer has a CPU (Central Processing Unit), a ROM (Read Only Memory), and RAM (Random Access Memory) (all of these are not shown). The ROM stores application programs (binarizing program and printing program) for realizing color operation unit 10, gradation characteristics changing unit 13, and dot data generating unit 14 (these will be described later). The CPU executes the above application programs stored in the ROM, thereby serving as color operation unit 10, gradation characteristics changing unit 13, and dot data generating unit 14 (their detailed descriptions will be given later), so that the printing method and the printing apparatus of the present invention are realized.

In the present description, the term "computer" designates a concept including hardware and an operation system, that is, it designates hardware tools controlled by an operation system. In a case where an application program singly operates hardware without the necessity of an operation system, the hardware itself corresponds to the computer. The hardware should have at least one microprocessor, such as a CPU, and a means for reading out a computer program stored in a recording medium.

Here, programs (binarizing program and printing program) for realizing the functions of color operation unit 10, gradation characteristics changing unit 13, and dot data generating unit 14, are stored in a computer-readable recording medium, such as a flexible disk, CD-ROM, CD-R, CD-R/W, DVD, DVD-R, DVD-R/W, magnetic disk, optical disk, and magneto-optical disk, to be provided to users. A computer reads out the programs stored in the medium, and transmits the read-out programs to an internal or an external storage. The programs recorded in a storage device (recording medium), such as a magnetic disk, optical disk, and magneto-optical disk, may otherwise be provided to the computer via communications networks.

A microprocessor (the CPU of the printer in the present embodiment) of the computer executes the programs stored in an internal storage device (the RAM or ROM of the printer in the present embodiment), thereby serving as color operation unit 10, gradation characteristics changing unit 13, and dot data generating unit 14. At that time, the computer may otherwise read out the programs stored in a recoding medium.

In the present embodiment, the term "computer" designates a concept including hardware and an operation system, that is, it designates hardware tools controlled by an operation system. In a case where an application program singly operates hardware with no necessity for any operation system, the hardware itself corresponds to the computer. The hardware should have at least one microprocessor, such as a CPU, and a means for reading out a computer program stored in a recording medium. Concretely, image forming apparatus 10a serves as a computer in the present embodiment.

Further, as a recording medium of the present embodiment, there can be employed various types of computer-readable media such as an IC card, ROM cartridge, magnetic tape, punch card, internal storage device (a memory such as a RAM and ROM), external storage device, and bar-coded printout, in addition to a flexible disk, CD-ROM, CD-R, CD-R/W, DVD, DVD-R, DVD-R/W, magnetic disk, optical disk, and magneto-optical disk, as cited above.

Dot generating unit 1 generates dots on the surface of a paper sheet, film, or printing plate, based on image signals of a continuous tone image. Dot generating unit 1 includes color operation unit 10, image signal memory (storage area) 11, pattern memory (binary-form dither matrix pattern setting means) 12, gradation characteristics changing unit 13, dot data generating unit (selected binary-form pattern generating means) 14, and image forming unit 15.

Color operation unit 10 performs color operations on image signals of a continuous tone image. Various types of processing, such as color correction, gradation correction, black printer formation, under color removal, and sharpness enhancement, are performed on input image signals (represented by, for example, pixel values raging from 0 to 255).

Image signal memory 11 stores image signals which have been processed by color operation unit 10, thereby functioning as a memory area in which a continuous tone image is to be expanded.

Figure 2A:
FIG. 2(a) is a view illustrating an example of a binary-form dither matrix pattern used in a printing apparatus of the embodiment, and FIG. 2(b) also illustrates an example of a binary-form dither matrix pattern used in a printing apparatus of the embodiment, in which binary-form dither matrix pattern a unit pattern is shown as a diagonally shaded area.
Figure 2B:

Pattern memory 12 stores a binary-form dither matrix pattern (hereinafter also called "binary-coding pattern") as shown in FIG. 2(a). Practically, pattern memory 12 and a recording medium (not shown), such as a RAM, a ROM, and a magnetic storage device, store a binarizing program and a printing program, and hence it can be considered that pattern memory 12 stores binary-coding pattern 12a. FIG. 2(b) shows an example of a binary coding pattern (binary-form dither matrix pattern) for use in a printer of one embodiment of the present invention, and its unit pattern (described later) is shown as a diagonally shaded area.

As shown in FIG. 2(a), binary-coding pattern 12a is a rectangular pattern composed of pixels (pattern elements) arranged in a matrix, which pixels are either turned on (making them black) or turned off (leaving them white). The sequence of turning on the pixels is set in such a way that plural dots (output dots), which are substantially identical in shape, grow from respective local points (the center and the four corners of binary-coding pattern 12a in FIG. 2(a)).

To be more specific, binary-coding pattern 12a is composed of 96 pixels arranged in a matrix of 8 rows×12 columns (rectangular pattern) as shown in FIG. 2(a) and FIG. 2(b). The sequence of turning on the pixels is set in such a way that each dot grows keeping a roughly round shape. In unit pattern 12aa (the diagonally shaded part in FIG. 2(b); described later) in binary-coding pattern 12a, two pixels that are disposed diametrically symmetrically to one another with respect to the center of the rectangular pattern, that is, the pixel numbered 96 and that numbered 94, are first turned on successively in this order. In binary-coding pattern 12a of FIG. 2, (a) and (b), the 96 pixels are numbered in the following manner, and the turning on of the pixels is carried out in descending numeric order:

(1) the 1st to 12th pixels composing the first row of the rectangular pattern are numbered 93, 77, 53, 21, 16, 48, 44, 12, 17, 49, 73, and 89, respectively;

(2) the 1st to 12th pixels composing the second row of said rectangular pattern are numbered 85, 69, 29, 8, 40, 64, 60, 36, 4, 25, 65, and 81, respectively;

(3) the 1st to 12th pixels composing the third row of said rectangular pattern are numbered 61, 37, 5, 32, 72, 88, 84, 68, 28, 1, 33, and 57, respectively;

(4) the 1st to 12th pixels composing the fourth row of said rectangular pattern are numbered 45, 13, 24, 56, 80, 96, 92, 76, 52, 20, 9, and 41, respectively;

(5) the 1st to 12th pixels composing the fifth row of said rectangular pattern are numbered 43, 11, 18, 50, 74, 90, 94, 78, 54, 22, 15, and 47, respectively;

(6) the 1st to 12th pixels composing the sixth row of said rectangular pattern are numbered 59, 35, 3, 26, 66, 82, 86, 70, 30, 7, 39, and 63, respectively;

(7) the 1st to 12th pixels composing the seventh row of said rectangular pattern are turned on 83, 67, 27, 2, 34, 58, 62, 38, 6, 31, 71, and 87, respectively; and (8) the 1st to 12th pixels composing the eighth row of said rectangular pattern are turned on 91, 75, 51, 19, 10, 42, 46, 14, 23, 55, 79, and 95, respectively.

In other words, the sequence of turning on the 96 pixels is determined in such a way that the pixels are turned on in the following manner:

(1) the 1st to 12th pixels composing the-first row of the rectangular pattern are turned on 4th, 20th, 44th, 76th, 81st, 49th, 53rd, 85th, 80th, 48th, 24th, and 8th, respectively;

(2) the 1st to 12th pixels composing the second row of the rectangular pattern are turned on 12th, 28th, 68th, 89th, 57th, 33rd, 37th, 61st, 93rd, 72nd, 32nd, and 16th, respectively;

(3) the 1st to 12th pixels composing the third row of the rectangular pattern are turned on 36th, 60th, 92nd, 65th, 25th, 9th, 13th, 29th, 69th, 96th, 64th, and 40th, respectively;

(4) the 1st to 12th pixels composing the fourth row of the rectangular pattern are turned on 52nd, 84th, 73rd, 41st, 17th, 1st, 5th, 21st, 45th, 77th, 88th, and 56th, respectively;

(5) the 1st to 12th pixels composing the fifth row of the rectangular pattern are turned on 54th, 86th, 79th, 47th, 23rd, 7th, 3rd, 19th, 43rd, 75th, 82nd, and 50th, respectively;

(6) the 1st to 12th pixels composing the sixth row of the rectangular pattern are turned on 38th, 62nd, 94th, 71st, 31st, 15th, 11th, 27th, 67th, 90th, 58th, and 34th, respectively;

(7) the 1st to 12th pixels composing the seventh row of the rectangular pattern are turned on 14th, 30th, 70th, 95th, 63rd, 39th, 35th, 59th, 91st, 66th, 26th, and 10th, respectively; and (8) the 1st to 12th pixels composing the eighth row of the rectangular pattern are turned on 6th, 22nd, 46th, 78th, 87th, 55th, 51st, 83rd, 74th, 42nd, 18th, and 2nd, respectively.

Figure 2B:

In binary-coding pattern 12a of FIG. 2, (a) and (b), the turning on of the pixels is carried out in descending numeric order, and thereby binary-coding pattern 12a functions as a dot clustered binary-coding pattern (binary-form dither matrix pattern; dither pattern).

Binary-coding pattern 12a is created in the following manner. A main pattern (rectangular pattern) composed of the pixels arranged in a matrix of 8 rows×12 columns is created. This main pattern can be subdivided into four tiled sub-patterns, two in the longitudinal direction by two in the width direction. Each of the sub-patterns is composed of 24 pixels arranged in a matrix of 4 rows×6 columns. The sequence of turning on the pixels is set in the following way, thereby creating binary-coding pattern 12a. In one of the sub-patterns, a pixel (not yet turned on) that is closest to a predetermined position (the center position of the main pattern in the present embodiment) in the main pattern and that is also adjacent to a turned-on pixel, if any, is turned on. After that, the turning-on process progresses to another one of the sub-patterns that is disposed symmetrically to the previous sub-pattern, which includes the pixel having been turned on most recently, with respect to the predetermined position. In this sub-pattern, a pixel which is disposed in a position corresponding to the most-recently-turned-on pixel is then turned on. These steps of turning-on processing will be repeated.

With use of binary-coding pattern 12a, it is possible to represent the pixel values (e.g., 0 to 255) of the individual pixels of an object multilevel image (original image) in 96 levels of gray.

In binary-coding pattern 12a, a single dot is composed of 40 pixels (the diagonally shaded part in FIG. 2) which are turned on 16th, 48th, 44th, 12th, 8th, 40th, 64th, 60th, 36th, 4th, 32nd, 72nd, 88th, 84th, 68th, 28th, 24th, 56th, 80th, 96th, 92nd, 76th, 52nd, 20th, 18th, 50th, 74th, 90th, 94th, 78th, 54th, 22nd, 26th, 66th, 82nd, 86th, 70th, 30th, 2nd, 34th, 58th, 62nd, 38th, 6th, 10th, 42nd, 46th, and 14th, respectively. Note that the numbers given to the pixels in the drawings indicate the positions of the respective pixels in the sequence of their being turned on. A group of pixels constituting a single output dot is called a unit pattern 12aa.

Using this unit pattern 12aa, it is possible to form output dots of 40 different sizes, from the smallest one in which only one of the pixels is turned on to the largest one in which all of the pixels are turned on.

This indicates that binary-coding pattern 12a allows a single dot to represent 40 differing levels of gray.

Gradation characteristics changing unit 13 converts the pixel value of each pixel of input image signals in accordance with a one-dimensional lookup table (see FIG. 3), which has been prepared in advance. FIG. 3 shows an example of the one-dimensional lookup table to be used by a printer of one embodiment of the present invention. Gradation characteristics changing unit 13 uses such a one-dimensional lookup table as shown in FIG. 3 to convert the pixel values of the pixels of input image signals, and transfers the resulting converted pixel values to data generating unit 14, thereby changing the turning-on sequence of output pixels (the printer pixels). In this manner, gradation characteristics changing unit 13 serves as a turning-on sequence changing section for changing the sequence of turning on the output pixels according to the look-up table.

At that time, using this lookup table, color material may be fixed concurrently onto plural pixels of binary-coding pattern 12a. Or otherwise, the color material may not be fixed.

Further, when changing the turning-on sequence based on the lookup table, the sequence may be set in such a way that color material is fixed onto a pixel adjacent to any turned-on pixel, onto which color material has already been fixed. As a result, the fixing of color material is facilitated, guaranteeing the improved quality of printed output.

Still further, though gradation characteristics changing unit 13 converts the pixel values of the input image signals according to the lookup table of FIG. 3 in the present embodiment, the present invention should by no means be limited to this, and various changes or modifications may be suggested without departing from the gist of the invention. For example, any other lookup table than that of FIG. 3 may be used by gradation characteristics changing unit 13, or the changing of the pixel values by gradation characteristics changing unit 13 may be omitted.

Dot data generating unit (binarizing unit) 14 converts multi-level image signals input from gradation characteristics changing unit 13 into binary form using binary-coding pattern 12a stored in pattern memory 12 so as to obtain data (dot data) for use in printing dots by image forming unit 15.

More precisely, dot data generating unit 14 compares the pixel value of each pixel of input image signals (for example, ranging from 0 through 255) with the threshold having been previously determined to obtain the number of output pixels which are to be turned on. After determining the to-be-turned-on number, dot data generating unit 14 generates dot data such that as many output pixels as the obtained number are turned on in accordance with the turning-on sequence set in binary-coding pattern 12a.

That is, dot data generating unit 14 selects (turns on) the pixels of binary-coding pattern 12a in accordance with the turning-on sequence set for the binary-coding pattern 12a. In FIG. 2(a) and FIG. 2(b), the pixels are selected (turned on) in descending numeric order, beginning from the start pixel (the pixel numbered 96) until the obtained to-be-turned-on number of pixels are turned on.

Image forming unit 15 prints the dot data generated by dot data generating unit 14. In an electrostatic printer, for example, an exposure device serves as image forming unit 15, and in that case, the data for use in exposure generated by dot data generating unit 14 serves as the dot data.

That is, dot data generating unit 14 converts the multi-level image expanded on image signal memory 11 into binary form, and image forming unit 15 forms an output image based on the conversion results.

In dot generating unit 1 of a printer of one embodiment of the present invention, binary-coding pattern 12a of FIG. 2(a) is prepared/provided in pattern memory 12 (providing step). Color operation unit 10 performs various types of processing, such as color correction, gradation correction, black printer formation, under color removal, and sharpness enhancement, on input image signals, and the resulting image signal is then expanded in image signal memory 11 (the expanding step for expanding a given multilevel image in a memory area). Gradation characteristics changing unit 13 of the printer performs pixel value conversion on the image signals expanded in image signal memory 11, as necessary.

After that, dot data generating unit 14 converts the image signal into binary form (binarizing step) using binary-coding pattern 12a stored in pattern memory 12, to create dot data, which is then input to image forming unit 15.

Figure 26:
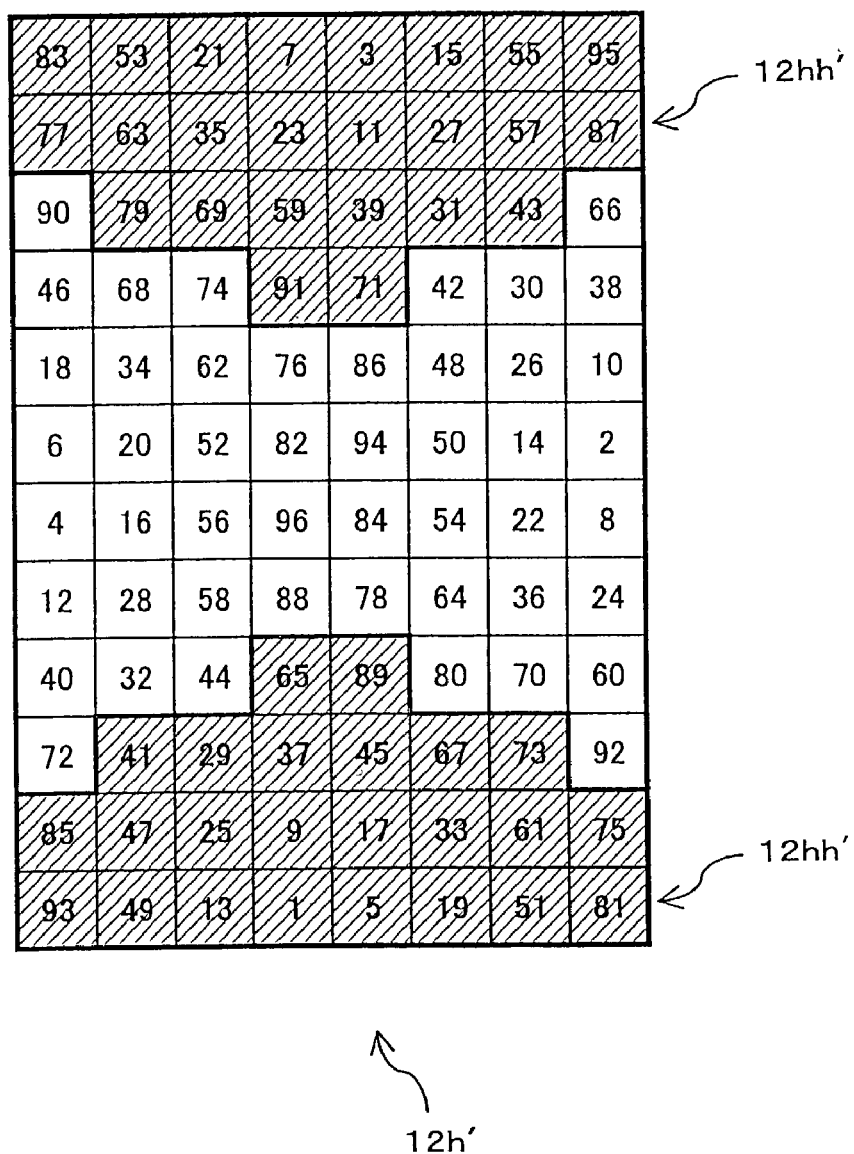
FIG. 26 is another modified example of a binary-coding dither matrix pattern used in a printing apparatus of the embodiment.
Figure 36:
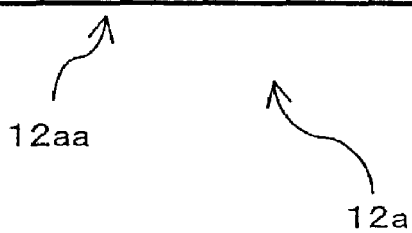
FIG. 36 is a view for describing binary-coding processing carried out in a printing apparatus of the embodiment.

FIG. 35 and FIG. 36 are views for describing binary-coding processing carried out in a printer of one embodiment of the present invention. These views show an example of the process of determining the pixels on which color material is to be formed. In FIG. 35, five pixels of binary-coding pattern 12a are turned on; in FIG. 26, twenty pixels of binary-coding pattern 12a are turned on. In these drawings, the selected (turned on) pixels are marked with circles.

As shown in FIG. 35 and FIG. 36, dot data generating unit 14 selects the pixels of binary-coding pattern 12a in accordance with the given turning-on sequence (in descending numerical order in the present embodiment), from the start pixel to the pixel which is given a predetermined sequence number, so that the pixels on which color material is to be formed are determined, thereby generating dot data. In accordance with the thus generated dot data, image forming unit 15 forms (prints) the image (image forming step).

In this manner, with a printer (binary-form dither matrix pattern) of one embodiment of the present invention, since dot-cluster-type printing is realized, it is possible to minimize moiré and other artifacts (artificial striped patterns) in printed output.

Further, since binary-coding pattern 12a is a rectangular pattern of 8×12 pixels, pattern memory 12 needs less capacity for recording binary-coding pattern 12a, so that binary-coding processing is increased in speed, and manufacturing costs of the printer can be reduced.

The present invention should by no means be limited to the above-illustrated embodiment, and various changes or modifications may be suggested without departing from the gist of the invention.

For example, though dot data generating unit 14 uses binary-coding pattern 12a of FIG. 2(a) in binary-coding processing, the present invention should by no means be limited to this, and various changes or modifications may be suggested without departing from the gist of the invention. FIGS. 4 through 18 show modified examples of binary-form dither matrix patterns used in a printing apparatus of one embodiment of the present invention. Dot data generating unit 14 can use any of binary-coding pattern 12b through binary-coding pattern 12p of FIG. 4 through FIG. 18, respectively, in binary-coding processing. Using binary-coding patterns 12b through 12h, it is possible to represent the pixel values (e.g., 0 to 255) of the pixels of an object multilevel image (original image) in 96 levels of gray. Using binary-coding pattern 12i through 12p, it is possible to represent the pixel values of the pixels of an object multilevel image (original image) in 576 levels of gray. For the sake of convenience, some of the unit patterns are diagonally shaded in FIG. 4 through FIG. 18.

Figure 4:
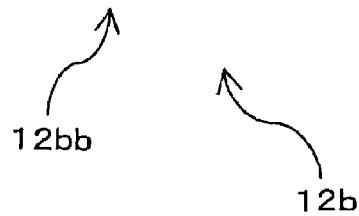
FIG. 4 is a modified example of a binary-form dither matrix pattern used in a printing apparatus of the embodiment.

Binary-coding pattern 12b of FIG. 4 is composed of 96 pixels arranged in a matrix of 8 rows×12 columns, and the sequence of turning on the pixels is set in such a way that dots grow keeping a roughly oval shape (the degree of flattening≈0.8). In unit pattern 12bb of binary-coding pattern 12b, two pixels that are disposed diametrically symmetrically to one another with respect to the center of the rectangular pattern, that is, the pixel numbered 96 and that numbered 94, are first turned on successively in this order. In binary-coding pattern 12b of FIG. 4, the 96 pixels are numbered in the following manner, and the turning on of the pixels is carried out in descending numeric order:

(1) the 1st to 12th pixels composing the first row of the rectangular pattern are numbered 93, 77, 45, 13, 24, 56, 52, 20, 9, 41, 73, and 89, respectively,;

(2) the 1st to 12th pixels composing the second row of the rectangular pattern are numbered 85, 61, 29, 8, 40, 72, 68, 36, 4, 25, 57, and 81, respectively;

(3) the 1st to 12th pixels composing the third row of the rectangular pattern are numbered 69, 37, 5, 32, 64, 88, 84, 60, 28, 1, 33, and 65, respectively;

(4) the 1st to 12th pixels composing the fourth row of the rectangular pattern are numbered 53, 21, 16, 48, 80, 96, 92, 76, 44, 12, 17, and 49, respectively;

(5) the 1st to 12th pixels composing the fifth row of the rectangular pattern are numbered 51, 19, 10, 42, 74, 90, 94, 78, 46, 14, 23, and 55, respectively;

(6) the 1st to 12th pixels composing the sixth row of the rectangular pattern are numbered 67, 35, 3, 26, 58, 82, 86, 62, 30, 7, 39, and 71, respectively;

(7) the 1st to 12th pixels composing the seventh row of the rectangular pattern are numbered 83, 59, 27, 2, 34, 66, 70, 38, 6, 31, 63, and 87, respectively; and (8) the 1st to 12th pixels composing the eighth row of the rectangular pattern are numbered 91, 75, 43, 11, 18, 50, 54, 22, 15, 47, 79, and 95, respectively.

In other words, the sequence of turning on the 96 pixels is determined in such a way that the pixels are turned on in the following manner:

(1) the 1st to 12th pixels composing the first row of the rectangular pattern are turned on 4th, 20th, 52nd, 84th, 73rd, 41st, 45th, 77th, 88th, 56th, 24th, and 8th, respectively;

(2) the 1st to 12th pixels composing the second row of the rectangular pattern are turned on 12th, 36th, 68th, 89th, 57th, 25th, 29th, 61st, 93rd, 72nd, 40th, and 16th, respectively;

(3) the 1st to 12th pixels composing the third row of the rectangular pattern are turned on 28th, 60th, 92nd, 65th, 33rd, 9th, 13th, 37th, 69th, 96th, 64th, and 32nd, respectively;

(4) the 1st to 12th pixels composing the fourth row of the rectangular pattern are turned on 44th, 76th, 81st, 49th, 17th, 1st, 5th, 21st, 53rd, 85th, 80th, and 48th, respectively;

(5) the 1st to 12th pixels composing the fifth row of the rectangular pattern are turned on 46th, 78th, 87th, 55th, 23rd, 7th, 3rd, 19th, 51st, 83rd, 74th, and 42nd, respectively;

(6) the 1st to 12th pixels composing the sixth row of the rectangular pattern are turned on 30th, 62nd, 94th, 71st, 39th, 15th, 11th, 35th, 67th, 90th, 58th, and 26th, respectively;

(7) the 1st to 12th pixels composing the seventh row of the rectangular pattern are turned on 14th, 38th, 70th, 95th, 63rd, 31st, 27th, 59th, 91st, 66th, 34th, and 10th, respectively; and (8) the 1st to 12th pixels composing the eighth row of the rectangular pattern are turned on 6th, 22nd, 54th, 86th, 79th, 47th, 43rd, 75th, 82nd, 50th, 18th, and 2nd, respectively.

Binary-coding pattern 12c of FIG. 5 is composed of 96 pixels arranged in a matrix of 12 rows×8 columns, and the sequence of turning on the pixels is set in such a way that dots having a roughly round shape grow substantially from the midpoint of each side of the rectangular pattern. In binary-coding pattern 12c, two pixels (the pixel numbered 96 and that numbered 94) that are disposed diametrically symmetrically to one another with respect to the center of the rectangular pattern (or the center of unit pattern 12cc which is formed when binary-coding patterns 12c are tiled both vertically and horizontally) are first turned on successively in this order. In binary-coding pattern 12c of FIG. 5, the 96 pixels are numbered in the following manner, and the turning on of the pixels is carried out in descending numeric order:

(1) the 1st to 8th pixels composing the first row of the rectangular pattern are numbered 14, 50, 82, 90, 94, 74, 42, and 2, respectively;

(2) the 1st to 8th pixels composing the second row of the rectangular pattern are numbered 30, 54, 66, 78, 86, 70, 22, and 6, respectively;

(3) the 1st to 8th pixels composing the third row of the rectangular pattern are numbered 11, 34, 26, 46, 58, 62, 38, and 19, respectively;

(4) the 1st to 8th pixels composing the fourth row of the rectangular pattern are numbered 47, 27, 35, 10, 18, 39, 63, and 59, respectively;

(5) the 1st to 8th pixels composing the fifth row of the rectangular pattern are numbered 79, 67, 55, 31, 7, 23, 71, and 87, respectively;

(6) the 1st to 8th pixels composing the sixth row of the rectangular pattern are numbered 91, 83, 51, 15, 3, 43, 75, and 95, respectively;

(7) the 1st to 8th pixels composing the seventh row of the rectangular pattern are numbered 93, 73, 41, 1, 13, 49, 81, and 89, respectively;

(8) the 1st to 8th pixels composing the eighth row of the rectangular pattern are numbered 85, 69, 21, 5, 29, 53, 65, and 77, respectively;

(9) the 1st to 8th pixels composing the ninth row of the rectangular pattern are numbered 57, 61, 37, 20, 12, 33, 25, and 45, respectively;

(10) the 1st to 8th pixels composing the 10th row of the rectangular pattern are numbered 17, 40, 64, 60, 48, 28, 36, and 9, respectively;

(11) the 1st to 8th pixels composing the 11th row of the rectangular pattern are numbered 8, 24, 72, 88, 80, 68, 56, and 32, respectively; and

(12) the 1st to 8th pixels composing the twelfth row of the rectangular pattern are numbered 4, 44, 76, 96, 92, 84, 52, and 16, respectively.

In other words, the sequence of turning on the 96 pixels is determined in such a way that the pixels are turned on in the following manner:

(1) the 1st to 8th pixels composing the first row of the rectangular pattern are turned on 83rd, 47th, 15th, 7th, 3rd, 23rd, 55th, and 95th, respectively;

(2) the 1st to 8th pixels composing the second row of the rectangular pattern are turned on 67th, 43rd, 31st, 19th, 11th, 27th, 75th, and 91st, respectively;

(3) the 1st to 8th pixels composing the third row of the rectangular pattern are turned on 86th, 63rd, 71st, 51st, 39th, 35th, 59th, and 78th, respectively;

(4) the 1st to 8th pixels composing the fourth row of the rectangular pattern are turned on 50th, 70th, 62nd, 87th, 79th, 58th, 34th, and 38th, respectively;

(5) the 1st to 8th pixels composing the fifth row of the rectangular pattern are turned on 18th, 30th, 42nd, 66th, 90th, 74th, 26th, and 10th, respectively;

(6) the 1st to 8th pixels composing the sixth row of the rectangular pattern are turned on 6th, 14th, 46th, 82nd, 94th, 54th, 22nd, and 2nd, respectively;

(7) the 1st to 8th pixels composing the seventh row of the rectangular pattern are turned on 4th, 24th, 56th, 96th, 84th, 48th, 16th, and 8th, respectively;

(8) the 1st to 8th pixels composing the eighth row of the rectangular pattern are turned on 12th, 28th, 76th, 92nd, 68th, 44th, 32nd, and 20th, respectively;

(9) the 1st to 8th pixels composing the ninth row of the rectangular pattern are turned on 40th, 36th, 60th, 77th, 85th, 64th, 72nd, and 52nd, respectively;

(10) the 1st to 8th pixels composing the 10th row of the rectangular pattern are turned on 80th, 57th, 33rd, 37th, 49th, 69th, 61st, and 88th, respectively;

(11) the 1st to 8th pixels composing the 11th row of the rectangular pattern are turned on 89th, 73rd, 25th, 9th, 17th, 29th, 41st, and 65th, respectively; and

(12) the 1st to 8th pixels composing the twelfth row of the rectangular pattern are turned on 93rd, 53rd, 21st, 1st, 5th, 13th, 45th, and 81st, respectively.

Binary-coding pattern 12d of FIG. 6 is composed of 96 pixels arranged in a matrix of 12 rows×8 columns, and the sequence of turning on the pixels is set in such a way that dots having a roughly oval shape (the degree of flattening≈0.8) grow substantially from the midpoint of each side of the rectangular pattern. In binary-coding pattern 12d, two pixels (the pixel numbered 96 and that numbered 94) that are disposed diametrically symmetrically to one another with respect to the center of the rectangular pattern (or the center of unit pattern 12dd which is formed when binary-form dither matrix patterns 12d are tiled both vertically and horizontally) are first turned on successively in this order. The 96 pixels are numbered in the following manner, and the turning on of the pixels is carried out in descending numeric order:

(1) the 1st to 8th pixels composing the first row of the rectangular pattern are numbered 14, 38, 74, 90, 94, 82, 42, and 2, respectively;

(2) the 1st to 8th pixels composing the second row of the rectangular pattern are numbered 18, 34, 62, 78, 86, 70, 46, and 10, respectively;

(3) the 1st to 8th pixels composing the third row of the rectangular pattern are numbered 7, 22, 26, 50, 58, 66, 54, and 31, respectively;

(4) the 1st to 8th pixels composing the fourth row of the rectangular pattern are numbered 51, 27, 23, 6, 30, 55, 67, and 59, respectively;

(5) the 1st to 8th pixels composing the fifth row of the rectangular pattern are numbered 79, 63, 35, 19, 11, 47, 71, and 87, respectively;

(6) the 1st to 8th pixels composing the sixth row of the rectangular pattern are numbered 91, 75, 39, 15, 3, 43, 83, and 95, respectively;

(7) the 1st to 8th pixels composing the seventh row of the rectangular pattern are numbered 93, 81, 41, 1, 13, 37, 73, and 89, respectively;

(8) the 1st to 8th pixels composing the eighth row of the rectangular pattern are numbered 85, 69, 45, 9, 17, 33, 61, and 77, respectively;

(9) the 1st to 8th pixels composing the ninth row of the rectangular pattern are numbered 57, 65, 53, 32, 8, 21, 25, and 49, respectively;

(10) the 1st to 8th pixels composing the 10th row of the rectangular pattern are numbered 29, 56, 68, 60, 52, 28, 24, and 5, respectively;

(11) the 1st to 8th pixels composing the 11th row of the rectangular pattern are numbered 12, 48, 72, 88, 80, 64, 36, and 20, respectively; and

(12) the 1st to 8th pixels composing the twelfth row of the rectangular pattern are numbered 4, 44, 84, 96, 92, 76, 40, and 16, respectively.

In other words, the sequence of turning on the 96 pixels is determined in such a way that the pixels are turned on in the following manner:

(1) the 1st to 8th pixels composing the first row of the rectangular pattern are turned on 83rd, 59th, 23rd, 7th, 3rd, 15th, 55th, and 95th, respectively;

(2) the 1st to 8th pixels composing the second row of the rectangular pattern are turned on 79th, 63rd, 35th, 19th, 11th, 27th, 51st, and 87th, respectively;

(3) the 1st to 8th pixels composing the third row of the rectangular pattern are turned on 90th, 75th, 71st, 47th, 39th, 31st, 43rd, and 66th, respectively;

(4) the 1st to 8th pixels composing the fourth row of the rectangular pattern are turned on 46th, 70th, 74th, 91st, 67th, 42nd, 30th, and 38th, respectively;

(5) the 1st to 8th pixels composing the fifth row of the rectangular pattern are turned on 18th, 34th, 62nd, 78th, 86th, 50th, 26th, and 10th, respectively;

(6) the 1st to 8th pixels composing the sixth row of the rectangular pattern are turned on 6th, 22nd, 58th, 82nd, 94th, 54th, 14th, and 2nd, respectively;

(7) the 1st to 8th pixels composing the seventh row of the rectangular pattern are turned on 4th, 16th, 56th, 96th, 84th, 60th, 24th, and 8th, respectively;

(8) the 1st to 8th pixels composing the eighth row of the rectangular pattern are turned on 12th, 28th, 52nd, 88th, 80th, 64th, 36th, and 20th, respectively;

(9) the 1st to 8th pixels composing the ninth row of the rectangular pattern are turned on 40th, 32nd, 44th, 65th, 89th, 76th, 72nd, and 48th, respectively;

(10) the 1st to 8th pixels composing the 10th row of the rectangular pattern are turned on 68th, 41st, 29th, 37th, 45th, 69th, 73rd, and 92nd, respectively;

(11) the 1st to 8th pixels composing the 11th row of the rectangular pattern are turned on 85th, 49th, 25th, 9th, 17th, 33rd, 61st, and 77th, respectively; and

(12) the 1st to 8th pixels composing the twelfth row of the rectangular pattern are turned on 93rd, 53rd, 13th, 1st, 5th, 21st, 57th, and 81st, respectively.

Figure 7:
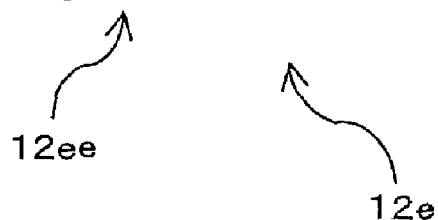
FIG. 7 is a modified example of a binary-form dither matrix pattern used in a printing apparatus of the embodiment.

Binary-coding pattern 12e of FIG. 7 is composed of 96 pixels arranged in a matrix of 8 rows×12 columns, and the sequence of turning on the pixels is set in such a way that dots grow keeping a roughly round shape. In unit pattern 12ee of binary-coding pattern 12e, two pixels (the pixel numbered 96 and that numbered 94) that adjoin one another and are disposed adjacently to the center of the rectangular pattern, are first turned on successively in this order. The 96 pixels are numbered in the following manner, and the turning on of the pixels is carried out in descending numeric order:

(1) the 1st to 12th pixels composing the first row of the rectangular pattern are numbered 89, 77, 53, 29, 16, 48, 46, 14, 31, 55, 79, and 91, respectively;

(2) the 1st to 12th pixels composing the second row of the rectangular pattern are numbered 73, 65, 25, 8, 44, 64, 62, 42, 6, 27, 67, and 75, respectively;

(3) the 1st to 12th pixels composing the third row of the rectangular pattern are numbered 49, 21, 1, 40, 72, 88, 86, 70, 38, 3, 23, 51, respectively;

(4) the 1st to 12th pixels composing the fourth row of the rectangular pattern are numbered 17, 9, 36, 60, 84, 96, 94, 82, 58, 34, 11, and 19, respectively;

(5) the 1st to 12th pixels composing the fifth row of the rectangular pattern are numbered 45, 13, 32, 56, 80, 92, 90, 78, 54, 30, 15, and 47, respectively;

(6) the 1st to 12th pixels composing the sixth row of the rectangular pattern are numbered 61, 41, 5, 28, 68, 76, 74, 66, 26, 7, 43, and 63, respectively;

(7) the 1st to 12th pixels composing the seventh row of the rectangular pattern are numbered 85, 69, 37, 4, 24, 52, 50, 22, 2, 39, 71, and 87, respectively; and (8) the 1st to 12th pixels composing the eighth row of the rectangular pattern are numbered 93, 81, 57, 33, 12, 20, 18, 10, 35, 59, 83, and 95, respectively.

In other words, the sequence of turning on the 96 pixels is determined in such a way that the pixels are turned on in the following manner:

(1) the 1st to 12th pixels composing the first row of the rectangular pattern are turned on 8th, 20th, 44th, 68th, 81st, 49th, 51st, 83rd, 66th, 42nd, 18th, and 6th, respectively;

(2) the 1st to 12th pixels composing the second row of the rectangular pattern are turned on 24th, 32nd, 72nd, 89th, 53rd, 33rd, 35th, 55th, 91st, 70th, 30th, and 22nd, respectively;

(3) the 1st to 12th pixels composing the third row of the rectangular pattern are turned on 48th, 76th, 96th, 57th, 25th, 9th, 11th, 27th, 59th, 94th, 74th, and 46th, respectively;

(4) the 1st to 12th pixels composing the fourth row of the rectangular pattern are turned on 80th, 88th, 61st, 37th, 13th, 1st, 3rd, 15th, 39th, 63rd, 86th, and 78th, respectively;

(5) the 1st to 12th pixels composing the fifth row of the rectangular pattern are turned on 52nd, 84th, 65th, 41sy, 17th, 5th, 7th, 19th, 43rd, 67th, 82nd, and 50th, respectively;

(6) the 1st to 12th pixels composing the sixth row of the rectangular pattern are turned on 36th, 56th, 92nd, 69th, 29th, 21st, 23rd, 31st, 71st, 90th, 54th, and 34th, respectively;

(7) the 1st to 12th pixels composing the seventh row of the rectangular pattern are turned on 12th, 28th, 60th, 93rd, 73rd, 45th, 47th, 75th, 95th, 58th, 26th, and 10th, respectively; and (8) the 1st to 12th pixels composing the eighth row of the rectangular pattern are turned on 4th, 16th, 40th, 64th, 85th, 77th, 79th, 87th, 62nd, 38th, 14th, and 2nd, respectively.

Figure 8:
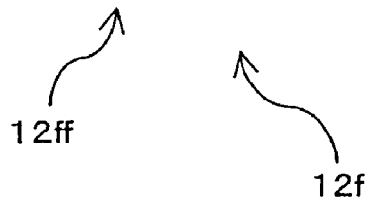
FIG. 8 is a modified example of a binary-form dither matrix pattern used in a printing apparatus of the embodiment.

Binary-coding pattern 12f of FIG. 8 is composed of 96 pixels arranged in a matrix of 8 rows×12 columns, and the sequence of turning on the pixels is set in such a way that dots grows keeping a roughly oval shape (the degree of flattening≈0.8). In the unit pattern 12ff of binary-coding pattern 12f, two pixels (the pixel numbered 96 and that numbered 94) that adjoin one another and are disposed adjacently to the center of the rectangular pattern, are first turned on successively in this order. In binary-coding pattern 12f of FIG. 8, the 96 pixels are numbered in the following manner, and the turning on of the pixels is carried out in descending numeric order:

(1) the 1st to 12th pixels composing the first row of the rectangular pattern are numbered 89, 73, 41, 9, 24, 56, 54, 22, 11, 43, 75, and 91, respectively;

(2) the 1st to 12th pixels composing the second row of the rectangular pattern are numbered 81, 61, 25, 8, 40, 72, 70, 38, 6, 27, 63, and 83, respectively;

(3) the 1st to 12th pixels composing the third row of the rectangular pattern are numbered 57, 33, 1, 32, 68, 88, 86, 66, 30, 3, 35, and 59, respectively;

(4) the 1st to 12th pixels composing the fourth row of the rectangular pattern are numbered 49, 17, 16, 48, 80, 96, 94, 78, 46, 14, 19, and 51, respectively;

(5) the 1st to 12th pixels composing the fifth row of the rectangular pattern are numbered 53, 21, 12, 44, 76, 92, 90, 74, 42, 10, 23, and 55, respectively;

(6) the 1st to 12th pixels composing the sixth row of the rectangular pattern are numbered 69, 37, 5, 28, 64, 84, 82, 62, 26, 7, 39, and 71, respectively;

(7) the 1st to 12th pixels composing the seventh row of the rectangular pattern are numbered 85, 65, 29, 4, 36, 60, 58, 34, 2, 31, 67, and 87, respectively; and (8) the 1st to 12th pixels composing the eighth row of the rectangular pattern are numbered 93, 77, 45, 13, 20, 52, 50, 18, 15, 47, 79, and 95, respectively.

In other words, the sequence of turning on the 96 pixels is determined in such a way that the pixels are turned on in the following manner:

(1) the 1st to 12th pixels composing the first row of the rectangular pattern are turned on 8th, 24th, 56th, 88th, 73rd, 41st, 43rd, 75th, 86th, 54th, 22nd, and 6th, respectively;

(2) the 1st to 12th pixels composing the second row of the rectangular pattern are turned on 16th, 36th, 72nd, 89th, 57th, 25th, 27th, 59th, 91st, 70th, 34th, and 14th, respectively;

(3) the 1st to 12th pixels composing the third row of the rectangular pattern are turned on 40th, 64th, 96th, 65th, 29th, 9th, 11th, 31st, 67th, 94th, 62nd, and 38th, respectively;

(4) the 1st to 12th pixels composing the fourth row of the rectangular pattern are turned on 48th, 80th, 81st, 49th, 17th, 1st, 3rd, 19th, 51st, 83rd, 78th, and 46th, respectively;

(5) the 1st to 12th pixels composing the fifth row of the rectangular pattern are turned on 44th, 76th, 85th, 53rd, 21st, 5th, 7th, 23rd, 55th, 87th, 74th, and 42nd, respectively;

(6) the 1st to 12th pixels composing the sixth row of the rectangular pattern are turned on 28th, 60th, 92nd, 69th, 33rd, 13th, 15th, 35th, 71st, 90th, 58th, and 26th, respectively;

(7) the 1st to 12th pixels composing the seventh row of the rectangular pattern are turned on 12th, 32nd, 68th, 93rd, 61st, 37th, 39th, 63rd, 95th, 66th, 30th, and 10th, respectively; and (8) the 1st to 12th pixels composing the eighth row of the rectangular pattern are turned on 4th, 20th, 52nd, 84th, 77th, 45th, 47th, 79th, 82nd, 50th, 18th, and 2nd, respectively.

Figure 9:
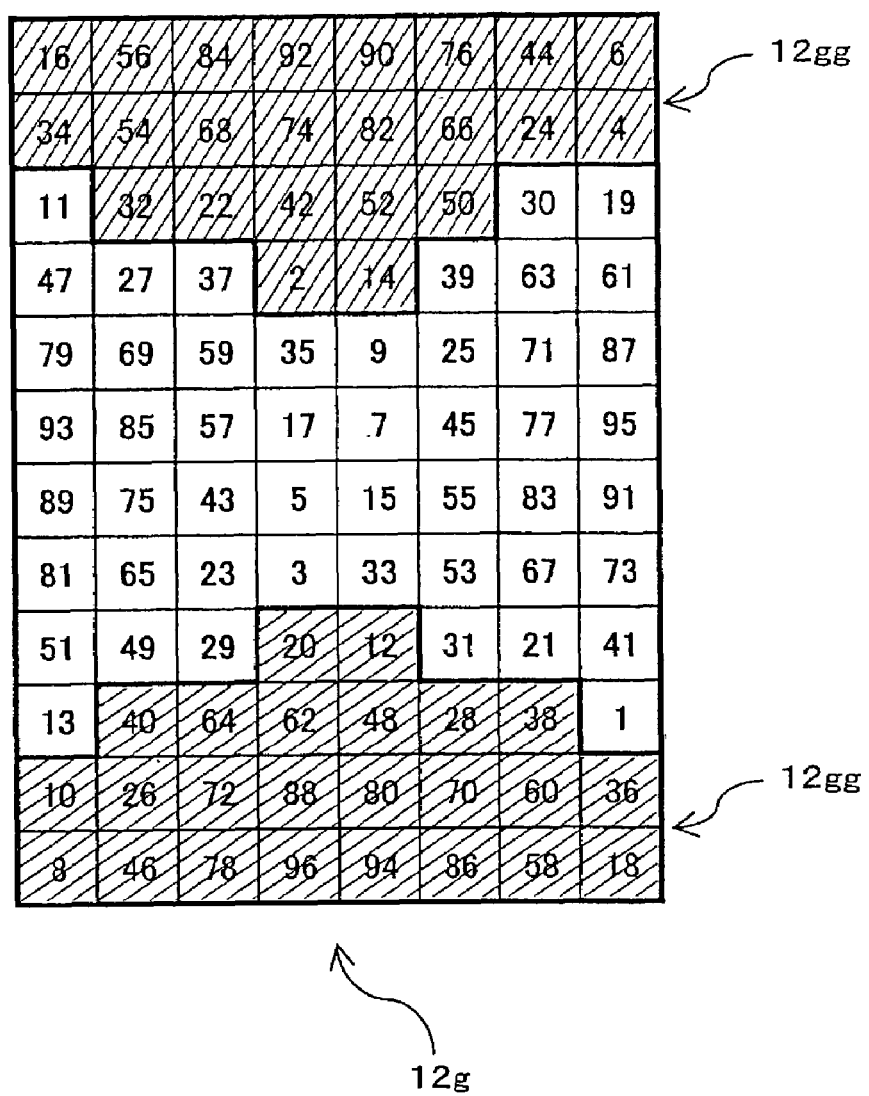
FIG. 9 is a modified example of a binary-form dither matrix pattern used in a printing apparatus of the embodiment.

Binary-coding pattern 12*g* of FIG. 9 is composed of 96 pixels arranged in a matrix of 12 rows×8 columns, and the sequence of turning on the pixels is set in such a way that dots having a roughly round shape grow substantially from the midpoint of each side of the rectangular pattern. In unit pattern 12*gg* of binary-coding pattern 12*g*, which unit pattern 12*gg* is formed when binary-coding patterns 12*g* are tiled both vertically and horizontally, two pixels (the pixel numbered 96 and that numbered 94) that adjoin one another and are disposed adjacently to the center of unit pattern 12*gg*, are first turned on successively in this order. In binary-coding pattern 12*g* of FIG. 9, the 96 pixels are numbered in the following manner, and the turning on of the pixels is carried out in descending numeric order:

(1) the 1st to 8th pixels composing the first row of the rectangular pattern are numbered 16, 56, 84, 92, 90, 76, 44, and 6, respectively;

(2) the 1st to 8th pixels composing the second row of the rectangular pattern are numbered 34, 54, 68, 74, 82, 66, 24, and 4, respectively;

(3) the 1st to 8th pixels composing the third row of the rectangular pattern are numbered 11, 32, 22, 42, 52, 50, 30, and 19, respectively;

(4) the 1st to 8th pixels composing the fourth row of the rectangular pattern are numbered 47, 27, 37, 2, 14, 39, 63, and 61, respectively;

(5) the 1st to 8th pixels composing the fifth row of the rectangular pattern are numbered 79, 69, 59, 35, 9, 25, 71, and 87, respectively;

(6) the 1st to 8th pixels composing the sixth row of the rectangular pattern are numbered 93, 85, 57, 17, 7, 45, 77, and 95, respectively;

(7) the 1st to 8th pixels composing the seventh row of the rectangular pattern are numbered 89, 75, 43, 5, 15, 55, 83, and 91, respectively;

(8) the 1st to 8th pixels composing the eighth row of the rectangular pattern are numbered 81, 65, 23, 3, 33, 53, 67, and 73, respectively;

(9) the 1st to 8th pixels composing the ninth row of the rectangular pattern are numbered 51, 49, 29, 20, 12, 31, 21, and 41, respectively;

(10) the 1st to 8th pixels composing the 10th row of the rectangular pattern are numbered 13, 40, 64, 62, 48, 28, 38, and 1, respectively;

(11) the 1st to 8th pixels composing the 11th row of the rectangular pattern are numbered 10, 26, 72, 88, 80, 70, 60, and 36, respectively; and

(12) the 1st to 8th pixels composing the twelfth row of the rectangular pattern are numbered 8, 46, 78, 96, 94, 86, 58, and 18, respectively.

In other words, the sequence of turning on the 96 pixels is determined in such a way that the pixels are turned on in the following manner:

(1) the 1st to 8th pixels composing the first row of the rectangular pattern are turned on 81st, 41st, 13th, 5th, 7th, 21st, 53rd, and 91st, respectively;

(2) the 1st to 8th pixels composing the second row of the rectangular pattern are turned on 63rd, 43rd, 29th, 23rd, 15th, 31st, 73rd, and 93rd, respectively;

(3) the 1st to 8th pixels composing the third row of the rectangular pattern are turned on 86th, 65th, 75th, 55th, 45th, 47th, 67th, and 78th, respectively;

(4) the 1st to 8th pixels composing the fourth row of the rectangular pattern are turned on 50th, 70th, 60th, 95th, 83rd, 58th, 34th, and 36th, respectively;

(5) the 1st to 8th pixels composing the fifth row of the rectangular pattern are turned on 18th, 28th, 38th, 62nd, 88th, 72nd, 26th, and 10th, respectively;

(6) the 1st to 8th pixels composing the sixth row of the rectangular pattern are turned on 4th, 12th, 40th, 80th, 90th, 52nd, 20th, and 2nd, respectively;

(7) the 1st to 8th pixels composing the seventh row of the rectangular pattern are turned on 8th, 22nd, 54th, 92nd, 82nd, 42nd, 14th, 6th, respectively;

(8) the 1st to 8th pixels composing the eighth row of the rectangular pattern are turned on 16th, 32nd, 74th, 94th, 64th, 44th, 30th, and 24th, respectively;

(9) the 1st to 8th pixels composing the ninth row of the rectangular pattern are turned on 46th, 48th, 68th, 77th, 85th, 66th, 76th, and 56th, respectively;

(10) the 1st to 8th pixels composing the 10th row of the rectangular pattern are turned on 84th, 57th, 33rd, 35th, 49th, 69th, 59th, and 96th, respectively;

(11) the 1st to 8th pixels composing the 11th row of the rectangular pattern are turned on 87th, 71st, 25th, 9th, 17th, 27th, 37th, and 61st, respectively; and

(12) the 1st to 8th pixels composing the twelfth row of the rectangular pattern are turned on 89th, 51st, 19th, 1st, 3rd, 11th, 39th, and 79th, respectively.

Figure 10:
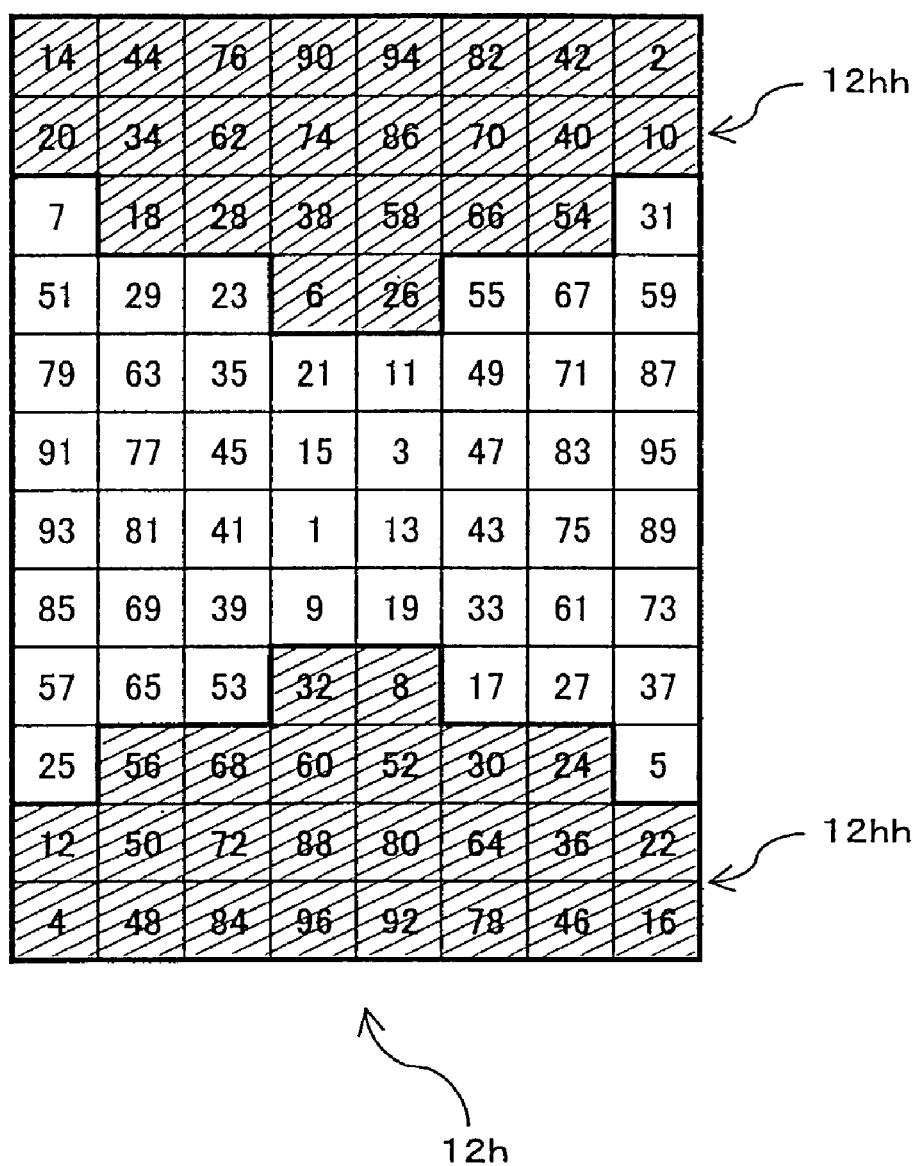
FIG. 10 is a modified example of a binary-form dither matrix pattern used in a printing apparatus of the embodiment.

Binary-coding pattern 12*h* of FIG. 10 is composed of 96 pixels arranged in a matrix of 12 rows×8 columns, and the sequence of turning on the pixels is set in such a way that dots having a roughly oval shape (the degree of flattening≈0.8) grow substantially from the midpoint of each side of the rectangular pattern. In the unit pattern 12*hh* of binary-coding pattern 12*h*, which unit pattern is formed when binary-form dither matrix patterns 12*h* are tiled both vertically and horizontally, two pixels (the pixel numbered 96 and that numbered 94) that adjoin one another and are disposed adjacently to the center of unit pattern 12*hh*, are first turned on successively in this order. In binary-coding pattern 12*h* of FIG. 10, the 96 pixels are numbered in the following manner, and the turning on of the pixels is carried out in descending numeric order:

(1) the 1st to 8th pixels composing the first row of the rectangular pattern are numbered 14, 44, 76, 90, 94, 82, 42, and 2, respectively;

(2) the 1st to 8th pixels composing the second row of the rectangular pattern are numbered 20, 34, 62, 74, 86, 70, 40, and 10, respectively;

(3) the 1st to 8th pixels composing the third row of the rectangular pattern are numbered 7, 18, 28, 38, 58, 66, 54, and 31, respectively;

(4) the 1st to 8th pixels composing the fourth row of the rectangular pattern are numbered 51, 29, 23, 6, 26, 55, 67, and 59, respectively;

(5) the 1st to 8th pixels composing the fifth row of the rectangular pattern are numbered 79, 63, 35, 21, 11, 49, 71, and 87, respectively;

(6) the 1st to 8th pixels composing the sixth row of the rectangular pattern are numbered 91, 77, 45, 15, 3, 47, 83, and 95, respectively;

(7) the 1st to 8th pixels composing the seventh row of the rectangular pattern are numbered 93, 81, 41, 1, 13, 43, 75, and 89, respectively;

(8) the 1st to 8th pixels composing the eighth row of the rectangular pattern are numbered 85, 69, 39, 9, 19, 33, 61, and 73, respectively;

(9) the 1st to 8th pixels composing the ninth row of the rectangular pattern are numbered 57, 65, 53, 32, 8, 17, 27, and 37, respectively;

(10) the 1st to 8th pixels composing the 10th row of the rectangular pattern are numbered 25, 56, 68, 60, 52, 30, 24, and 5, respectively;

(11) the 1st to 8th pixels composing the 11th row of the rectangular pattern are numbered 12, 50, 72, 88, 80, 64, 36, and 22, respectively; and

(12) the 1st to 8th pixels composing the twelfth row of the rectangular pattern are numbered 4, 48, 84, 96, 92, 78, 46, and 16, respectively.

In other words, the sequence of turning on the 96 pixels is determined in such a way that the pixels are turned on in the following manner:

(1) the 1st to 8th pixels composing the first row of the rectangular pattern are turned on 83rd, 53rd, 21st, 7th, 3rd, 15th, 55th, and 95th, respectively;

(2) the 1st to 8th pixels composing the second row of the rectangular pattern are turned on 77th, 63rd, 35th, 23rd, 11th, 27th, 57th, and 87th, respectively;

(3) the 1st to 8th pixels composing the third row of the rectangular pattern are turned on 90th, 79th, 69th, 59th, 39th, 31st, 43rd, and 66th, respectively;

(4) the 1st to 8th pixels composing the fourth row of the rectangular pattern are turned on 46th, 68th, 74th, 91st, 71st, 42nd, 30th, and 38th, respectively;

(5) the 1st to 8th pixels composing the fifth row of the rectangular pattern are turned on 18th, 34th, 62nd, 76th, 86th, 48th, 26th, and 10th, respectively;

(6) the 1st to 8th pixels composing the sixth row of the rectangular pattern are turned on 6th, 20th, 52nd, 82nd, 94th, 50th, 14th, and 2nd, respectively;

(7) the 1st to 8th pixels composing the seventh row of the rectangular pattern are turned on 4th, 16th, 56th, 96th, 84th, 54th, 22nd, and 8th, respectively;

(8) the 1st to 8th pixels composing the eighth row of the rectangular pattern are turned on 12th, 28th, 58th, 88th, 78th, 64th, 36th, and 24th, respectively;

(9) the 1st to 8th pixels composing the ninth row of the rectangular pattern are turned on 40th, 32nd, 44th, 65th, 89th, 80th, 70th, and 60th, respectively;

(10) the 1st to 8th pixels composing the 10th row of the rectangular pattern are turned on 72nd, 41st, 29th, 37th, 45th, 67th, 73rd, and 92nd, respectively;

(11) the 1st to 8th pixels composing the 11th row of the rectangular pattern are turned on 85th, 47th, 25th, 9th, 17th, 33rd, 61st, and 75th, respectively; and

(12) the 1st to 8th pixels composing the twelfth row of the rectangular pattern are turned on 93rd, 49th, 13th, 1st, 5th, 19th, 51st, and 81st, respectively.

Binary-coding pattern 12*i* of FIG. 11 is composed of 576 pixels arranged in a matrix of 24 rows×24 columns, and has substantially the same construction as that which is obtained by tiling binary-form dither matrix patterns 12*a* of FIG. 2, (*a*) and (*b*), both vertically and horizontally. In binary-coding pattern 12*i*, the sequence of turning on the pixels is set in such a way that dots having a roughly round shape grow in every rectangular pattern. In each unit pattern 12*ii* of binary-coding pattern 12*i*, two pixels (for example, the pixel numbered 576 and that numbered 563) that adjoin one another and are disposed adjacently to the center of unit pattern 12*ii*, are first turned on successively. In binary-coding pattern 12*i* of FIG. 11, the 576 pixels are numbered in the following manner, and the turning on of the pixels is carried out in descending numeric order:

(1) the 1st to 24th pixels composing the first row of the rectangular pattern are numbered 260, 68, 98, 290, 434, 530, 554, 458, 314, 122, 92, 284, 261, 69, 99, 291, 435, 531, 555, 459, 315, 123, 93, and 285, respectively;

(2) the 1st to 24th pixels composing the second row of the rectangular pattern are numbered 356, 212, 20, 146, 386, 482, 506, 410, 170, 44, 236, 380, 357, 213, 21, 147, 387, 483, 507, 411, 171, 45, 237, and 381, respectively;

(3) the 1st to 24th pixels composing the third row of the rectangular pattern are numbered 500, 404, 164, 2, 194, 338, 362, 218, 26, 188, 428, 524, 501, 405, 165, 3, 195, 339, 363, 219, 27, 189, 429, and 525, respectively;

(4) the 1st to 24th pixels composing the fourth row of the rectangular pattern are numbered 548, 452, 308, 116, 50, 242, 266, 74, 140, 332, 476, 572, 549, 453, 309, 117, 51, 243, 267, 75, 141, 333, 477, and 573, respectively;

(5) the 1st to 24th pixels composing the fifth row of the rectangular pattern are numbered 560, 464, 320, 128, 86, 278, 254, 62, 104, 296, 440, 536, 561, 465, 321, 129, 87, 279, 255, 63, 105, 297, 441, and 537, respectively;

(6) the 1st to 24th pixels composing the sixth row of the rectangular pattern are numbered 512, 416, 176, 38, 230, 374, 350, 206, 14, 152, 392, 488, 513, 417, 177, 39, 231, 375, 351, 207, 15, 153, 393, and 489, respectively;

(7) the 1st to 24th pixels composing the seventh row of the rectangular pattern are numbered 368, 224, 32, 182, 422, 518, 494, 398, 158, 8, 200, 344, 369, 225, 33, 183, 423, 519, 495, 399, 159, 9, 201, and 345, respectively;

(8) the 1st to 24th pixels composing the eighth row of the rectangular pattern are numbered 272, 80, 134, 326, 470, 566, 542, 446, 302, 110, 56, 248, 273, 81, 135, 327, 471, 567, 543, 447, 303, 111, 57, and 249, respectively;

(9) the 1st to 24th pixels composing the ninth row of the rectangular pattern are numbered 264, 72, 102, 294, 438, 534, 558, 462, 318, 126, 96, 288, 263, 71, 101, 293, 437, 533, 557, 461, 317, 125, 95, and 287, respectively;

(10) the 1st to 24th pixels composing the 10th row of the rectangular pattern are numbered 360, 216, 24, 150, 390, 486, 510, 414, 174, 48, 240, 384, 359, 215, 23, 149, 389, 485, 509, 413, 173, 47, 239, and 383, respectively;

(11) the 1st to 24th pixels composing the 11th row of the rectangular pattern are numbered 504, 408, 168, 6, 198, 342, 366, 222, 30, 192, 432, 528, 503, 407, 167, 5, 197, 341, 365, 221, 29, 191, 431, and 527, respectively;

(12) the 1st to 24th pixels composing the twelfth row of the rectangular pattern are numbered 552, 456, 312, 120, 54, 246, 270, 78, 144, 336, 480, 576, 551, 455, 311, 119, 53, 245, 269, 77, 143, 335, 479, and 575, respectively;

(13) the 1st to 24th pixels composing the 13th row of the rectangular pattern are numbered 564, 468, 324, 132, 90, 282, 258, 66, 108, 300, 444, 540, 563, 467, 323, 131, 89, 281, 257, 65, 107, 299, 443, and 539, respectively;

(14) the 1st to 24th pixels composing the 14th row of the rectangular pattern are numbered 516, 420, 180, 42, 234, 378, 354, 210, 18, 156, 396, 492, 515, 419, 179, 41, 233, 377, 353, 209, 17, 155, 395, and 491, respectively;

(15) the 1st to 24th pixels composing the 15th row of the rectangular pattern are numbered 372, 228, 36, 186, 426, 522, 498, 402, 162, 12, 204, 348, 371, 227, 35, 185, 425, 521, 497, 401, 161, 11, 203, and 347, respectively;

(16) the 1st to 24th pixels composing the 16th row of the rectangular pattern are numbered 276, 84, 138, 330, 474, 570, 546, 450, 306, 114, 60, 252, 275, 83, 137, 329, 473, 569, 545, 449, 305, 113, 59, and 251, respectively;

(17) the 1st to 24th pixels composing the 17th row of the rectangular pattern are numbered 262, 70, 100, 292, 436, 532, 556, 460, 316, 124, 94, 286, 259, 67, 97, 289, 433, 529, 553, 457, 313, 121, 91, and 283, respectively;

(18) the 1st to 24th pixels composing the 18th row of the rectangular pattern are numbered 358, 214, 22, 148, 388, 484, 508, 412, 172, 46, 238, 382, 355, 211, 19, 145, 385, 481, 505, 409, 169, 43, 235, and 379, respectively;

(19) the 1st to 24th pixels composing the 19th row of the rectangular pattern are numbered 502, 406, 166, 4, 196, 340, 364, 220, 28, 190, 430, 526, 499, 403, 163, 1, 193, 337, 361, 217, 25, 187, 427, and 523, respectively;

(20) the 1st to 24th pixels composing the 20th row of the rectangular pattern are numbered 550, 454, 310, 118, 52, 244, 268, 76, 142, 334, 478, 574, 547, 451, 307, 115, 49, 241, 265, 73, 139, 331, 475, and 571, respectively;

(21) the 1st to 24th pixels composing the 21st row of the rectangular pattern are numbered 562, 466, 322, 130, 88, 280, 256, 64, 106, 298, 442, 538, 559, 463, 319, 127, 85, 277, 253, 61, 103, 295, 439, and 535, respectively;

(22) the 1st to 24th pixels composing the 22nd row of the rectangular pattern are numbered 514, 418, 178, 40, 232, 376, 352, 208, 16, 154, 394, 490, 511, 415, 175, 37, 229, 373, 349, 205, 13, 151, 391, and 487, respectively;

(23) the 1st to 24th pixels composing the 23rd row of the rectangular pattern are numbered 370, 226, 34, 184, 424, 520, 496, 400, 160, 10, 202, 346, 367, 223, 31, 181, 421, 517, 493, 397, 157, 7, 199, and 343, respectively; and

(24) the 1st to 24th pixels composing the 24th row of the rectangular pattern are numbered 274, 82, 136, 328, 472, 568, 544, 448, 304, 112, 58, 250, 271, 79, 133, 325, 469, 565, 541, 445, 301, 109, 55, and 247, respectively.

In other words, the sequence of turning on the 576 pixels is determined in such a way that the pixels are turned on in the following manner:

(1) the 1st to 24th pixels composing the first row of the rectangular pattern are turned on 317th, 509th, 479th, 287th, 143rd, 47th, 23rd, 119th, 263rd, 455th, 485th, 293rd, 316th, 508th, 478th, 286th, 142nd, 46th, 22nd, 118th, 262nd, 454th, 484th, and 292nd, respectively;

(2) the 1st to 24th pixels composing the second row of the rectangular pattern are turned on 221st, 365th, 557th, 431st, 191st, 95th, 71st, 167th, 407th, 533rd, 341st, 197th, 220th, 364th, 556th, 430th, 190th, 94th, 70th, 166th, 406th, 532nd, 340th, and 196th, respectively;

(3) the 1st to 24th pixels composing the third row of the rectangular pattern are turned on 77th, 173rd, 413th, 575th, 383rd, 239th, 215th, 359th, 551st, 389th, 149th, 53rd, 76th, 172nd, 412th, 574th, 382nd, 238th, 214th, 358th, 550th, 388th, 148th, 52nd, respectively;

(4) the 1st to 24th pixels composing the fourth row of the rectangular pattern are turned on 29th, 125th, 269th, 461st, 527th, 335th, 311th, 503rd, 437th, 245th, 101st, 5th, 28th, 124th, 268th, 460th, 526th, 334th, 310th, 502nd, 436th, 244th, 100th, and 4th, respectively;

(5) the 1st to 24th pixels composing the fifth row of the rectangular pattern are turned on 17th, 113th, 257th, 449th, 491st, 299th, 323rd, 515th, 473rd, 281st, 137th, 41st, 16th, 112th, 256th, 448th, 490th, 298th, 322nd, 514th, 472nd, 280th, 136th, and 40th, respectively;

(6) the 1st to 24th pixels composing the sixth row of the rectangular pattern are turned on 65th, 161st, 401st, 539th, 347th, 203rd, 227th, 371st, 563rd, 425th, 185th, 89th, 64th, 160th, 400th, 538th, 346th, 202nd, 226th, 370th, 562nd, 424th, 184th, and 88th, respectively;

(7) the 1st to 24th pixels composing the seventh row of the rectangular pattern are turned on 209th, 353rd, 545th, 395th, 155th, 59th, 83rd, 179th, 419th, 569th, 377th, 233rd, 208th, 352nd, 544th, 394th, 154th, 58th, 82nd, 178th, 418th, 568th, 376th, and 232nd, respectively;

(8) the 1st to 24th pixels composing the eighth row of the rectangular pattern are turned on 305th, 497th, 443rd, 251st, 107th, 11th, 35th, 131st, 275th, 467th, 521st, 329th, 304th, 496th, 442nd, 250th, 106th, 10th, 34th, 130th, 274th, 466th, 520th, and 328th, respectively;

(9) the 1st to 24th pixels composing the ninth row of the rectangular pattern are turned on 313th, 505th, 475th, 283rd, 139th, 43rd, 19th, 115th, 259th, 451st, 481st, 289th, 314th, 506th, 476th, 284th, 140th, 44th, 20th, 116th, 260th, 452nd, 482nd, and 290th, respectively;

(10) the 1st to 24th pixels composing the 10th row of the rectangular pattern are turned on 217th, 361st, 553rd, 427th, 187th, 91st, 67th, 163rd, 403rd, 529th, 337th, 193rd, 218th, 362nd, 554th, 428th, 188th, 92nd, 68th, 164th, 404th, 530th, 338th, and 194th, respectively;

(11) the 1st to 24th pixels composing the 11th row of the rectangular pattern are turned on 73rd, 169th, 409th, 571st, 379th, 235th, 211th, 355th, 547th, 385th, 145th, 49th, 74th, 170th, 410th, 572nd, 380th, 236th, 212th, 356th, 548th, 386th, 146th, and 50th, respectively;

(12) the 1st to 24th pixels composing the twelfth row of the rectangular pattern are turned on 25th, 121st, 265th, 457th, 523rd, 331st, 307th, 499th, 433rd, 241st, 97th, 1st, 26th, 122nd, 266th, 458th, 524th, 332nd, 308th, 500th, 434th, 242nd, 98th, and 2nd, respectively;

(13) the 1st to 24th pixels composing the 13th row of the rectangular pattern are turned on 13th, 109th, 253rd, 445th, 487th, 295th, 319th, 511th, 469th, 277th, 133rd, 37th, 14th, 110th, 254th, 446th, 488th, 296th, 320th, 512th, 470th, 278th, 134th, and 38th, respectively;

(14) the 1st to 24th pixels composing the 14th row of the rectangular pattern are turned on 61st, 157th, 397th, 535th, 343rd, 199th, 223rd, 367th, 559th, 421st, 181st, 85th, 62nd, 158th, 398th, 536th, 344th, 200th, 224th, 368th, 560th, 422nd, 182nd, and 86th, respectively;

(15) the 1st to 24th pixels composing the 15th row of the rectangular pattern are turned on 205th, 349th, 541st, 391st, 151st, 55th, 79th, 175th, 415th, 565th, 373rd, 229th, 206th, 350th, 542nd, 392nd, 152nd, 56th, 80th, 176th, 416th, 566th, 374th, and 230th, respectively;

(16) the 1st to 24th pixels composing the 16th row of the rectangular pattern are turned on 301st, 493rd, 439th, 247th, 103rd, 7th, 31st, 127th, 271st, 463rd, 517th, 325th, 302nd, 494th, 440th, 248th, 104th, 8th, 32nd, 128th, 272nd, 464th, 518th, and 326th, respectively;

(17) the 1st to 24th pixels composing the 17th row of the rectangular pattern are turned on 315th, 507th, 477th, 285th, 141st, 45th, 21st, 117th, 261st, 453rd, 483rd, 291st, 318th, 510th, 480th, 288th, 144th, 48th, 24th, 120th, 264th, 456th, 486th, and 294th, respectively;

(18) the 1st to 24th pixels composing the 18th row of the rectangular pattern are turned on 219th, 363rd, 555th, 429th, 189th, 93rd, 69th, 165th, 405th, 531st, 339th, 195th, 222nd, 366th, 558th, 432nd, 192nd, 96th, 72nd, 168th, 408th, 534th, 342nd, and 198th, respectively;

(19) the 1st to 24th pixels composing the 19th row of the rectangular pattern are turned on 75th, 171st, 411th, 573rd, 381st, 237th, 213th, 357th, 549th, 387th, 147th, 51st, 78th, 174th, 414th, 576th, 384th, 240th, 216th, 360th, 552nd, 390th, 150th, and 54th, respectively;

(20) the 1st to 24th pixels composing the 20th row of the rectangular pattern are turned on 27th, 123rd, 267th, 459th, 525th, 333rd, 309th, 501st, 435th, 243rd, 99th, 3rd, 30th, 126th, 270th, 462nd, 528th, 336th, 312th, 504th, 438th, 246th, 102nd, and 6th, respectively;

(21) the 1st to 24th pixels composing the 21st row of the rectangular pattern are turned on 15th, 111th, 255th, 447th, 489th, 297th, 321st, 513th, 471st, 279th, 135th, 39th, 18th, 114th, 258th, 450th, 492nd, 300th, 324th, 516th, 474th, 282nd, 138th, and 42nd, respectively;

(22) the 1st to 24th pixels composing the 22nd row of the rectangular pattern are turned on 63rd, 159th, 399th, 537th, 345th, 201st, 225th, 369th, 561st, 423rd, 183rd, 87th, 66th, 162nd, 402nd, 540th, 348th, 204th, 228th, 372nd, 564th, 426th, 186th, and 90th, respectively;

(23) the 1st to 24th pixels composing the 23rd row of the rectangular pattern are turned on 207th, 351st, 543rd, 393rd, 153rd, 57th, 81st, 177th, 417th, 567th, 375th, 231st, 210th, 354th, 546th, 396th, 156th, 60th, 84th, 180th, 420th, 570th, 378th, and 234th, respectively; and

(24) the 1st to 24th pixels composing the 24th row of the rectangular pattern are turned on 303rd, 495th, 441st, 249th, 105th, 9th, 33rd, 129th, 273rd, 465th, 519th, 327th, 306th, 498th, 444th, 252nd, 108th, 12th, 36th, 132nd, 276th, 468th, 522nd, and 330th, respectively.

Figure 12:
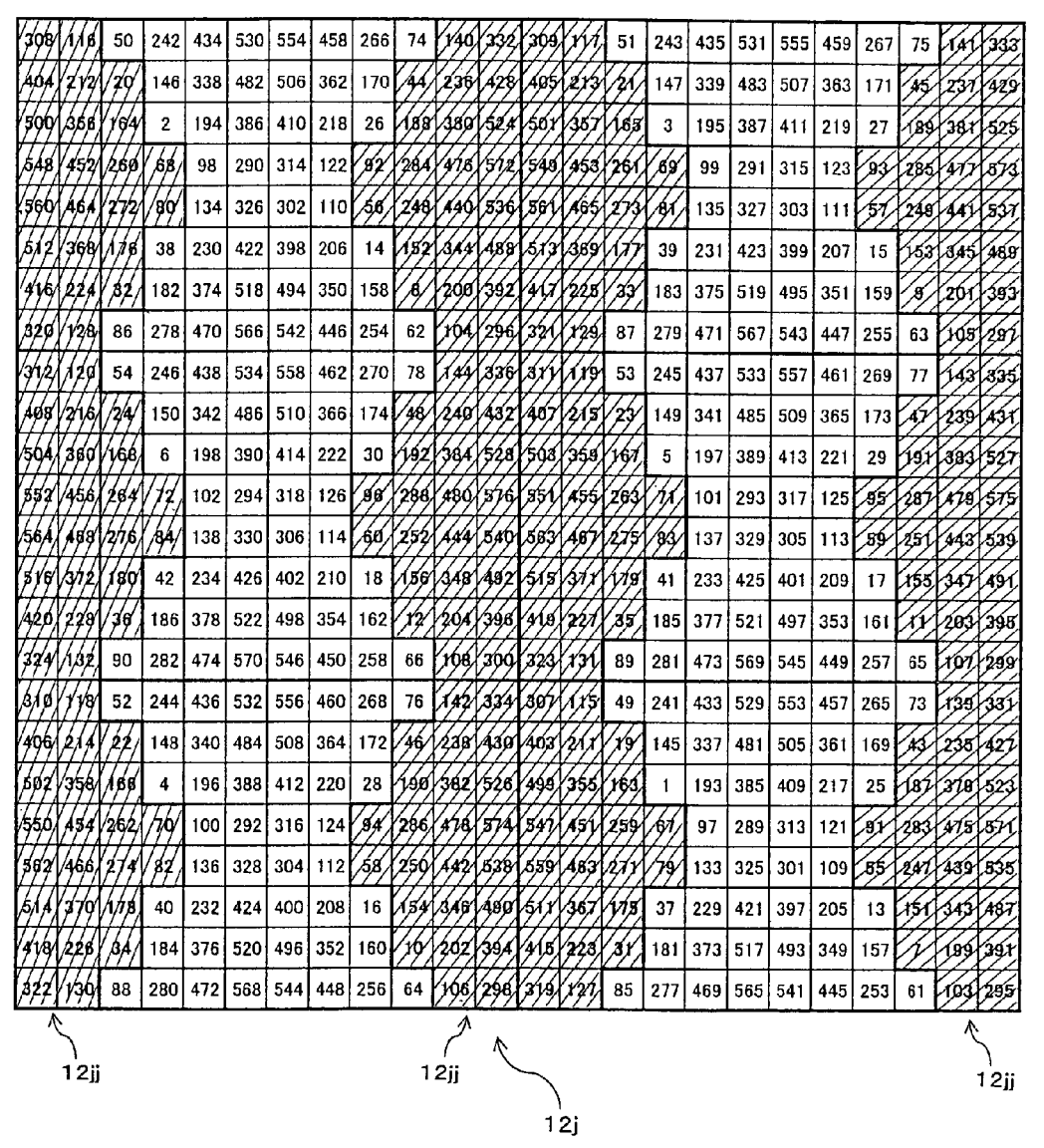

Binary-coding pattern 12*j* of FIG. 12 is composed of 576 pixels arranged in a matrix of 24 rows×24 columns, and has substantially the same construction as that which is obtained by tiling binary-form dither matrix patterns 12*b* of FIG. 4 both vertically and horizontally. In binary-coding pattern 12*j*, the sequence of turning on the pixels is set in such a way that dots having a roughly oval shape (the degree of flattening≈0.8) grow in respective unit patterns 12*jj*. In each unit pattern 12*jj* of binary-coding pattern 12*j*, two pixels (for example, the pixel numbered 576 and that numbered 563) that are disposed diametrically symmetrically to one another with respect to the center of the unit pattern are first turned on successively. In binary-coding pattern 12*j* of FIG. 12, the 576 pixels are numbered in the following manner, and the turning on of the pixels is carried out in descending numeric order:

(1) the 1st to 24th pixels composing the first row of the rectangular pattern are numbered 308, 116, 50, 242, 434, 530, 554, 458, 266, 74, 140, 332, 309, 117, 51, 243, 435, 531, 555, 459, 267, 75, 141, and 333, respectively;

(2) the 1st to 24th pixels composing the second row of the rectangular pattern are numbered 404, 212, 20, 146, 338, 482, 506, 362, 170, 44, 236, 428, 405, 213, 21, 147, 339, 483, 507, 363, 171, 45, 237, and 429, respectively;

(3) the 1st to 24th pixels composing the third row of the rectangular pattern are numbered 500, 356, 164, 2, 194, 386, 410, 218, 26, 188, 380, 524, 501, 357, 165, 3, 195, 387, 411, 219, 27, 189, 381, and 525, respectively;

(4) the 1st to 24th pixels composing the fourth row of the rectangular pattern are numbered 548, 452, 260, 68, 98, 290, 314, 122, 92, 284, 476, 572, 549, 453, 261, 69, 99, 291, 315, 123, 93, 285, 477, and 573, respectively;

(5) the 1st to 24th pixels composing the fifth row of the rectangular pattern are numbered 560, 464, 272, 80, 134, 326, 302, 110, 56, 248, 440, 536, 561, 465, 273, 81, 135, 327, 303, 111, 57, 249, 441, and 537, respectively;

(6) the 1st to 24th pixels composing the sixth row of the rectangular pattern are numbered 512, 368, 176, 38, 230, 422, 398, 206, 14, 152, 344, 488, 513, 369, 177, 39, 231, 423, 399, 207, 15, 153, 345, and 489, respectively;

(7) the 1st to 24th pixels composing the seventh row of the rectangular pattern are numbered 416, 224, 32, 182, 374, 518, 494, 350, 158, 8, 200, 392, 417, 225, 33, 183, 375, 519, 495, 351, 159, 9, 201, and 393, respectively;

(8) the 1st to 24th pixels composing the eighth row of the rectangular pattern are numbered 320, 128, 86, 278, 470, 566, 542, 446, 254, 62, 104, 296, 321, 129, 87, 279, 471, 567, 543, 447, 255, 63, 105, and 297, respectively;

(9) the 1st to 24th pixels composing the ninth row of the rectangular pattern are numbered 312, 120, 54, 246, 438, 534, 558, 462, 270, 78, 144, 336, 311, 119, 53, 245, 437, 533, 557, 461, 269, 77, 143, and 335, respectively;

(10) the 1st to 24th pixels composing the 10th row of the rectangular pattern are numbered 408, 216, 24, 150, 342, 486, 510, 366, 174, 48, 240, 432, 407, 215, 23, 149, 341, 485, 509, 365, 173, 47, 239, and 431, respectively;

(11) the 1st to 24th pixels composing the 11th row of the rectangular pattern are numbered 504, 360, 168, 6, 198, 390, 414, 222, 30, 192, 384, 528, 503, 359, 167, 5, 197, 389, 413, 221, 29, 191, 383, and 527, respectively;

(12) the 1st to 24th pixels composing the twelfth row of the rectangular pattern are numbered 552, 456, 264, 72, 102, 294, 318, 126, 96, 288, 480, 576, 551, 455, 263, 71, 101, 293, 317, 125, 95, 287, 479, and 575, respectively;

(13) the 1st to 24th pixels composing the 13th row of the rectangular pattern are numbered 564, 468, 276, 84, 138, 330, 306, 114, 60, 252, 444, 540, 563, 467, 275, 83, 137, 329, 305, 113, 59, 251, 443, and 539, respectively;

(14) the 1st to 24th pixels composing the 14th row of the rectangular pattern are numbered 516, 372, 180, 42, 234, 426, 402, 210, 18, 156, 348, 492, 515, 371, 179, 41, 233, 425, 401, 209, 17, 155, 347, and 491, respectively;

(15) the 1st to 24th pixels composing the 15th row of the rectangular pattern are numbered 420, 228, 36, 186, 378, 522, 498, 354, 162, 12, 204, 396, 419, 227, 35, 185, 377, 521, 497, 353, 161, 11, 203, and 395, respectively;

(16) the 1st to 24th pixels composing the 16th row of the rectangular pattern are numbered 324, 132, 90, 282, 474, 570, 546, 450, 258, 66, 108, 300, 323, 131, 89, 281, 473, 569, 545, 449, 257, 65, 107, and 299, respectively;

(17) the 1st to 24th pixels composing the 17th row of the rectangular pattern are numbered 310, 118, 52, 244, 436, 532, 556, 460, 268, 76, 142, 334, 307, 115, 49, 241, 433, 529, 553, 457, 265, 73, 139, and 331, respectively;

(18) the 1st to 24th pixels composing the 18th row of the rectangular pattern are numbered 406, 214, 22, 148, 340, 484, 508, 364, 172, 46, 238, 430, 403, 211, 19, 145, 337, 481, 505, 361, 169, 43, 235, and 247, respectively;

(19) the 1st to 24th pixels composing the 19th row of the rectangular pattern are numbered 502, 358, 166, 4, 196, 388, 412, 220, 28, 190, 382, 526, 499, 355, 163, 1, 193, 385, 409, 217, 25, 187, 379, and 523, respectively;

(20) the 1st to 24th pixels composing the 20th row of the rectangular pattern are numbered 550, 454, 262, 70, 100, 292, 316, 124, 94, 286, 478, 574, 547, 451, 259, 67, 97, 289, 313, 121, 91, 283, 475, and 571, respectively;

(21) the 1st to 24th pixels composing the 21st row of the rectangular pattern are numbered 562, 466, 274, 82, 136, 328, 304, 112, 58, 250, 442, 538, 559, 463, 271, 79, 133, 325, 301, 109, 55, 247, 439, and 535, respectively;

(22) the 1st to 24th pixels composing the 22nd row of the rectangular pattern are numbered 514, 370, 178, 40, 232, 424, 400, 208, 16, 154, 346, 490, 511, 367, 175, 37, 229, 421, 397, 205, 13, 151, 343, and 487, respectively;

(23) the 1st to 24th pixels composing the 23rd row of the rectangular pattern are numbered 418, 226, 34, 184, 376, 520, 496, 352, 160, 10, 202, 394, 415, 223, 31, 181, 373, 517, 493, 349, 157, 7, 199,and 391, respectively; and

(24) the 1st to 24th pixels composing the 24th row of the rectangular pattern are numbered 322, 130, 88, 280, 472, 568, 544, 448, 256, 64, 106, 298, 319, 127, 85, 277, 469, 565, 541, 445, 253, 61, 103, and 295, respectively.

In other words, the sequence of turning on the 576 pixels is determined in such a way that the pixels are turned on in the following manner:

(1) the 1st to 24th pixels composing the first row of the rectangular pattern are turned on 269th, 461st, 527th, 335th, 143rd, 47ht, 23rd, 119th, 311th, 503rd, 437th, 245th, 268th, 460th, 526th, 334th, 142nd, 46th, 22nd, 118th, 310th, 502nd, 436th, and 244th, respectively;

(2) the 1st to 24th pixels composing the second row of the rectangular pattern are turned on 173rd, 365th, 557th, 431st, 239th, 95th, 71st, 215th, 407th, 533rd, 341st, 149th, 172nd, 364th, 556th, 430th, 238th, 94th, 70th, 214th, 406th, 532nd, 340th, and 148th, respectively;

(3) the 1st to 24th pixels composing the third row of the rectangular pattern are turned on 77th, 221st, 413th, 575th, 383rd, 191st, 167th, 359th, 551st, 389th, 197th, 53rd, 76th, 220th, 412th, 574th, 382nd, 190th, 166th, 358th, 550th, 388th, 196th, and 52nd, respectively;

(4) the 1st to 24th pixels composing the fourth row of the rectangular pattern are turned on 29th, 125th, 317th, 509th, 479th, 287th, 263rd, 455th, 485th, 293rd, 101st, 5th, 28th, 124th, 316th, 508th, 478th, 286th, 262nd, 454th, 484th, 292nd, 100th, and 4th, respectively;

(5) the 1st to 24th pixels composing the fifth row of the rectangular pattern are turned on 17th, 113th, 305th, 497th, 443rd, 251st, 275th, 467th, 521st, 329th, 137th, 41st, 16th, 112th, 304th, 496th, 442nd, 250th, 274th, 466th, 520th, 328th, 136th, and 40th, respectively;

(6) the 1st to 24th pixels composing the sixth row of the rectangular pattern are turned on 65th, 209th, 401st, 539th, 347th, 155th, 179th, 371st, 563rd, 425th, 233rd, 89th, 64th, 208th, 400th, 538th, 346th, 154th, 178th, 370th, 562nd, 424th, 232nd, and 88th, respectively;

(7) the 1st to 24th pixels composing the seventh row of the rectangular pattern are turned on 161st, 353rd, 545th, 395th, 203rd, 59th, 83rd, 227th, 419h, 569th, 377th, 185th, 160th, 352nd, 544th, 394th, 202nd, 58th, 82nd, 226th, 418th, 568th, 376th, and 184th, respectively;

(8) the 1st to 24th pixels composing the eighth row of the rectangular pattern are turned on 257th, 449th, 491st, 299th, 107th, 11th, 35th, 131st, 323rd, 515th, 473rd, 281st, 256th, 448th, 490th, 298th, 106th, 10th, 34th, 130th, 322nd, 514th, 472nd, and 280th, respectively;

(9) the 1st to 24th pixels composing the ninth row of the rectangular pattern are turned on 265th, 457th, 523rd, 331st, 139th, 43rd, 19th, 115th, 307th, 499th, 433rd, 241st, 266th, 458th, 524th, 332nd, 140th, 44th, 20th, 116th, 308th, 500th, 434th, and 242nd, respectively;

(10) the 1st to 24th pixels composing the 10th row of the rectangular pattern are turned on 169th, 361st, 553rd, 427th, 235th, 91st, 67th, 211th, 403rd, 529th, 337th, 145th, 170th, 362nd, 554th, 428th, 236th, 92nd, 68th, 212th, 404th, 530th, 338th, and 146th, respectively;

(11) the 1st to 24th pixels composing the 11th row of the rectangular pattern are turned on 73rd, 217th, 409th, 571st, 379th, 187th, 163rd, 355th, 547th, 385th, 193rd, 49th, 74th, 218th, 410th, 572nd, 380th, 188th, 164th, 356th, 548th, 386th, 194th, and 50th, respectively;

(12) the 1st to 24th pixels composing the twelfth row of the rectangular pattern are turned on 25th, 121st, 313th, 505th, 475th, 283rd, 259th, 451st, 481st, 289th, 97th, 1st, 26th, 122nd, 314th, 506th, 476th, 284th, 260th, 452nd, 482nd, 290th, 98th, and 2nd, respectively;

(13) the 1st to 24th pixels composing the 13th row of the rectangular pattern are turned on 13th, 109th, 301st, 493rd, 439th, 247th, 271st, 463rd, 517th, 325th, 133rd, 37th, 14th, 110th, 302nd, 494th, 440th, 248th, 272nd, 464th, 518th, 326th, 134th, and 38th, respectively;

(14) the 1st to 24th pixels composing the 14th row of the rectangular pattern are turned on 61st, 205th, 397th, 535th, 343rd, 151st, 175th, 367th, 559th, 421st, 229th, 85th, 62nd, 206th, 398th, 536th, 344th, 152nd, 176th, 368th, 560th, 422nd, 230th, and 86th, respectively;

(15) the 1st to 24th pixels composing the 15th row of the rectangular pattern are turned on 157th, 349th, 541st, 391st, 199th, 55th, 79th, 223rd, 415th, 565th, 373rd, 181st, 158th, 350th, 542nd, 392nd, 200th, 56th, 80th, 224th, 416th, 566th, 374th, and 182nd, respectively;

(16) the 1st to 24th pixels composing the 16th row of the rectangular pattern are turned on 253rd, 445th, 487th, 295th, 103rd, 7th, 31st, 127th, 319th, 511th, 469th, 277th, 254th, 446th, 488th, 296th, 104th, 8th, 32nd, 128th, 320th, 512th, 470th, and 278th, respectively;

(17) the 1st to 24th pixels composing the 17th row of the rectangular pattern are turned on 267th, 459th, 525th, 333rd, 141st, 45th, 21st, 117th, 309th, 501st, 435th, 243rd, 270th, 462nd, 528th, 336th, 144th, 48th, 24th, 120th, 312th, 504th, 438th, and 246th, respectively;

(18) the 1st to 24th pixels composing the 18th row of the rectangular pattern are turned on 171st, 363rd, 555th, 429th, 237th, 93rd, 69th, 213th, 405th, 531st, 339th, 147th, 174th, 366th, 558th, 432nd, 240th, 96th, 72nd, 216th, 408th, 534th, 342nd, and 150th, respectively;

(19) the 1st to 24th pixels composing the 19th row of the rectangular pattern are turned on 75th, 219th, 411th, 573rd, 381st, 189th, 165th, 357th, 549th, 387th, 195th, 51st, 78th, 222nd, 414th, 576th, 384th, 192nd, 168th, 360th, 552nd, 390th, 198th, and 54th, respectively;

(20) the 1st to 24th pixels composing the 20th row of the rectangular pattern are turned on 27th, 123rd, 315th, 507th, 477th, 285th, 261st, 453rd, 483rd, 291st, 99th, 3rd, 30th, 126th, 318th, 510th, 480th, 288th, 264th, 456th, 486th, 294th, 102nd, and 6th, respectively;

(21) the 1st to 24th pixels composing the 21st row of the rectangular pattern are turned on 15th, 111th, 303rd, 495th, 441st, 249th, 273rd, 465th, 519th, 327th, 135th, 39th, 18th, 114th, 306th, 498th, 444th, 252nd, 276th, 468th, 522nd, 330th, 138th, and 42nd, respectively;

(22) the 1st to 24th pixels composing the 22nd row of the rectangular pattern are turned on 63rd, 207th, 399th, 537th, 345th, 153rd, 177th, 369th, 561st, 423rd, 231st, 87th, 66th, 210th, 402nd, 540th, 348th, 156th, 180th, 372nd, 564th, 426th, 234th, and 90th, respectively;

(23) the 1st to 24th pixels composing the 23rd row of the rectangular pattern are turned on 159th, 351st, 543rd, 393rd, 201st, 57th, 81st, 225th, 417th, 567th, 375th, 183rd, 162nd, 354th, 546th, 396th, 204th, 60th, 84th, 228th, 420th, 570th, 378th, and 186th, respectively; and

(24) the 1st to 24th pixels composing the 24th row of the rectangular pattern are turned on 255th, 447th, 489th, 297th, 105th, 9th, 33rd, 129th, 321st, 513th, 471st, 279th, 258th, 450th, 492nd, 300th, 108th, 12th, 36th, 132nd, 324th, 516th, 474th, and 282nd, respectively.

Binary-coding pattern 12$k$ of FIG. 13 is composed of 576 pixels arranged in a matrix of 24 rows×24 columns, and has substantially the same construction as that which is obtained by tiling binary-form dither matrix patterns 12$c$ of FIG. 5 both vertically and horizontally. In binary-coding pattern 12$k$, the sequence of turning on the pixels is set in such a way that dots having a roughly round shape grow in every rectangular pattern. In each unit pattern 12$kk$ of binary-coding pattern 12$k$, two pixels (for example, the pixel numbered 576 and that numbered 563) that are disposed diametrically symmetrically to one another with respect to the center of unit pattern 12$kk$ are first turned on successively. In binary-coding pattern 12$k$ of FIG. 13, the 576 pixels are numbered in the following manner, and the turning on of the pixels is carried out in descending numeric order:

(1) the 1st to 24th pixels composing the first row of the rectangular pattern are numbered 82, 298, 490, 538, 562, 442, 250, 10, 84, 300, 492, 540, 564, 444, 252, 12, 80, 296, 488, 536, 560, 440, 248, and 8, respectively;

(2) the 1st to 24th pixels composing the second row of the rectangular pattern are numbered 178, 322, 394, 466, 514, 418, 130, 34, 180, 324, 396, 468, 516, 420, 132, 36, 176, 320, 392, 464, 512, 416, 128, and 32, respectively;

(3) the 1st to 24th pixels composing the third row of the rectangular pattern are numbered 64, 202, 154, 274, 346, 370, 226, 112, 66, 204, 156, 276, 348, 372, 228, 114, 62, 200, 152, 272, 344, 368, 224, and 110, respectively;

(4) the 1st to 24th pixels composing the fourth row of the rectangular pattern are numbered 280, 160, 208, 58, 106, 232, 376, 352, 282, 162, 210, 60, 108, 234, 378, 354, 278, 158, 206, 56, 104, 230, 374, and 350, respectively;

(5) the 1st to 24th pixels composing the fifth row of the rectangular pattern are numbered 472, 400, 328, 184, 40, 136, 424, 520, 474, 402, 330, 186, 42, 138, 426, 522, 470, 398, 326, 182, 38, 134, 422, and 518, respectively;

(6) the 1st to 24th pixels composing the sixth row of the rectangular pattern are numbered 544, 496, 304, 88, 16, 256, 448, 568, 546, 498, 306, 90, 18, 258, 450, 570, 542, 494, 302, 86, 14, 254, 446, and 566, respectively;

(7) the 1st to 24th pixels composing the seventh row of the rectangular pattern are numbered 556, 436, 244, 4, 76, 292, 484, 532, 558, 438, 246, 6, 78, 294, 486, 534, 554, 434, 242, 2, 74, 290, 482, and 530th, respectively;

(8) the 1st to 24th pixels composing the eighth row of the rectangular pattern are numbered 508, 412, 124, 28, 172, 316, 388, 460, 510, 414, 126, 30, 174, 318, 390, 462, 506, 410, 122, 26, 170, 314, 386, and 458, respectively;

(9) the 1st to 24th pixels composing the ninth row of the rectangular pattern are numbered 340, 364, 220, 118, 70, 196, 148, 268, 342, 366, 222, 120, 72, 198, 150, 270, 338, 362, 218, 116, 68, 194, 146, and 266, respectively;

(10) the 1st to 24th pixels composing the 10th row of the rectangular pattern are numbered 100, 238, 382, 358, 286, 166, 214, 52, 102, 240, 384, 360, 288, 168, 216, 54, 98, 236, 380, 356, 284, 164, 212, and 50, respectively;

(11) the 1st to 24th pixels composing the 11th row of the rectangular pattern are numbered 46, 142, 430, 526, 478, 406, 334, 190, 48, 144, 432, 528, 480, 408, 336, 192, 44, 140, 428, 524, 476, 404, 332, and 188, respectively;

(12) the 1st to 24th pixels composing the twelfth row of the rectangular pattern are numbered 22, 262, 454, 574, 550, 502, 310, 94, 24, 264, 456, 576, 552, 504, 312, 96, 20, 260, 452, 572, 548, 500, 308, and 92, respectively;

(13) the 1st to 24th pixels composing the 13th row of the rectangular pattern are numbered 79, 295, 487, 535, 559, 439, 247, 7, 83, 299, 491, 539, 563, 443, 251, 11, 81, 297, 489, 537, 561, 441, 249, and 9, respectively;

(14) the 1st to 24th pixels composing the 14th row of the rectangular pattern are numbered 175, 319, 391, 463, 511, 415, 127, 31, 179, 323, 395, 467, 515, 419, 131, 35, 177, 321, 393, 465, 513, 417, 129, and 33, respectively;

(15) the 1st to 24th pixels composing the 15th row of the rectangular pattern are numbered 61, 199, 151, 271, 343, 367, 223, 109, 65, 203, 155, 275, 347, 371, 227, 113, 63, 201, 153, 273, 345, 369, 225, and 111, respectively;

(16) the 1st to 24th pixels composing the 16th row of the rectangular pattern are numbered 277, 157, 205, 55, 103, 229, 373, 349, 281, 161, 209, 59, 107, 233, 377, 353, 279, 159, 207, 57, 105, 231, 375, and 351, respectively;

(17) the 1st to 24th pixels composing the 17th row of the rectangular pattern are numbered 469, 397, 325, 181, 37, 133, 421, 517, 473, 401, 329, 185, 41, 137, 425, 521, 471, 399, 327, 183, 39, 135, 423, and 519, respectively;

(18) the 1st to 24th pixels composing the 18th row of the rectangular pattern are numbered 541, 493, 301, 85, 13, 253, 445, 565, 545, 497, 305, 89, 17, 257, 449, 569, 543, 495, 303, 87, 15, 255, 447, and 567, respectively;

(19) the 1st to 24th pixels composing the 19th row of the rectangular pattern are numbered 553, 433, 241, first, 73, 289, 481, 529, 557, 437, 245, 5, 77, 293, 485, 533, 555, 435, 243, 3, 75, 291, 483, and 531, respectively;

(20) the 1st to 24th pixels composing the 20th row of the rectangular pattern are numbered 505, 409, 121, 25, 169, 313, 385, 457, 509, 413, 125, 29, 173, 317, 389, 461, 507, 411, 123, 27, 171, 315, 387, and 459, respectively;

(21) the 1st to 24th pixels composing the 21st row of the rectangular pattern are numbered 337, 361, 217, 115, 67, 193, 145, 265, 341, 365, 221, 119, 71, 197, 149, 269, 339, 363, 219, 117, 69, 195, 147, and 267, respectively;

(22) the 1st to 24th pixels composing the 22nd row of the rectangular pattern are numbered 97, 235, 379, 355, 283, 163, 211, 49, 101, 239, 383, 359, 287, 167, 215, 53, 99, 237, 381, 357, 285, 165, 213, and 51, respectively;

(23) the 1st to 24th pixels composing the 23rd row of the rectangular pattern are numbered 43, 139, 427, 523, 475, 403, 331, 187, 47, 143, 431, 527, 479, 407, 335, 191, 45, 141, 429, 525, 477, 405, 333, and 189, respectively; and

(24) the 1st to 24th pixels composing the 24th row of the rectangular pattern are numbered 19, 259, 451, 571, 547, 499, 307, 91, 23, 263, 455, 575, 551, 503, 311, 95, 21, 261, 453, 573, 549th, 501, 309, and 93, respectively.

In other words, the sequence of turning on the 576 pixels is determined in such a way that the pixels are turned on in the following manner:

(1) the 1st to 24th pixels composing the first row of the rectangular pattern are turned on 495th, 279th, 87th, 39th, 15th, 135th, 327th, 567th, 493rd, 277th, 85th, 37th, 13th, 133rd, 325th, 565th, 497th, 281st, 89th, 41st, 17th, 137th, 329th, and 569th, respectively;

(2) the 1st to 24th pixels composing the second row of the rectangular pattern are turned on 399th, 255th, 183rd, 111th, 63rd, 159th, 447th, 543rd, 397th, 253rd, 181st, 109th, 61st, 157th, 445th, 541st, 401st, 257th, 185th, 113th, 65th, 161st, 449th, and 545th, respectively;

(3) the 1st to 24th pixels composing the third row of the rectangular pattern are turned on 513th, 375th, 423rd, 303rd, 231st, 207th, 351st, 465th, 511th, 373rd, 421st, 301st, 229th, 205th, 349th, 463rd, 515th, 377th, 425th, 305th, 233rd, 209th, 353rd, and 467th, respectively;

(4) the 1st to 24th pixels composing the fourth row of the rectangular pattern are turned on 297th, 417th, 369th, 519th, 471st, 345th, 201st, 225th, 295th, 415th, 367th, 517th, 469th, 343rd, 199th, 223rd, 299th, 419th, 371st, 521st, 473rd, 347th, 203rd, and 227th, respectively;

(5) the 1st to 24th pixels composing the fifth row of the rectangular pattern are turned on 105th, 177th, 249th, 393rd, 537th, 441st, 153rd, 57th, 103rd, 175th, 247th, 391st, 535th, 439th, 151st, 55th, 107th, 179th, 251st, 395th, 539th, 443rd, 155th, and 59th, respectively;

(6) the 1st to 24th pixels composing the sixth row of the rectangular pattern are turned on 33rd, 81st, 273rd, 489th, 561st, 321st, 129th, 9th, 31st, 79th, 271st, 487th, 559th, 319th, 127th, 7th, 35th, 83rd, 275th, 491st, 563rd, 323rd, 131st, and 11th, respectively;

(7) the 1st to 24th pixels composing the seventh row of the rectangular pattern are turned on 21st, 141st, 333rd, 573rd, 501st, 285th, 93rd, 45th, 19th, 139th, 331st, 571st, 499th, 283rd, 91st, 43rd, 23rd, 143rd, 335th, 575th, 503rd, 287th, 95th, and 47th, respectively;

(8) the 1st to 24th pixels composing the eighth row of the rectangular pattern are turned on 69th, 165th, 453rd, 549th, 405th, 261st, 189th, 117th, 67th, 163rd, 451st, 547th, 403rd, 259th, 187th, 115th, 71st, 167th, 455th, 551st, 407th, 263rd, 191st, and 119th, respectively;

(9) the 1st to 24th pixels composing the ninth row of the rectangular pattern are turned on 237th, 213th, 357th, 459th, 507th, 381st, 429th, 309th, 235th, 211th, 355th, 457th, 505th, 379th, 427th, 307th, 239th, 215th, 359th, 461st, 509th, 383rd, 431st, and 311th, respectively;

(10) the 1st to 24th pixels composing the 10th row of the rectangular pattern are turned on 477th, 339th, 195th, 219th, 291st, 411th, 363rd, 525th, 475th, 337th, 193rd, 217th, 289th, 409th, 361st, 523rd, 479th, 341st, 197th, 221st, 293rd, 413th, 365th, and 527th, respectively;

(11) the 1st to 24th pixels composing the 11th row of the rectangular pattern are turned on 531st, 435th, 147th, 51st, 99th, 171st, 243rd, 387th, 529th, 433rd, 145th, 49th, 97th, 169th, 241st, 385th, 533rd, 437th, 149th, 53rd, 101st, 173rd, 245th, and 389th, respectively;

(12) the 1st to 24th pixels composing the twelfth row of the rectangular pattern are turned on 555th, 315th, 123rd, 3rd, 27th, 75th, 267th, 483rd, 553rd, 313th, 121st, 1st, 25th, 73rd, 265th, 481st, 557th, 317th, 125th, 5th, 29th, 77th, 269th, and 485th, respectively;

(13) the 1st to 24th pixels composing the 13th row of the rectangular pattern are turned on 498th, 282nd, 90th, 42nd, 18th, 138th, 330th, 570th, 494th, 278th, 86th, 38th, 14th, 134th, 326th, 566th, 496th, 280th, 88th, 40th, 16th, 136th, 328th, and 568th, respectively;

(14) the 1st to 24th pixels composing the 14th row of the rectangular pattern are turned on 402nd, 258th, 186th, 114th, 66th, 162nd, 450th, 546th, 398th, 254th, 182nd, 110th, 62nd, 158th, 446th, 542nd, 400th, 256th, 184th, 112th, 64th, 160th, 448th, and 544th, respectively;

(15) the 1st to 24th pixels composing the 15th row of the rectangular pattern are turned on 516th, 378th, 426th, 306th, 234th, 210th, 354th, 468th, 512th, 374th, 422nd, 302nd, 230th, 206th, 350th, 464th, 514th, 376th, 424th, 304th, 232nd, 208th, 352nd, and 466th, respectively;

(16) the 1st to 24th pixels composing the 16th row of the rectangular pattern are turned on 300th, 420th, 372nd, 522nd, 474th, 348th, 204th, 228th, 296th, 416th, 368th, 518th, 470th, 344th, 200th, 224th, 298th, 418th, 370th, 520th, 472nd, 346th, 202nd, and 226th, respectively;

(17) the 1st to 24th pixels composing the 17th row of the rectangular pattern are turned on 108th, 180th, 252nd, 396th, 540th, 444th, 156th, 60th, 104th, 176th, 248th, 392nd, 536th, 440th, 152nd, 56th, 106th, 178th, 250th, 394th, 538th, 442nd, 154th, and 58th, respectively;

(18) the 1st to 24th pixels composing the 18th row of the rectangular pattern are turned on 36th, 84th, 276th, 492nd, 564th, 324th, 132nd, 12th, 32nd, 80th, 272nd, 488th, 560th, 320th, 128th, 8th, 34th, 82nd, 274th, 490th, 562nd, 322nd, 130th, and 10th, respectively;

(19) the 1st to 24th pixels composing the 19th row of the rectangular pattern are turned on 24th, 144th, 336th, 576th, 504th, 288th, 96th, 48th, 20th, 140th, 332nd, 572nd, 500th, 284th, 92nd, 44th, 22nd, 142nd, 334th, 574th, 502nd, 286th, 94th, and 46th, respectively;

(20) the 1st to 24th pixels composing the 20th row of the rectangular pattern are turned on 72nd, 168th, 456th, 552nd, 408th, 264th, 192nd, 120th, 68th, 164th, 452nd, 548th, 404th, 260th, 188th, 116th, 70th, 166th, 454th, 550th, 406th, 262nd, 190th, and 118th, respectively;

(21) the 1st to 24th pixels composing the 21st row of the rectangular pattern are turned on 240th, 216th, 360th, 462nd, 510th, 384th, 432nd, 312th, 236th, 212th, 356th, 458th, 506th, 380th, 428th, 308th, 238th, 214th, 358th, 460th, 508th, 382nd, 430th, and 310th, respectively;

(22) the 1st to 24th pixels composing the 22nd row of the rectangular pattern are turned on 480th, 342nd, 198th, 222nd, 294th, 414th, 366th, 528th, 476th, 338th, 194th, 218th, 290th, 410th, 362nd, 524th, 478th, 340th, 196th, 220th, 292nd, 412th, 364th, and 526th, respectively;

(23) the 1st to 24th pixels composing the 23rd row of the rectangular pattern are turned on 534th, 438th, 150th, 54th, 102nd, 174th, 246th, 390th, 530th, 434th, 146th, 50th, 98th, 170th, 242nd, 386th, 532nd, 436th, 148th, 52nd, 100th, 172nd, 244th, and 388th, respectively; and

(24) the 1st to 24th pixels composing the 24th row of the rectangular pattern are turned on 558th, 318th, 126th, 6th, 30th, 78th, 270th, 486th, 554th, 314th, 122nd, 2nd, 26th, 74th, 266th, 482nd, 556th, 316th, 124th, 4th, 28th, 76th, 268th, and 484th, respectively.

Figure 14:
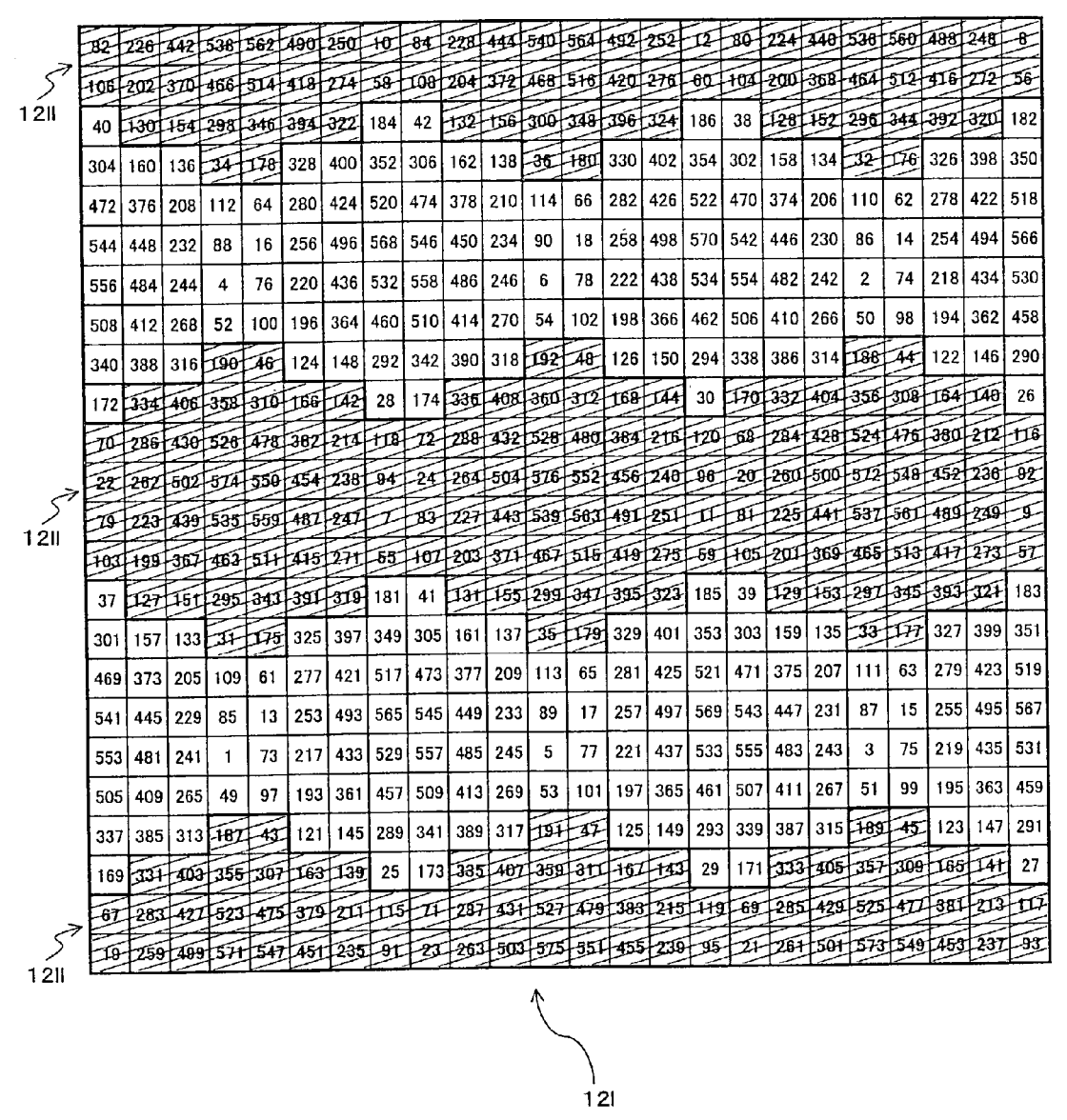

Binary-coding pattern 121 of FIG. 14 is composed of 576 pixels arranged in a matrix of 24 rows×24 columns, and has substantially the same construction as that which is obtained by tiling binary-form dither matrix patterns 12*d* of FIG. 6 both vertically and horizontally. In binary-coding pattern 121, the sequence of turning on the pixels is set in such a way that dots having a roughly oval shape (the degree of flattening≈0.8) grow in respective unit patterns. In each unit pattern 1211 of binary-coding pattern 121, two pixels (for example, the pixel numbered 576 and that numbered 563) that are disposed diametrically symmetrically to one another with respect to the center of unit pattern 1211 are first turned on successively. In binary-coding pattern 121 of FIG. 14, the 576 pixels are numbered in the following manner, and the turning on of the pixels is carried out in descending numeric order:

(1) the 1st to 24th pixels composing the first row of the rectangular pattern are numbered 82, 226, 442, 538, 562, 490, 250, 10, 84, 228, 444, 540, 564, 492, 252, 12, 80, 224, 440, 536, 560, 488, 248, and 8, respectively;

(2) the 1st to 24th pixels composing the second row of the rectangular pattern are numbered 106, 202, 370, 466, 514, 418, 274, 58, 108, 204, 372, 468, 516, 420, 276, 60, 104, 200, 368, 464, 512, 416, 272, and 56, respectively;

(3) the 1st to 24th pixels composing the third row of the rectangular pattern are numbered 40, 130, 154, 298, 346, 394, 322, 184, 42, 132, 156, 300, 348, 396, 324, 186, 38, 128, 152, 296, 344, 392, 320, and 182, respectively;

(4) the 1st to 24th pixels composing the fourth row of the rectangular pattern are numbered 304, 160, 136, 34, 178, 328, 400, 352, 306, 162, 138, 36, 180, 330, 402, 354, 302, 158, 134, 32, 176, 326, 398, and 350, respectively;

(5) the 1st to 24th pixels composing the fifth row of the rectangular pattern are numbered 472, 376, 208, 112, 64, 280, 424, 520, 474, 378, 210, 114, 66, 282, 426, 522, 470, 374, 206, 110, 62, 278, 422, and 518, respectively;

(6) the 1st to 24th pixels composing the sixth row of the rectangular pattern are numbered 544, 448, 232, 88, 16, 256, 496, 568, 546, 450, 234, 90, 18, 258, 498, 570, 542, 446, 230, 86, 14, 254, 494, and 566, respectively;

(7) the 1st to 24th pixels composing the seventh row of the rectangular pattern are numbered 556, 484, 244, 4, 76, 220, 436, 532, 558, 486, 246, 6, 78, 222, 438, 534, 554, 482, 242, 2, 74, 218, 434, and 530, respectively;

(8) the 1st to 24th pixels composing the eighth row of the rectangular pattern are numbered 508, 412, 268, 52, 100, 196, 364, 460, 510, 414, 270, 54, 102, 198, 366, 462, 506, 410, 266, 50, 98, 194, 362, and 458, respectively;

(9) the 1st to 24th pixels composing the ninth row of the rectangular pattern are numbered 340, 388, 316, 190, 46, 124, 148, 292, 342, 390, 318, 192, 48, 126, 150, 294, 338, 386, 314, 188, 44, 122, 146, and 290, respectively;

(10) the 1st to 24th pixels composing the 10th row of the rectangular pattern are numbered 172, 334, 406, 358, 310, 166, 142, 28, 174, 336, 408, 360, 312, 168, 144, 30, 170, 332, 404, 356, 308, 164, 140, and 26, respectively;

(11) the 1st to 24th pixels composing the 11th row of the rectangular pattern are numbered 70, 286, 430, 526, 478, 382, 214, 118, 72, 288, 432, 528, 480, 384, 216, 120, 68, 284, 428, 524, 476, 380, 212, and 116, respectively;

(12) the 1st to 24th pixels composing the twelfth row of the rectangular pattern are numbered 22, 262, 502, 574, 550, 454, 238, 94, 24, 264, 504, 576, 552, 456, 240, 96, 20, 260, 500, 572, 548, 452, 236, and 92, respectively;

(13) the 1st to 24th pixels composing the 13th row of the rectangular pattern are numbered 79, 223, 439, 535, 559, 487, 247, 7, 83, 227, 443, 539, 563, 491, 251, 11, 81, 225, 441, 537, 561, 489, 249, and 9, respectively;

(14) the 1st to 24th pixels composing the 14th row of the rectangular pattern are numbered 103, 199, 367, 463, 511, 415, 271, 55, 107, 203, 371, 467, 515, 419, 275, 59, 105, 201, 369, 465, 513, 417, 273, and 57, respectively;

(15) the 1st to 24th pixels composing the 15th row of the rectangular pattern are numbered 37, 127, 151, 295, 343, 391, 319, 181, 41, 131, 155, 299, 347, 395, 323, 185, 39, 129, 153, 297, 345, 393, 321, and 183, respectively;

(16) the 1st to 24th pixels composing the 16th row of the rectangular pattern are numbered 301, 157, 133, 31, 175, 325, 397, 349, 305, 161, 137, 35, 179, 329, 401, 353, 303, 159, 135, 33, 177, 327, 399, and 351, respectively;

(17) the 1st to 24th pixels composing the 17th row of the rectangular pattern are numbered 469, 373, 205, 109, 61, 277, 421, 517, 473, 377, 209, 113, 65, 281, 425, 521, 471, 375, 207, 111, 63, 279, 423, and 519, respectively;

(18) the 1st to 24th pixels composing the 18th row of the rectangular pattern are numbered 541, 445, 229, 85, 13, 253, 493, 565, 545, 449, 233, 89, 17, 257, 497, 569, 543, 447, 231, 87, 15, 255, 495, and 567, respectively;

(19) the 1st to 24th pixels composing the 19th row of the rectangular pattern are numbered 553, 481, 241, 1, 73, 217, 433, 529, 557, 485, 245, 5, 77, 221, 437, 533, 555, 483, 243, 3rd, 75, 219, 435, and 531, respectively;

(20) the 1st to 24th pixels composing the 20th row of the rectangular pattern are numbered 505, 409, 265, 49, 97, 193, 361, 457, 509, 413, 269, 53, 101, 197, 365, 461, 507, 411, 267, 51, 99, 195, 363, and 459, respectively;

(21) the 1st to 24th pixels composing the 21st row of the rectangular pattern are numbered 337, 385, 313, 187, 43, 121, 145, 289, 341, 389, 317, 191, 47, 125, 149, 293, 339, 387, 315, 189, 45, 123, 147, and 291, respectively;

(22) the 1st to 24th pixels composing the 22 row of the rectangular pattern are numbered 169, 331, 403, 355, 307, 163, 139, 25, 173, 335, 407, 359, 311, 167, 143, 29, 171, 333, 405, 357, 309, 165, 141, and 27, respectively;

(23) the 1st to 24th pixels composing the 23rd row of the rectangular pattern are numbered 67, 283, 427, 523, 475, 379, 211, 115, 71, 287, 431, 527, 479, 383, 215, 119, 69, 285, 429, 525, 477, 381, 213, and 117, respectively; and

(24) the 1st to 24th pixels composing the 24th row of the rectangular pattern are numbered 19, 259, 499, 571, 547, 451, 235, 91, 23, 263, 503, 575, 551, 455, 239, 95, 21, 261, 501, 573, 549, 453, 237, and 93, respectively.

In other words, the sequence of turning on the 576 pixels is determined in such a way that the pixels are turned on in the following manner:

(1) the 1st to 24th pixels composing the first row of the rectangular pattern are turned on 495th, 351st, 135th, 39th, 15th, 87th, 327th, 567th, 493rd, 349th, 133rd, 37th, 13th, 85th, 325th, 565th, 497th, 353rd, 137th, 41st, 17th, 89th, 329th, and 569th, respectively;

(2) the 1st to 24th pixels composing the second row of the rectangular pattern are turned on 471st, 375th, 207th, 111th, 63rd, 159th, 303rd, 519th, 469th, 373rd, 205th, 109th, 61st, 157th, 301st, 517th, 473rd, 377th, 209th, 113th, 65th, 161st, 305th, and 521st, respectively;

(3) the 1st to 24th pixels composing the third row of the rectangular pattern are turned on 537th, 447th, 423rd, 279th, 231st, 183rd, 255th, 393rd, 535th, 445th, 421st, 277th, 229th, 181st, 253rd, 391st, 539th, 449th, 425th, 281st, 233rd, 185th, 257th, and 395th, respectively;

(4) the 1st to 24th pixels composing the fourth row of the rectangular pattern are turned on 273rd, 417th, 441st, 543rd, 399th, 249th, 177th, 225th, 271st, 415th, 439th, 541st, 397th, 247th, 175th, 223rd, 275th, 419th, 443rd, 545th, 401st, 251st, 179th, and 227th, respectively;

(5) the 1st to 24th pixels composing the fifth row of the rectangular pattern are turned on 105th, 201st, 369th, 465th, 513th, 297th, 153rd, 57th, 103rd, 199th, 367th, 463rd, 511th, 295th, 151st, 55th, 107th, 203rd, 371st, 467th, 515th, 299th, 155th, and 59th, respectively;

(6) the 1st to 24th pixels composing the sixth row of the rectangular pattern are turned on 33rd, 129th, 345th, 489th, 561st, 321st, 81st, 9th, 31st, 127th, 343rd, 487th, 559th, 319th, 79th, 7th, 35th, 131st, 347th, 491st, 563rd, 323rd, 83rd, and 11th, respectively;

(7) the 1st to 24th pixels composing the seventh row of the rectangular pattern are turned on 21st, 93rd, 333rd, 573rd, 501st, 357th, 141st, 45th, 19th, 91st, 331st, 571st, 499th, 355th, 139th, 43rd, 23rd, 95th, 335th, 575th, 503rd, 359th, 143rd, and 47th, respectively;

(8) the 1st to 24th pixels composing the eighth row of the rectangular pattern are turned on 69th, 165th, 309th, 525th, 477th, 381st, 213th, 117th, 67th, 163rd, 307th, 523rd, 475th, 379th, 211th, 115th, 71st, 167th, 311th, 527th, 479th, 383rd, 215th, and 119th, respectively;

(9) the 1st to 24th pixels composing the ninth row of the rectangular pattern are turned on 237th, 189th, 261st, 387th, 531st, 453rd, 429th, 285th, 235th, 187th, 259th, 385th, 529th, 451st, 427th, 283rd, 239th, 191st, 263rd, 389th, 533rd, 455th, 431st, and 287th, respectively;

(10) the 1st to 24th pixels composing the 10th row of the rectangular pattern are turned on 405th, 243rd, 171st, 219th, 267th, 411th, 435th, 549th, 403rd, 241st, 169th, 217th, 265th, 409th, 433rd, 547th, 407th, 245th, 173rd, 221st, 269th, 413th, 437th, and 551st, respectively;

(11) the 1st to 24th pixels composing the 11th row of the rectangular pattern are turned on 507th, 291st, 147th, 51st, 99th, 195th, 363rd, 459th, 505th, 289th, 145th, 49th, 97th, 193rd, 361st, 457th, 509th, 293rd, 149th, 53rd, 101st, 197th, 365th, and 461st, respectively;

(12) the 1st to 24th pixels composing the twelfth row of the rectangular pattern are turned on 555th, 315th, 75th, 3rd, 27th, 123rd, 339th, 483rd, 553rd, 313th, 73rd, 1st, 25th, 121st, 337th, 481st, 557th, 317th, 77th, 5th, 29th, 125th, 341st, and 485th, respectively;

(13) the 1st to 24th pixels composing the 13th row of the rectangular pattern are turned on 498th, 354th, 138th, 42nd, 18th, 90th, 330th, 570th, 494th, 350th, 134th, 38th, 14th, 86th, 326th, 566th, 496th, 352nd, 136th, 40th, 16th, 88th, 328th, and 568th, respectively;

(14) the 1st to 24th pixels composing the 14th row of the rectangular pattern are turned on 474th, 378th, 210th, 114th, 66th, 162nd, 306th, 522nd, 470th, 374th, 206th, 110th, 62nd, 158th, 302nd, 518th, 472nd, 376th, 208th, 112th, 64th, 160th, 304th, and 520th, respectively;

(15) the 1st to 24th pixels composing the 15th row of the rectangular pattern are turned on 540th, 450th, 426th, 282nd, 234th, 186th, 258th, 396th, 536th, 446th, 422nd, 278th, 230th, 182nd, 254th, 392nd, 538th, 448th, 424th, 280th, 232nd, 184th, 256th, and 394th, respectively;

(16) the 1st to 24th pixels composing the 16th row of the rectangular pattern are turned on 276th, 420th, 444th, 546th, 402nd, 252nd, 180th, 228th, 272nd, 416th, 440th, 542nd, 398th, 248th, 176th, 224th, 274th, 418th, 442nd, 544th, 400th, 250th, 178th, and 226th, respectively;

(17) the 1st to 24th pixels composing the 17th row of the rectangular pattern are turned on 108th, 204th, 372nd, 468th, 516th, 300th, 156th, 60th, 104th, 200th, 368th, 464th, 512th, 296th, 152nd, 56th, 106th, 202nd, 370th, 466th, 514th, 298th, 154th, and 58th, respectively;

(18) the 1st to 24th pixels composing the 18th row of the rectangular pattern are turned on 36th, 132nd, 348th, 492nd, 564th, 324th, 84th, 12th, 32nd, 128th, 344th, 488th, 560th, 320th, 80th, 8th, 34th, 130th, 346th, 490th, 562nd, 322nd, 82nd, and 10th, respectively;

(19) the 1st to 24th pixels composing the 19th row of the rectangular pattern are turned on 24th, 96th, 336th, 576th, 504th, 360th, 144th, 48th, 20th, 92nd, 332nd, 572nd, 500th, 356th, 140th, 44th, 22nd, 94th, 334th, 574th, 502nd, 358th, 142nd, and 46th, respectively;

(20) the 1st to 24th pixels composing the 20th row of the rectangular pattern are turned on 72nd, 168th, 312th, 528th, 480th, 384th, 216th, 120th, 68th, 164th, 308th, 524th, 476th, 380th, 212th, 116th, 70th, 166th, 310th, 526th, 478th, 382nd, 214th, and 118th, respectively;

(21) the 1st to 24th pixels composing the 21st row of the rectangular pattern are turned on 240th, 192nd, 264th, 390th, 534th, 456th, 432nd, 288th, 236th, 188th, 260th, 386th, 530th, 452nd, 428th, 284th, 238th, 190th, 262nd, 388th, 532nd, 454th, 430th, and 286th, respectively;

(22) the 1st to 24th pixels composing the 22nd row of the rectangular pattern are turned on 408th, 246th, 174th, 222nd, 270th, 414th, 438th, 552nd, 404th, 242nd, 170th, 218th, 266th, 410th, 434th, 548th, 406th, 244th, 172nd, 220th, 268th, 412th, 436th, and 550th, respectively;

(23) the 1st to 24th pixels composing the 23rd row of the rectangular pattern are turned on 510th, 294th, 150th, 54th, 102nd, 198th, 366th, 462nd, 506th, 290th, 146th, 50th, 98th, 194th, 362nd, 458th, 508th, 292nd, 148th, 52nd, 100th, 196th, 364th, and 460th, respectively; and

(24) the 1st to 24th pixels composing the 24th row of the rectangular pattern are turned on 558th, 318th, 78th, 6th, 30th, 126th, 342nd, 486th, 554th, 314th, 74th, 2nd, 26th, 122nd, 338th, 482nd, 556th, 316th, 76th, 4th, 28th, 124th, 340th, and 484th, respectively.

Figure 15:
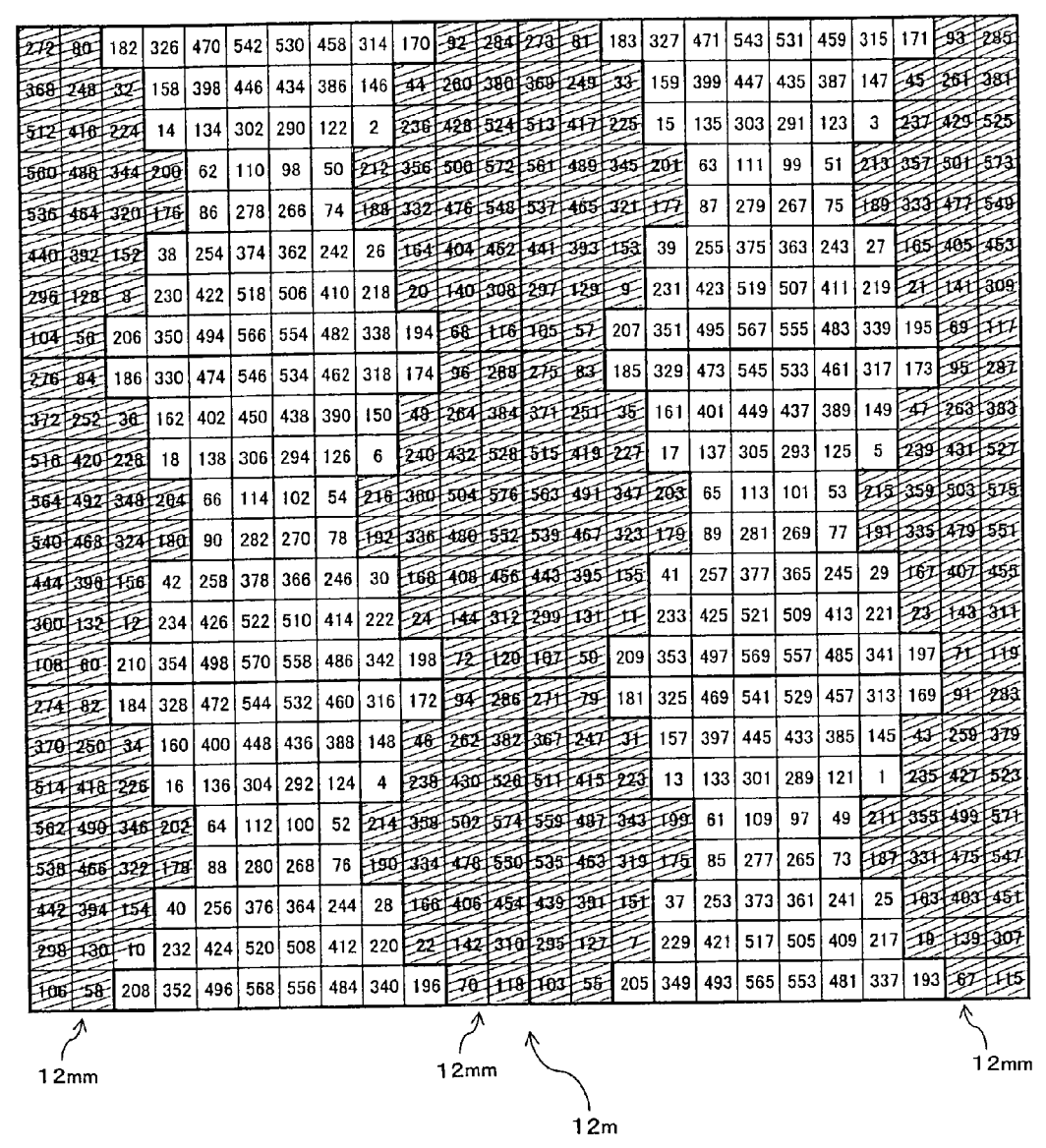

Binary-coding pattern 12*m* of FIG. 15 is composed of 576 pixels arranged in a matrix of 24 rows×24 columns, and has substantially the same construction as that which is obtained by tiling binary-form dither matrix patterns 12*e* of FIG. 7 both vertically and horizontally. In binary-coding pattern 12*m*, the sequence of turning on the pixels is set in such a way that dots having a roughly round shape grow in every unit pattern 12*mm*. In each unit pattern 12*mm* of binary-coding pattern 12*m*, two pixels (the pixel numbered 576 and that numbered 563) that adjoin one another and are disposed adjacently to the center of unit pattern 12*mm*, are first turned on successively. In binary-coding pattern 12*m* of FIG. 15, the 576 pixels are numbered in the following manner, and the turning on of the pixels is carried out in descending numeric order:

(1) the 1st to 24th pixels composing the first row of the rectangular pattern are numbered 272, 80, 182, 326, 470, 542, 530, 458, 314, 170, 92, 284, 273, 81, 183, 327, 471, 543, 531, 459, 315, 171, 93, and 285, respectively;

(2) the 1st to 24th pixels composing the second row of the rectangular pattern are numbered 368, 248, 32, 158, 398, 446, 434, 386, 146, 44, 260, 380, 369, 249, 33, 159, 399, 447, 435, 387, 147, 45, 261, and 381, respectively;

(3) the 1st to 24th pixels composing the third row of the rectangular pattern are numbered 512, 416, 224, 14, 134, 302, 290, 122, 2, 236, 428, 524, 513, 417, 225, 15, 135, 303, 291, 123, 3, 237, 429, and 525, respectively;

(4) the 1st to 24th pixels composing the fourth row of the rectangular pattern are numbered 560, 488, 344, 200, 62, 110, 98, 50, 212, 356, 500, 572, 561, 489, 345, 201, 63, 111, 99, 51, 213, 357, 501, and 573, respectively;

(5) the 1st to 24th pixels composing the fifth row of the rectangular pattern are numbered 536, 464, 320, 176, 86, 278, 266, 74, 188, 332, 476, 548, 537, 465, 321, 177, 87, 279, 267, 75, 189, 333, 477, and 549, respectively;

(6) the 1st to 24th pixels composing the sixth row of the rectangular pattern are numbered 440, 392, 152, 38, 254, 374, 362, 242, 26, 164, 404, 452, 441, 393, 153, 39, 255, 375, 363, 243, 27, 165, 405, and 453, respectively;

(7) the 1st to 24th pixels composing the seventh row of the rectangular pattern are numbered 296, 128, 8, 230, 422, 518, 506, 410, 218, 20, 140, 308, 297, 129, 9, 231, 423, 519, 507, 411, 219, 21, 141, and 309, respectively;

(8) the 1st to 24th pixels composing the eighth row of the rectangular pattern are numbered 104, 56, 206, 350, 494, 566, 554, 482, 338, 194, 68, 116, 105, 57, 207, 351, 495, 567, 555, 483, 339, 195, 69, and 117, respectively;

(9) the 1st to 24th pixels composing the ninth row of the rectangular pattern are numbered 276, 84, 186, 330, 474, 546, 534, 462, 318, 174, 96, 288, 275, 83, 185, 329, 473, 545, 533, 461, 317, 173, 95, and 287, respectively;

(10) the 1st to 24th pixels composing the 10th row of the rectangular pattern are numbered 372, 252, 36, 162, 402, 450, 438, 390, 150, 48, 264, 384, 371, 251, 35, 161, 401, 449, 437, 389, 149, 47, 263, and 383, respectively;

(11) the 1st to 24th pixels composing the 11th row of the rectangular pattern are numbered 516, 420, 228, 18, 138, 306, 294, 126, 6, 240, 432, 528, 515, 419, 227, 17, 137, 305, 293, 125, 5, 239, 431, and 527, respectively;

(12) the 1st to 24th pixels composing the twelfth row of the rectangular pattern are numbered 564, 492, 348, 204, 66, 114, 102, 54, 216, 360, 504, 576, 563, 491, 347, 203, 65, 113, 101, 53, 215, 359, 503, and 575, respectively;

(13) the 1st to 24th pixels composing the 13th row of the rectangular pattern are numbered 540, 468, 324, 180, 90, 282, 270, 78, 192, 336, 480, 552, 539, 467, 323, 179, 89, 281, 269, 77, 191, 335, 479, and 551, respectively;

(14) the 1st to 24th pixels composing the 14th row of the rectangular pattern are numbered 444, 396, 156, 42, 258, 378, 366, 246, 30, 168, 408, 456, 443, 395, 155, 41, 257, 377, 365, 245, 29, 167, 407, and 455, respectively;

(15) the 1st to 24th pixels composing the 15th row of the rectangular pattern are numbered 300, 132, 12, 234, 426, 522, 510, 414, 222, 24, 144, 312, 299, 131, 11, 233, 425, 521, 509, 413, 221, 23, 143, and 311, respectively;

(16) the 1st to 24th pixels composing the 16th row of the rectangular pattern are numbered 108, 60, 210, 354, 498, 570, 558, 486, 342, 198, 72, 120, 107, 59, 209, 353, 497, 569, 557, 485, 341, 197, 71, and 119, respectively;

(17) the 1st to 24th pixels composing the 17th row of the rectangular pattern are numbered 274, 82, 184, 328, 472, 544, 532, 460, 316, 172, 94, 286, 271, 79, 181, 325, 469, 541, 529, 457, 313, 169, 91, and 283, respectively;

(18) the 1st to 24th pixels composing the 18th row of the rectangular pattern are numbered 370, 250, 34, 160, 400, 448, 436, 388, 148, 46, 262, 382, 367, 247, 31, 157, 397, 445, 433, 385, 145, 43, 259, and 379, respectively;

(19) the 1st to 24th pixels composing the 19th row of the rectangular pattern are numbered 514, 418, 226, 16, 136, 304, 292, 124, 4, 238, 430, 526, 511, 415, 223, 13, 133, 301, 289, 121, 1, 235, 427, and 523, respectively;

(20) the 1st to 24th pixels composing the 20th row of the rectangular pattern are numbered 562, 490, 346, 202, 64, 112, 100, 52, 214, 358, 502, 574, 559, 487, 343, 199, 61, 109, 97, 49, 211, 355, 499, and 571, respectively;

(21) the 1st to 24th pixels composing the 21st row of the rectangular pattern are numbered 538, 466, 322, 178, 88, 280, 268, 76, 190, 334, 478, 550, 535, 463, 319, 175, 85, 277, 265, 73, 187, 331, 475, and 547, respectively;

(22) the 1st to 24th pixels composing the 22nd row of the rectangular pattern are numbered 442, 394, 154, 40, 256, 376, 364, 244, 28, 166, 406, 454, 439, 391, 151, 37, 253, 373, 361, 241, 25, 163, 403, and 451, respectively;

(23) the 1st to 24th pixels composing the 23rd row of the rectangular pattern are numbered 298, 130, 10, 232, 424, 520, 508, 412, 220, 22, 142, 310, 295, 127, 7, 229, 421, 517, 505, 409, 217, 19, 139, and 307, respectively; and

(24) the 1st to 24th pixels composing the 24th row of the rectangular pattern are numbered 106, 58, 208, 352, 496, 568, 556, 484, 340, 196, 70, 118, 103, 55, 205, 349, 493, 565, 553, 481, 337, 193, 67, and 115, respectively.

In other words, the sequence of turning on the 576 pixels is determined in such a way that the pixels are turned on in the following manner:

(1) the 1st to 24th pixels composing the first row of the rectangular pattern are turned on 305th, 497th, 395th, 251st, 107th, 35th, 47th, 119th, 263rd, 407th, 485th, 293rd, 304th, 496th, 394th, 250th, 106th, 34th, 46th, 118th, 262nd, 406th, 484th, and 292nd, respectively;

(2) the 1st to 24th pixels composing the second row of the rectangular pattern are turned on 209th, 329th, 545th, 419th, 179th, 131st, 143rd, 191st, 431st, 533rd, 317th, 197th, 208th, 328th, 544th, 418th, 178th, 130th, 142nd, 190th, 430th, 532nd, 316th, and 196th, respectively;

(3) the 1st to 24th pixels composing the third row of the rectangular pattern are turned on 65th, 161st, 353rd, 563rd, 443rd, 275th, 287th, 455th, 575th, 341st, 149th, 53rd, 64th, 160th, 352nd, 562nd, 442nd, 274th, 286th, 454th, 574th, 340th, 148th, and 52nd, respectively;

(4) the 1st to 24th pixels composing the fourth row of the rectangular pattern are turned on 17th, 89th, 233rd, 377th, 515th, 467th, 479th, 527th, 365th, 221st, 77th, 5th, 16th, 88th, 232nd, 376th, 514th, 466th, 478th, 526th, 364th, 220th, 76th, and 4th, respectively;

(5) the 1st to 24th pixels composing the fifth row of the rectangular pattern are turned on 41st, 113th, 257th, 401st, 491st, 299th, 311th, 503rd, 389th, 245th, 101st, 29th, 40th, 112th, 256th, 400th, 490th, 298th, 310th, 502nd, 388th, 244th, 100th, and 28th, respectively;

(6) the 1st to 24th pixels composing the sixth row of the rectangular pattern are turned on 137th, 185th, 425th, 539th, 323rd, 203rd, 215th, 335th, 551st, 413th, 173rd, 125th, 136th, 184th, 424th, 538th, 322nd, 202nd, 214th, 334th, 550th, 412th, 172nd, and 124th, respectively;

(7) the 1st to 24th pixels composing the seventh row of the rectangular pattern are turned on 281st, 449th, 569th, 347th, 155th, 59th, 71st, 167th, 359th, 557th, 437th, 269th, 280th, 448th, 568th, 346th, 154th, 58th, 70th, 166th, 358th, 556th, 436th, and 268th, respectively;

(8) the 1st to 24th pixels composing the eighth row of the rectangular pattern are turned on 473rd, 521st, 371st, 227th, 83rd, 11th, 23rd, 95th, 239th, 383rd, 509th, 461st, 472nd, 520th, 370th, 226th, 82nd, 10th, 22nd, 94th, 238th, 382nd, 508th, and 460th, respectively;

(9) the 1st to 24th pixels composing the ninth row of the rectangular pattern are turned on 301st, 493rd, 391st, 247th, 103rd, 31st, 43rd, 115th, 259th, 403rd, 481st, 289th, 302nd, 494th, 392nd, 248th, 104th, 32nd, 44th, 116th, 260th, 404th, 482nd, and 290th, respectively;

(10) the 1st to 24th pixels composing the 10th row of the rectangular pattern are turned on 205th, 325th, 541st, 415th, 175th, 127th, 139th, 187th, 427th, 529th, 313th, 193rd, 206th, 326th, 542nd, 416th, 176th, 128th, 140th, 188th, 428th, 530th, 314th, and 194th, respectively;

(11) the 1st to 24th pixels composing the 11th row of the rectangular pattern are turned on 61st, 157th, 349th, 559th, 439th, 271st, 283rd, 451st, 571st, 337th, 145th, 49th, 62nd, 158th, 350th, 560th, 440th, 272nd, 284th, 452nd, 572nd, 338th, 146th, and 50th, respectively;

(12) the 1st to 24th pixels composing the twelfth row of the rectangular pattern are turned on 13th, 85th, 229th, 373rd, 511th, 463rd, 475th, 523rd, 361st, 217th, 73rd, 1st, 14th, 86th, 230th, 374th, 512th, 464th, 476th, 524th, 362nd, 218th, 74th, and 2nd, respectively;

(13) the 1st to 24th pixels composing the 13th row of the rectangular pattern are turned on 37th, 109th, 253rd, 397th, 487th, 295th, 307th, 499th, 385th, 241st, 97th, 25th, 38th, 110th, 254th, 398th, 488th, 296th, 308th, 500th, 386th, 242nd, 98th, and 26th, respectively;

(14) the 1st to 24th pixels composing the 14th row of the rectangular pattern are turned on 133rd, 181st, 421st, 535th, 319th, 199th, 211th, 331st, 547th, 409th, 169th, 121st, 134th, 182nd, 422nd, 536th, 320th, 200th, 212th, 332nd, 548th, 410th, 170th, and 122nd, respectively;

(15) the 1st to 24th pixels composing the 15th row of the rectangular pattern are turned on 277th, 445th, 565th, 343rd, 151st, 55th, 67th, 163rd, 355th, 553rd, 433rd, 265th, 278th, 446th, 566th, 344th, 152nd, 56th, 68th, 164th, 356th, 554th, 434th, and 266th, respectively;

(16) the 1st to 24th pixels composing the 16th row of the rectangular pattern are turned on 469th, 517th, 367th, 223rd, 79th, 7th, 19th, 91st, 235th, 379th, 505th, 457th, 470th, 518th, 368th, 224th, 80th, 8th, 20th, 92nd, 236th, 380th, 506th, and 458th, respectively;

(17) the 1st to 24th pixels composing the 17th row of the rectangular pattern are turned on 303rd, 495th, 393rd, 249th, 105th, 33rd, 45th, 117th, 261st, 405th, 483rd, 291st, 306th, 498th, 396th, 252nd, 108th, 36th, 48th, 120th, 264th, 408th, 486th, and 294th, respectively;

(18) the 1st to 24th pixels composing the 18th row of the rectangular pattern are turned on 207th, 327th, 543rd, 417th, 177th, 129th, 141st, 189th, 429th, 531st, 315th, 195th, 210th, 330th, 546th, 420th, 180th, 132nd, 144th, 192nd, 432nd, 534th, 318th, and 198th, respectively;

(19) the 1st to 24th pixels composing the 19th row of the rectangular pattern are turned on 63rd, 159th, 351st, 561st, 441st, 273rd, 285th, 453rd, 573rd, 339th, 147th, 51st, 66th, 162nd, 354th, 564th, 444th, 276th, 288th, 456th, 576th, 342nd, 150th, and 54th, respectively;

(20) the 1st to 24th pixels composing the 20th row of the rectangular pattern are turned on 15th, 87th, 231st, 375th, 513th, 465th, 477th, 525th, 363rd, 219th, 75th, 3rd, 18th, 90th, 234th, 378th, 516th, 468th, 480th, 528th, 366th, 222nd, 78th, and 6th, respectively;

(21) the 1st to 24th pixels composing the 21st row of the rectangular pattern are turned on 39th, 111th, 255th, 399th, 489th, 297th, 309th, 501st, 387th, 243rd, 99th, 27th, 42nd, 114th, 258th, 402nd, 492nd, 300th, 312th, 504th, 390th, 246th, 102nd, and 30th, respectively;

(22) the 1st to 24th pixels composing the 22nd row of the rectangular pattern are turned on 135th, 183rd, 423rd, 537th, 321st, 201st, 213th, 333rd, 549th, 411th, 171st, 123rd, 138th, 186th, 426th, 540th, 324th, 204th, 216th, 336th, 552nd, 414th, 174th, and 126th, respectively;

(23) the 1st to 24th pixels composing the 23rd row of the rectangular pattern are turned on 279th, 447th, 567th, 345th, 153rd, 57th, 69th, 165th, 357th, 555th, 435th, 267th, 282nd, 450th, 570th, 348th, 156th, 60th, 72nd, 168th, 360th, 558th, 438th, and 270th, respectively; and

(24) the 1st to 24th pixels composing the 24th row of the rectangular pattern are turned on 471st, 519th, 369th, 225th, 81st, 9th, 21st, 93rd, 237th, 381st, 507th, 459th, 474th, 522nd, 372nd, 228th, 84th, 12th, 24th, 96th, 240th, 384th, 510th, and 462nd, respectively.

Figure 16:
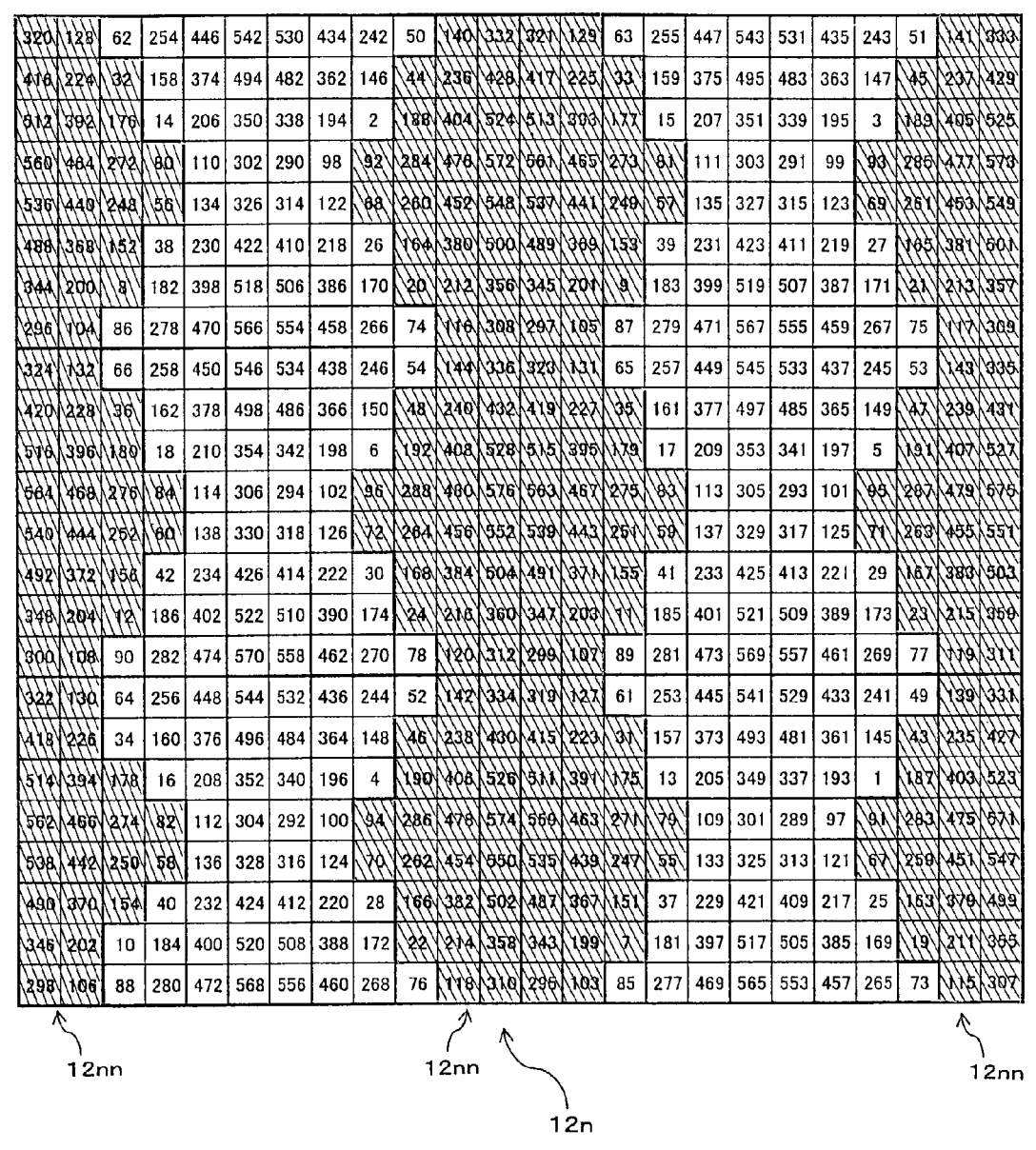

Binary-coding pattern 12n of FIG. 16 is composed of 576 pixels arranged in a matrix of 24 rows×24 columns, and has substantially the same construction as that which is obtained by tiling binary-form dither matrix patterns 12f of FIG. 8 both vertically and horizontally. In binary-coding pattern 12f, the sequence of turning on the pixels is set in such a way that dots having a roughly oval shape (the degree of flattening≈0.8) grow in respective unit patterns 12nn. In each unit pattern 12nn of binary-coding pattern 12n, two pixels (for example, the pixel numbered 576 and that numbered 563) that are disposed diametrically symmetrically to one another with respect to the center of unit pattern 12nn are first turned on successively. In binary-coding pattern 12n of FIG. 16, the 576 pixels are numbered in the following manner, and the turning on of the pixels is carried out in descending numeric order:

(1) the 1st to 24th pixels composing the first row of the rectangular pattern are numbered 320, 128, 62, 254, 446, 542, 530, 434, 242, 50, 140, 332, 321, 129, 63, 255, 447, 543, 531, 435, 243, 51, 141, and 333, respectively;

(2) the 1st to 24th pixels composing the second row of the rectangular pattern are numbered 416, 224, 32, 158, 374, 494, 482, 362, 146, 44, 236, 428, 417, 225, 33, 159, 375, 495, 483, 363, 147, 45, 237, and 429, respectively;

(3) the 1st to 24th pixels composing the third row of the rectangular pattern are numbered 512, 392, 176, 14, 206, 350, 338, 194, 2, 188, 404, 524, 513, 393, 177, 15, 207, 351, 339, 195, 3, 189, 405, and 525, respectively;

(4) the 1st to 24th pixels composing the fourth row of the rectangular pattern are numbered 560, 464, 272, 80, 110, 302, 290, 98, 92, 284, 476, 572, 561, 465, 273, 81, 111, 303, 291, 99, 93, 285, 477, and 573, respectively;

(5) the 1st to 24th pixels composing the fifth row of the rectangular pattern are numbered 536, 440, 248, 56, 134, 326, 314, 122, 68, 260, 452, 548, 537, 441, 249, 57, 135, 327, 315, 123, 69, 261, 453, and 549, respectively;

(6) the 1st to 24th pixels composing the sixth row of the rectangular pattern are numbered 488, 368, 152, 38, 230, 422, 410, 218, 26, 164, 380, 500, 489, 369, 153, 39, 231, 423, 411, 219, 27, 165, 381, and 501, respectively;

(7) the 1st to 24th pixels composing the seventh row of the rectangular pattern are numbered 344, 200, 8, 182, 398, 518, 506, 386, 170, 20, 212, 356, 345, 201, 9, 183, 399, 519, 507, 387, 171, 21, 213, and 357, respectively;

(8) the 1st to 24th pixels composing the eighth row of the rectangular pattern are numbered 296, 104, 86, 278, 470, 566, 554, 458, 266, 74, 116, 308, 297, 105, 87, 279, 471, 567, 555, 459, 267, 75, 117, and 309, respectively;

(9) the 1st to 24th pixels composing the ninth row of the rectangular pattern are numbered 324, 132, 66, 258, 450, 546, 534, 438, 246, 54, 144, 336, 323, 131, 65, 257, 449, 545, 533, 437, 245, 53, 143, and 335, respectively;

(10) the 1st to 24th pixels composing the 10th row of the rectangular pattern are numbered 420, 228, 36, 162, 378, 498, 486, 366, 150, 48, 240, 432, 419, 227, 35, 161, 377, 497, 485, 365, 149, 47, 239, and 431, respectively;

(11) the 1st to 24th pixels composing the 11th row of the rectangular pattern are numbered 516, 396, 180, 18, 210, 354, 342, 198, 6, 192, 408, 528, 515, 395, 179, 17, 209, 353, 341, 197, 5, 191, 407, and 527, respectively;

(12) the 1st to 24th pixels composing the twelfth row of the rectangular pattern are numbered 564, 468, 276, 84, 114, 306, 294, 102, 96, 288, 480, 576, 563, 467, 275, 83, 113, 305, 293, 101, 95, 287, 479, and 575, respectively;

(13) the 1st to 24th pixels composing the 13th row of the rectangular pattern are numbered 540, 444, 252, 60, 138, 330, 318, 126, 72, 264, 456, 552, 539, 443, 251, 59, 137, 329, 317, 125, 71, 263, 455, and 551, respectively;

(14) the 1st to 24th pixels composing the 14th row of the rectangular pattern are numbered 492, 372, 156, 42, 234, 426, 414, 222, 30, 168, 384, 504, 491, 371, 155, 41, 233, 425, 413, 221, 29, 167, 383, and 503, respectively;

(15) the 1st to 24th pixels composing the 15th row of the rectangular pattern are numbered 348, 204, 12, 186, 402, 522, 510, 390, 174, 24, 216, 360, 347, 203, 11, 185, 401, 521, 509, 389, 173, 23, 215, and 359, respectively;

(16) the 1st to 24th pixels composing the 16th row of the rectangular pattern are numbered 300, 108, 90, 282, 474, 570, 558, 462, 270, 78, 120, 312, 299, 107, 89, 281, 473, 569, 557, 461, 269, 77, 119, and 311, respectively;

(17) the 1st to 24th pixels composing the 17th row of the rectangular pattern are numbered 322, 130, 64, 256, 448, 544, 532, 436, 244, 52, 142, 334, 319, 127, 61, 253, 445, 541, 529, 433, 241, 49, 139, and 331, respectively;

(18) the 1st to 24th pixels composing the 18th row of the rectangular pattern are numbered 418, 226, 34, 160, 376, 496, 484, 364, 148, 46, 238, 430, 415, 223, 31, 157, 373, 493, 481, 361, 145, 43, 235, and 427, respectively;

(19) the 1st to 24th pixels composing the 19th row of the rectangular pattern are numbered 514, 394, 178, 16, 208, 352, 340, 196, 4, 190, 406, 526, 511, 391, 175, 13, 205, 349, 337, 193, 1, 187, 403, and 523, respectively;

(20) the 1st to 24th pixels composing the 20th row of the rectangular pattern are numbered 562, 466, 274, 82, 112, 304, 292, 100, 94, 286, 478, 574, 559, 463, 271, 79, 109, 301, 289, 97, 91, 283, 475, and 571, respectively;

(21) the 1st to 24th pixels composing the 21st row of the rectangular pattern are numbered 538, 442, 250, 58, 136, 328, 316, 124, 70, 262, 454, 550, 535, 439, 247, 55, 133, 325, 313, 121, 67, 259, 451, and 547, respectively;

(22) the 1st to 24th pixels composing the 22 row of the rectangular pattern are numbered 490, 370, 154, 40, 232, 424, 412, 220, 28, 166, 382, 502, 487, 367, 151, 37, 229, 421, 409, 217, 25, 163, 379, and 499, respectively;

(23) the 1st to 24th pixels composing the 23rd row of the rectangular pattern are numbered 346, 202, 10, 184, 400, 520, 508, 388, 172, 22, 214, 358, 343, 199, 7, 181, 397, 517, 505, 385, 169, 19, 211, and 355, respectively; and

(24) the 1st to 24th pixels composing the 24th row of the rectangular pattern are numbered 298, 106, 88, 280, 472, 568, 556, 460, 268, 76, 118, 310, 295, 103, 85, 277, 469, 565, 553, 457, 265, 73, 115, and 307, respectively.

In other words, the sequence of turning on the 576 pixels is determined in such a way that the pixels are turned on in the following manner:

(1) the 1st to 24th pixels composing the first row of the rectangular pattern are turned on 257th, 449th, 515th, 323rd, 131st, 35th, 47th, 143rd, 335th, 527th, 437th, 245th, 256th, 448th, 514th, 322nd, 130th, 34th, 46th, 142nd, 334th, 526th, 436th, and 244th, respectively;

(2) the 1st to 24th pixels composing the second row of the rectangular pattern are turned on 161st, 353rd, 545th, 419th, 203rd, 83rd, 95th, 215th, 431st, 533rd, 341st, 149th, 160th, 352nd, 544th, 418th, 202nd, 82nd, 94th, 214th, 430th, 532nd, 340th, and 148th, respectively;

(3) the 1st to 24th pixels composing the third row of the rectangular pattern are turned on 65th, 185th, 401st, 563rd, 371st, 227th, 239th, 383rd, 575th, 389th, 173rd, 53rd, 64th, 184th, 400th, 562nd, 370th, 226th, 238th, 382nd, 574th, 388th, 172nd, and 52nd, respectively;

(4) the 1st to 24th pixels composing the fourth row of the rectangular pattern are turned on 17th, 113th, 305th, 497th, 467th, 275th, 287th, 479th, 485th, 293rd, 101st, 5th, 16th, 112th, 304th, 496th, 466th, 274th, 286th, 478th, 484th, 292nd, 100th, and 4th, respectively;

(5) the 1st to 24th pixels composing the fifth row of the rectangular pattern are turned on 41st, 137th, 329th, 521st, 443rd, 251st, 263rd, 455th, 509th, 317th, 125th, 29th, 40th, 136th, 328th, 520th, 442nd, 250th, 262nd, 454th, 508th, 316th, 124th, and 28th, respectively;

(6) the 1st to 24th pixels composing the sixth row of the rectangular pattern are turned on 89th, 209th, 425th, 539th, 347th, 155th, 167th, 359th, 551st, 413th, 197th, 77th, 88th, 208th, 424th, 538th, 346th, 154th, 166th, 358th, 550th, 412th, 196th, and 76th, respectively;

(7) the 1st to 24th pixels composing the seventh row of the rectangular pattern are turned on 233rd, 377th, 569th, 395th, 179th, 59th, 71st, 191st, 407th, 557th, 365th, 221st, 232nd, 376th, 568th, 394th, 178th, 58th, 70th, 190th, 406th, 556th, 364th, and 220th, respectively;

(8) the 1st to 24th pixels composing the eighth row of the rectangular pattern are turned on 281st, 473rd, 491st, 299th, 107th, 11th, 23rd, 119th, 311th, 503rd, 461st, 269th, 280th, 472nd, 490th, 298th, 106th, 10th, 22nd, 118th, 310th, 502nd, 460th, and 268th, respectively;

(9) the 1st to 24th pixels composing the ninth row of the rectangular pattern are turned on 253rd, 445th, 511th, 319th, 127th, 31st, 43rd, 139th, 331st, 523rd, 433rd, 241st, 254th, 446th, 512th, 320th, 128th, 32nd, 44th, 140th, 332nd, 524th, 434th, and 242nd, respectively;

(10) the 1st to 24th pixels composing the 10th row of the rectangular pattern are turned on 157th, 349th, 541st, 415th, 199th, 79th, 91st, 211th, 427th, 529th, 337th, 145th, 158th, 350th, 542nd, 416th, 200th, 80th, 92nd, 212th, 428th, 530th, 338th, and 146th, respectively;

(11) the 1st to 24th pixels composing the 11th row of the rectangular pattern are turned on 61st, 181st, 397th, 559th, 367th, 223rd, 235th, 379th, 571st, 385th, 169th, 49th, 62nd, 182nd, 398th, 560th, 368th, 224th, 236th, 380th, 572nd, 386th, 170th, and 50th, respectively;

(12) the 1st to 24th pixels composing the twelfth row of the rectangular pattern are turned on 13th, 109th, 301st, 493rd, 463rd, 271st, 283rd, 475th, 481st, 289th, 97th, 1st, 14th, 110th, 302nd, 494th, 464th, 272nd, 284th, 476th, 482nd, 290th, 98th, and 2nd, respectively;

(13) the 1st to 24th pixels composing the 13th row of the rectangular pattern are turned on 37th, 133rd, 325th, 517th, 439th, 247th, 259th, 451st, 505th, 313th, 121st, 25th, 38th, 134th, 326th, 518th, 440th, 248th, 260th, 452nd, 506th, 314th, 122nd, and 26th, respectively;

(14) the 1st to 24th pixels composing the 14th row of the rectangular pattern are turned on 85th, 205th, 421st, 535th, 343rd, 151st, 163rd, 355th, 547th, 409th, 193rd, 73rd, 86th, 206th, 422nd, 536th, 344th, 152nd, 164th, 356th, 548th, 410th, 194th, and 74th, respectively;

(15) the 1st to 24th pixels composing the 15th row of the rectangular pattern are turned on 229th, 373rd, 565th, 391st, 175th, 55th, 67th, 187th, 403rd, 553rd, 361st, 217th, 230th, 374th, 566th, 392nd, 176th, 56th, 68th, 188th, 404th, 554th, 362nd, and 218th, respectively;

(16) the 1st to 24th pixels composing the 16th row of the rectangular pattern are turned on 277th, 469th, 487th, 295th, 103rd, 7th, 19th, 115th, 307th, 499th, 457th, 265th, 278th, 470th, 488th, 296th, 104th, 8th, 20th, 116th, 308th, 500th, 458th, and 266th, respectively;

(17) the 1st to 24th pixels composing the 17th row of the rectangular pattern are turned on 255th, 447th, 513th, 321st, 129th, 33rd, 45th, 141st, 333rd, 525th, 435th, 243rd, 258th, 450th, 516th, 324th, 132nd, 36th, 48th, 144th, 336th, 528th, 438th, and 246th, respectively;

(18) the 1st to 24th pixels composing the 18th row of the rectangular pattern are turned on 159th, 351st, 543rd, 417th, 201st, 81st, 93rd, 213th, 429th, 531st, 339th, 147th, 162nd, 354th, 546th, 420th, 204th, 84th, 96th, 216th, 432nd, 534th, 342nd, and 150th, respectively;

(19) the 1st to 24th pixels composing the 19th row of the rectangular pattern are turned on 63rd, 183rd, 399th, 561st, 369th, 225th, 237th, 381st, 573rd, 387th, 171st, 51st, 66th, 186th, 402nd, 564th, 372nd, 228th, 240th, 384th, 576th, 390th, 174th, and 54th, respectively;

(20) the 1st to 24th pixels composing the 20th row of the rectangular pattern are turned on 15th, 111th, 303rd, 495th, 465th, 273rd, 285th, 477th, 483rd, 291st, 99th, 3rd, 18th, 114th, 306th, 498th, 468th, 276th, 288th, 480th, 486th, 294th, 102nd, and 6th, respectively;

(21) the 1st to 24th pixels composing the 21st row of the rectangular pattern are turned on 39th, 135th, 327th, 519th, 441st, 249th, 261st, 453rd, 507th, 315th, 123rd, 27th, 42nd, 138th, 330th, 522nd, 444th, 252nd, 264th, 456th, 510th, 318th, 126th, and 30th, respectively;

(22) the 1st to 24th pixels composing the 22nd row of the rectangular pattern are turned on 87th, 207th, 423rd, 537th, 345th, 153rd, 165th, 357th, 549th, 411th, 195th, 75th, 90th, 210th, 426th, 540th, 348th, 156th, 168th, 360th, 552nd, 414th, 198th, and 78th, respectively;

(23) the 1st to 24th pixels composing the 23rd row of the rectangular pattern are turned on 231st, 375th, 567th, 393rd, 177th, 57th, 69th, 189th, 405th, 555th, 363rd, 219th, 234th, 378th, 570th, 396th, 180th, 60th, 72nd, 192nd, 408th, 558th, 366th, and 222nd, respectively; and

(24) the 1st to 24th pixels composing the 24th row of the rectangular pattern are turned on 279th, 471st, 489th, 297th, 105th, 9th, 21st, 117th, 309th, 501st, 459th, 267th, 282nd, 474th, 492nd, 300th, 108th, 12th, 24th, 120th, 312th, 504th, 462nd, and 270th, respectively.

Binary-coding pattern 12*o* of FIG. 17 is composed of 576 pixels arranged in a matrix of 24 rows×24 columns, and has substantially the same construction as that which is obtained by tiling binary-form dither matrix patterns 12*g* of FIG. 9 both vertically and horizontally. In binary-coding pattern 12*o*, the sequence of turning on the pixels is set in such a way that dots having a roughly round shape grow in every unit pattern 12*oo*. In each unit pattern 12*oo* of binary-coding pattern 12*o*, two pixels (the pixel numbered 576 and that numbered 564) that adjoin one another and are disposed adjacently to the center of unit pattern 12*oo*, are first turned on successively. In binary-coding pattern 12*o* of FIG. 17, the 576 pixels are numbered in the following manner, and the turning on of the pixels is carried out in descending numeric order:

(1) the 1st to 24th pixels composing the first row of the rectangular pattern are numbered 94, 334, 502, 550, 538, 454, 262, 34, 96, 336, 504, 552, 540, 456, 264, 36, 92, 332, 500, 548, 536, 452, 260, and 32, respectively;

(2) the 1st to 24th pixels composing the second row of the rectangular pattern are numbered 202, 322, 406, 442, 490, 394, 142, 22, 204, 324, 408, 444, 492, 396, 144, 24, 200, 320, 404, 440, 488, 392, 140, and 20, respectively;

(3) the 1st to 24th pixels composing the third row of the rectangular pattern are numbered 64, 190, 130, 250, 310, 298, 178, 112, 66, 192, 132, 252, 312, 300, 180, 114, 62, 188, 128, 248, 308, 296, 176, and 110, respectively;

(4) the 1st to 24th pixels composing the fourth row of the rectangular pattern are numbered 280, 160, 220, 10, 82, 232, 376, 364, 282, 162, 222, 12, 84, 234, 378, 366, 278, 158, 218, 8, 80, 230, 374, and 362, respectively;

(5) the 1st to 24th pixels composing the fifth row of the rectangular pattern are numbered 472, 412, 352, 208, 52, 148, 424, 520, 474, 414, 354, 210, 54, 150, 426, 522, 470, 410, 350, 206, 50, 146, 422, and 518, respectively;

(6) the 1st to 24th pixels composing the sixth row of the rectangular pattern are numbered 556, 508, 340, 100, 40, 268, 460, 568, 558, 510, 342, 102, 42, 270, 462, 570, 554, 506, 338, 98, 38, 266, 458, and 566, respectively;

(7) the 1st to 24th pixels composing the seventh row of the rectangular pattern are numbered 532, 448, 256, 28, 88, 328, 496, 544, 534, 450, 258, 30, 90, 330, 498, 546, 530, 446, 254, 26, 86, 326, 494, and 542, respectively;

(8) the 1st to 24th pixels composing the eighth row of the rectangular pattern are numbered 484, 388, 136, 16, 196, 316, 400, 436, 486, 390, 138, 18, 198, 318, 402, 438, 482, 386, 134, 14, 194, 314, 398, and 434, respectively;

(9) the 1st to 24th pixels composing the ninth row of the rectangular pattern are numbered 304, 292, 172, 118, 70, 184, 124, 244, 306, 294, 174, 120, 72, 186, 126, 246, 302, 290, 170, 116, 68, 182, 122, and 242, respectively;

(10) the 1st to 24th pixels composing the 10th row of the rectangular pattern are numbered 76, 238, 382, 370, 286, 166, 226, 4, 78, 240, 384, 372, 288, 168, 228, 6, 74, 236, 380, 368, 284, 164, 224, and 2, respectively;

(11) the 1st to 24th pixels composing the 11th row of the rectangular pattern are numbered 58, 154, 430, 526, 478, 418, 358, 214, 60, 156, 432, 528, 480, 420, 360, 216, 56, 152, 428, 524, 476, 416, 356, and 212, respectively;

(12) the 1st to 24th pixels composing the twelfth row of the rectangular pattern are numbered 46, 274, 466, 574, 562, 514, 346, 106, 48, 276, 468, 576, 564, 516, 348, 108, 44, 272, 464, 572, 560, 512, 344, and 104, respectively;

(13) the 1st to 24th pixels composing the 13th row of the rectangular pattern are numbered 91, 331, 499, 547, 535, 451, 259, 31, 95, 335, 503, 551, 539, 455, 263, 35, 93, 333, 501, 549, 537, 453, 261, and 33, respectively;

(14) the 1st to 24th pixels composing the 14th row of the rectangular pattern are numbered 199, 319, 403, 439, 487, 391, 139, 19, 203, 323, 407, 443, 491, 395, 143, 23, 201, 321, 405, 441, 489, 393, 141, and 21, respectively;

(15) the 1st to 24th pixels composing the 15th row of the rectangular pattern are numbered 61, 187, 127, 247, 307, 295, 175, 109, 65, 191, 131, 251, 311, 299, 179, 113, 63, 189, 129, 249, 309, 297, 177, and 111, respectively,;

(16) the 1st to 24th pixels composing the 16th row of the rectangular pattern are numbered 277, 157, 217, 7, 79, 229, 373, 361, 281, 161, 221, 11, 83, 233, 377, 365, 279, 159, 219, 9, 81, 231, 375, and 363, respectively;

(17) the 1st to 24th pixels composing the 17th row of the rectangular pattern are numbered 469, 409, 349, 205, 49, 145, 421, 517, 473, 413, 353, 209, 53, 149, 425, 521, 471, 411, 351, 207, 51, 147, 423, and 519, respectively;

(18) the 1st to 24th pixels composing the 18th row of the rectangular pattern are numbered 553, 505, 337, 97, 37, 265, 457, 565, 557, 509, 341, 101, 41, 269, 461, 569, 555, 507, 339, 99, 39, 267, 459, and 567, respectively;

(19) the 1st to 24th pixels composing the 19th row of the rectangular pattern are numbered 529, 445, 253, 25, 85, 325, 493, 541, 533, 449, 257, 29, 89, 329, 497, 545, 531, 447, 255, 27, 87, 327, 495, and 543, respectively;

(20) the 1st to 24th pixels composing the 20th row of the rectangular pattern are numbered 481, 385, 133, 13, 193, 313, 397, 433, 485, 389, 137, 17, 197, 317, 401, 437, 483, 387, 135, 15, 195, 315, 399, and 435, respectively;

(21) the 1st to 24th pixels composing the 21st row of the rectangular pattern are numbered 301, 289, 169, 115, 67, 181, 121, 241, 305, 293, 173, 119, 71, 185, 125, 245, 303, 291, 171, 117, 69, 183, 123, and 243, respectively;

(22) the 1st to 24th pixels composing the 22nd row of the rectangular pattern are numbered 73, 235, 379, 367, 283, 163, 223, 1, 77, 239, 383, 371, 287, 167, 227, 5, 75, 237, 381, 369, 285, 165, 225, and 3, respectively,;

(23) the 1st to 24th pixels composing the 23rd row of the rectangular pattern are numbered 55, 151, 427, 523, 475, 415, 355, 211, 59, 155, 431, 527, 479, 419, 359, 215, 57, 153, 429, 525, 477, 417, 357, and 213, respectively; and

(24) the 1st to 24th pixels composing the 24th row of the rectangular pattern are numbered 43, 271, 463, 571, 559, 511, 343, 103, 47, 275, 467, 575, 563, 515, 347, 107, 45, 273, 465, 573, 561, 513, 345, and 105, respectively.

In other words, the sequence of turning on the 576 pixels is determined in such a way that the pixels are turned on in the following manner:

(1) the 1st to 24th pixels composing the first row of the rectangular pattern are turned on 483rd, 243rd, 75th, 27th, 39th, 123rd, 315th, 543rd, 481st, 241st, 73rd, 25th, 37th, 121st, 313th, 541st, 485th, 245th, 77th, 29th, 41st, 125th, 317th, and 545th, respectively;

(2) the 1st to 24th pixels composing the second row of the rectangular pattern are turned on 375th, 255th, 171st, 135th, 87th, 183rd, 435th, 555th, 373rd, 253rd, 169th, 133rd, 85th, 181st, 433rd, 553rd, 377th, 257th, 173rd, 137th, 89th, 185th, 437th, and 557th, respectively;

(3) the 1st to 24th pixels composing the third row of the rectangular pattern are turned on 513th, 387th, 447th, 327th, 267th, 279th, 399th, 465th, 511th, 385th, 445th, 325th, 265th, 277th, 397th, 463rd, 515th, 389th, 449th, 329th, 269th, 281st, 401st, and 467th, respectively;

(4) the 1st to 24th pixels composing the fourth row of the rectangular pattern are turned on 297th, 417th, 357th, 567th, 495th, 345th, 201st, 213th, 295th, 415th, 355th, 565th, 493rd, 343rd, 199th, 211th, 299th, 419th, 359th, 569th, 497th, 347th, 203rd, and 215th, respectively;

(5) the 1st to 24th pixels composing the fifth row of the rectangular pattern are turned on 105th, 165th, 225th, 369th, 525th, 429th, 153rd, 57th, 103rd, 163rd, 223rd, 367th, 523rd, 427th, 151st, 55th, 107th, 167th, 227th, 371st, 527th, 431st, 155th, and 59th, respectively;

(6) the 1st to 24th pixels composing the sixth row of the rectangular pattern are turned on 21st, 69th, 237th, 477th, 537th, 309th, 117th, 9th, 19th, 67th, 235th, 475th, 535th, 307th, 115th, 7th, 23rd, 71st, 239th, 479th, 539th, 311th, 119th, and 11th, respectively;

(7) the 1st to 24th pixels composing the seventh row of the rectangular pattern are turned on 45th, 129th, 321st, 549th, 489th, 249th, 81st, 33rd, 43rd, 127th, 319th, 547th, 487th, 247th, 79th, 31st, 47th, 131st, 323rd, 551st, 491st, 251st, 83rd, and 35th, respectively;

(8) the 1st to 24th pixels composing the eighth row of the rectangular pattern are turned on 93rd, 189th, 441st, 561st, 381st, 261st, 177th, 141st, 91st, 187th, 439th, 559th, 379th, 259th, 175th, 139th, 95th, 191st, 443rd, 563rd, 383rd, 263rd, 179th, and 143rd, respectively;

(9) the 1st to 24th pixels composing the ninth row of the rectangular pattern are turned on 273rd, 285th, 405th, 459th, 507th, 393rd, 453rd, 333rd, 271st, 283rd, 403rd, 457th, 505th, 391st, 451st, 331st, 275th, 287th, 407th, 461st, 509th, 395th, 455th, and 335th, respectively;

(10) the 1st to 24th pixels composing the 10th row of the rectangular pattern are turned on 501st, 339th, 195th, 207th, 291st, 411th, 351st, 573rd, 499th, 337th, 193rd, 205th, 289th, 409th, 349th, 571st, 503rd, 341st, 197th, 209th, 293rd, 413th, 353rd, and 575th, respectively;

(11) the 1st to 24th pixels composing the 11th row of the rectangular pattern are turned on 519th, 423rd, 147th, 51st, 99th, 159th, 219th, 363rd, 517th, 421st, 145th, 49th, 97th, 157th, 217th, 361st, 521st, 425th, 149th, 53rd, 101st, 161st, 221st, and 365th, respectively;

(12) the 1st to 24th pixels composing the twelfth row of the rectangular pattern are turned on 531st, 303rd, 111th, 3rd, 15th, 63rd, 231st, 471st, 529th, 301st, 109th, 1st, 13th, 61st, 229th, 469th, 533rd, 305th, 113th, 5th, 17th, 65th, 233rd, and 473rd, respectively;

(13) the 1st to 24th pixels composing the 13th row of the rectangular pattern are turned on 486th, 246th, 78th, 30th, 42nd, 126th, 318th, 546th, 482nd, 242nd, 74th, 26th, 38th, 122nd, 314th, 542nd, 484th, 244th, 76th, 28th, 40th, 124th, 316th, and 544th, respectively;

(14) the 1st to 24th pixels composing the 14th row of the rectangular pattern are turned on 378th, 258th, 174th, 138th, 90th, 186th, 438th, 558th, 374th, 254th, 170th, 134th, 86th, 182nd, 434th, 554th, 376th, 256th, 172nd, 136th, 88th, 184th, 436th, and 556th, respectively;

(15) the 1st to 24th pixels composing the 15th row of the rectangular pattern are turned on 516th, 390th, 450th, 330th, 270th, 282nd, 402nd, 468th, 512th, 386th, 446th, 326th, 266th, 278th, 398th, 464th, 514th, 388th, 448th, 328th, 268th, 280th, 400th, and 466th, respectively;

(16) the 1st to 24th pixels composing the 16th row of the rectangular pattern are turned on 300th, 420th, 360th, 570th, 498th, 348th, 204th, 216th, 296th, 416th, 356th, 566th, 494th, 344th, 200th, 212th, 298th, 418th, 358th, 568th, 496th, 346th, 202nd, and 214th, respectively;

(17) the 1st to 24th pixels composing the 17th row of the rectangular pattern are turned on 108th, 168th, 228th, 372nd, 528th, 432nd, 156th, 60th, 104th, 164th, 224th, 368th, 524th, 428th, 152nd, 56th, 106th, 166th, 226th, 370th, 526th, 430th, 154th, and 58th, respectively;

(18) the 1st to 24th pixels composing the 18th row of the rectangular pattern are turned on 24th, 72nd, 240th, 480th, 540th, 312th, 120th, 12th, 20th, 68th, 236th, 476th, 536th, 308th, 116th, 8th, 22nd, 70th, 238th, 478th, 538th, 310th, 118th, and 10th, respectively;

(19) the 1st to 24th pixels composing the 19th row of the rectangular pattern are turned on 48th, 132nd, 324th, 552nd, 492nd, 252nd, 84th, 36th, 44th, 128th, 320th, 548th, 488th, 248th, 80th, 32nd, 46th, 130th, 322nd, 550th, 490th, 250th, 82nd, and 34th, respectively;

(20) the 1st to 24th pixels composing the 20th row of the rectangular pattern are turned on 96th, 192nd, 444th, 564th, 384th, 264th, 180th, 144th, 92nd, 188th, 440th, 560th, 380th, 260th, 176th, 140th, 94th, 190th, 442nd, 562nd, 382nd, 262nd, 178th, and 142nd, respectively;

(21) the 1st to 24th pixels composing the 21st row of the rectangular pattern are turned on 276th, 288th, 408th, 462nd, 510th, 396th, 456th, 336th, 272nd, 284th, 404th, 458th, 506th, 392nd, 452nd, 332nd, 274th, 286th, 406th, 460th, 508th, 394th, 454th, and 334th, respectively;

(22) the 1st to 24th pixels composing the 22nd row of the rectangular pattern are turned on 504th, 342nd, 198th, 210th, 294th, 414th, 354th, 576th, 500th, 338th, 194th, 206th, 290th, 410th, 350th, 572nd, 502nd, 340th, 196th, 208th, 292nd, 412th, 352nd, and 574th, respectively;

(23) the 1st to 24th pixels composing the 23rd row of the rectangular pattern are turned on 522nd, 426th, 150th, 54th, 102nd, 162nd, 222nd, 366th, 518th, 422nd, 146th, 50th, 98th, 158th, 218th, 362nd, 520th, 424th, 148th, 52nd, 100th, 160th, 220th, and 364th, respectively; and

(24) the 1st to 24th pixels composing the 24th row of the rectangular pattern are turned on 534th, 306th, 114th, 6th, 18th, 66th, 234th, 474th, 530th, 302nd, 110th, 2nd, 14th, 62nd, 230th, 470th, 532nd, 304th, 112th, 4th, 16th, 64th, 232nd, and 472nd, respectively.

Binary-coding pattern 12*p* of FIG. 18 is composed of 576 pixels arranged in a matrix of 24 rows×24 columns, and has substantially the same construction as that which is obtained by tiling binary-form dither matrix patterns 12h of FIG. 10 both vertically and horizontally. In binary-form dither matrix pattern 12p, the sequence of turning on the pixels is set in such a way that dots having a roughly oval shape (the degree of flattening≈0.8) grow in respective unit patterns 12pp. In each unit pattern 12pp of binary-coding pattern 12p, two pixels (for example, the pixel numbered 576 and that numbered 564) that are disposed diametrically symmetrically to one another with respect to the center of unit pattern 12pp are first turned on successively. In binary-coding pattern 12p of FIG. 18, the 576 pixels are numbered in the following manner, and the turning on of the pixels is carried out in descending numeric order:

(1) the 1st to 24th pixels composing the first row of the rectangular pattern are numbered 82, 262, 454, 538, 562, 490, 250, 10, 84, 264, 456, 540, 564, 492, 252, 12, 80, 260, 452, 536, 560, 488, 248, and 8, respectively;

(2) the 1st to 24th pixels composing the second row of the rectangular pattern are numbered 118, 202, 370, 442, 514, 418, 238, 58, 120, 204, 372, 444, 516, 420, 240, 60, 116, 200, 368, 440, 512, 416, 236, and 56, respectively;

(3) the 1st to 24th pixels composing the third row of the rectangular pattern are numbered 40, 106, 166, 226, 346, 394, 322, 184, 42, 108, 168, 228, 348, 396, 324, 186, 38, 104, 164, 224, 344, 392, 320, and 182, respectively;

(4) the 1st to 24th pixels composing the fourth row of the rectangular pattern are numbered 304, 172, 136, 34, 154, 328, 400, 352, 306, 174, 138, 36, 156, 330, 402, 354, 302, 170, 134, 32, 152, 326, 398, and 350, respectively;

(5) the 1st to 24th pixels composing the fifth row of the rectangular pattern are numbered 472, 376, 208, 124, 64, 292, 424, 520, 474, 378, 210, 126, 66, 294, 426, 522, 470, 374, 206, 122, 62, 290, 422, and 518, respectively;

(6) the 1st to 24th pixels composing the sixth row of the rectangular pattern are numbered 544, 460, 268, 88, 16, 280, 496, 568, 546, 462, 270, 90, 18, 282, 498, 570, 542, 458, 266, 86, 14, 278, 494, and 566, respectively;

(7) the 1st to 24th pixels composing the seventh row of the rectangular pattern are numbered 556, 484, 244, 4, 76, 256, 448, 532, 558, 486, 246, 6, 78, 258, 450, 534, 554, 482, 242, 2, 74, 254, 446, and 530, respectively;

(8) the 1st to 24th pixels composing the eighth row of the rectangular pattern are numbered 508, 412, 232, 52, 112, 196, 364, 436, 510, 414, 234, 54, 114, 198, 366, 438, 506, 410, 230, 50, 110, 194, 362, and 434, respectively;

(9) the 1st to 24th pixels composing the ninth row of the rectangular pattern are numbered 340, 388, 316, 190, 46, 100, 160, 220, 342, 390, 318, 192, 48, 102, 162, 222, 338, 386, 314, 188, 44, 98, 158, and 218, respectively;

(10) the 1st to 24th pixels composing the 10th row of the rectangular pattern are numbered 148, 334, 406, 358, 310, 178, 142, 28, 150, 336, 408, 360, 312, 180, 144, 30, 146, 332, 404, 356, 308, 176, 140, and 26, respectively;

(11) the 1st to 24th pixels composing the 11th row of the rectangular pattern are numbered 70, 298, 430, 526, 478, 382, 214, 130, 72, 300, 432, 528, 480, 384, 216, 132, 68, 296, 428, 524, 476, 380, 212, and 128, respectively;

(12) the 1st to 24th pixels composing the twelfth row of the rectangular pattern are numbered 22, 286, 502, 574, 550, 466, 274, 94, 24, 288, 504, 576, 552, 468, 276, 96, 20, 284, 500, 572, 548, 464, 272, and 92, respectively;

(13) the 1st to 24th pixels composing the 13th row of the rectangular pattern are numbered 79, 259, 451, 535, 559, 487, 247, 7, 83, 263, 455, 539, 563, 491, 251, 11, 81, 261, 453, 537, 561, 489, 249, and 9, respectively;

(14) the 1st to 24th pixels composing the 14th row of the rectangular pattern are numbered 115, 199, 367, 439, 511, 415, 235, 55, 119, 203, 371, 443, 515, 419, 239, 59, 117, 201, 369, 441, 513, 417, 237, and 57, respectively;

(15) the 1st to 24th pixels composing the 15th row of the rectangular pattern are numbered 37, 103, 163, 223, 343, 391, 319, 181, 41, 107, 167, 227, 347, 395, 323, 185, 39, 105, 165, 225, 345, 393, 321, and 183, respectively;

(16) the 1st to 24th pixels composing the 16th row of the rectangular pattern are numbered 301, 169, 133, 31, 151, 325, 397, 349, 305, 173, 137, 35, 155, 329, 401, 353, 303, 171, 135, 33, 153, 327, 399, and 351, respectively;

(17) the 1st to 24th pixels composing the 17th row of the rectangular pattern are numbered 469, 373, 205, 121, 61, 289, 421, 517, 473, 377, 209, 125, 65, 293, 425, 521, 471, 375, 207, 123, 63, 291, 423, and 519, respectively;

(18) the 1st to 24th pixels composing the 18th row of the rectangular pattern are numbered 541, 457, 265, 85, 13, 277, 493, 565, 545, 461, 269, 89, 17, 281, 497, 569, 543, 459, 267, 87, 15, 279, 495, and 567, respectively;

(19) the 1st to 24th pixels composing the 19th row of the rectangular pattern are numbered 553, 481, 241, 1, 73, 253, 445, 529, 557, 485, 245, 5, 77, 257, 449, 533, 555, 483, 243, 3, 75, 255, 447, and 531, respectively;

(20) the 1st to 24th pixels composing the 20th row of the rectangular pattern are numbered 505, 409, 229, 49, 109, 193, 361, 433, 509, 413, 233, 53, 113, 197, 365, 437, 507, 411, 231, 51, 111, 195, 363, and 435, respectively;

(21) the 1st to 24th pixels composing the 21st row of the rectangular pattern are numbered 337, 385, 313, 187, 43, 97, 157, 217, 341, 389, 317, 191, 47, 101, 161, 221, 339, 387, 315, 189, 45, 99, 159, and 219, respectively;

(22) the 1st to 24th pixels composing the 22nd row of the rectangular pattern are numbered 145, 331, 403, 355, 307, 175, 139, 25, 149, 335, 407, 359, 311, 179, 143, 29, 147, 333, 405, 357, 309, 177, 141, and 27, respectively;

(23) the 1st to 24th pixels composing the 23 row of the rectangular pattern are numbered 67, 295, 427, 523, 475, 379, 211, 127, 71, 299, 431, 527, 479, 383, 215, 131, 69, 297, 429, 525, 477, 381, 213, and 129, respectively; and

(24) the 1st to 24th pixels composing the 24th row of the rectangular pattern are numbered 19, 283, 499, 571, 547, 463, 271, 91, 23, 287, 503, 575, 551, 467, 275, 95, 21, 285, 501, 573, 549, 465, 273, and 93, respectively.

In other words, the sequence of turning on the 576 pixels is determined in such a way that the pixels are turned on in the following manner:

(1) the 1st to 24th pixels composing the first row of the rectangular pattern are turned on 495th, 315th, 123rd, 39th, 15th, 87th, 327th, 567th, 493rd, 313th, 121st, 37th, 13th, 85th, 325th, 565th, 497th, 317th, 125th, 41st, 17th, 89th, 329th, and 569th, respectively;

(2) the 1st to 24th pixels composing the second row of the rectangular pattern are turned on 459th, 375th, 207th, 135th, 63rd, 159th, 339th, 519th, 457th, 373rd, 205th, 133rd, 61st, 157th, 337th, 517th, 461st, 377th, 209th, 137th, 65th, 161st, 341st, and 521st, respectively;

(3) the 1st to 24th pixels composing the third row of the rectangular pattern are turned on 537th, 471st, 411th, 351st, 231st, 183rd, 255th, 393rd, 535th, 469th, 409th, 349th, 229th, 181st, 253rd, 391st, 539th, 473rd, 413th, 353rd, 233rd, 185th, 257th, and 395th, respectively;

(4) the 1st to 24th pixels composing the fourth row of the rectangular pattern are turned on 273rd, 405th, 441st, 543rd, 423rd, 249th, 177th, 225th, 271st, 403rd, 439th, 541st, 421st, 247th, 175th, 223th, 275th, 407th, 443rd, 545th, 425th, 251st, 179th, and 227th, respectively;

(5) the 1st to 24th pixels composing the fifth row of the rectangular pattern are turned on 105th, 201st, 369th, 453rd, 513th, 285th, 153rd, 57th, 103rd, 199th, 367th, 451st, 511th, 283rd, 151st, 55th, 107th, 203rd, 371st, 455th, 515th, 287th, 155th, and 59th, respectively;

(6) the 1st to 24th pixels composing the sixth row of the rectangular pattern are turned on 33rd, 117th, 309th, 489th, 561st, 297th, 81st, 9th, 31st, 115th, 307th, 487th, 559th, 295th, 79th, 7th, 35th, 119th, 311th, 491st, 563rd, 299th, 83rd, and 11th, respectively;

(7) the 1st to 24th pixels composing the seventh row of the rectangular pattern are turned on 21st, 93rd, 333rd, 573rd, 501st, 321st, 129th, 45th, 19th, 91st, 331st, 571st, 499th, 319th, 127th, 43rd, 23rd, 95th, 335th, 575th, 503rd, 323rd, 131st, and 47th, respectively;

(8) the 1st to 24th pixels composing the eighth row of the rectangular pattern are turned on 69th, 165th, 345th, 525th, 465th, 381st, 213th, 141st, 67th, 163rd, 343rd, 523rd, 463rd, 379th, 211th, 139th, 71st, 167th, 347th, 527th, 467th, 383rd, 215th, and 143rd, respectively;

(9) the 1st to 24th pixels composing the ninth row of the rectangular pattern are turned on 237th, 189th, 261st, 387th, 531st, 477th, 417th, 357th, 235th, 187th, 259th, 385th, 529th, 475th, 415th, 355th, 239th, 191st, 263rd, 389th, 533rd, 479th, 419th, and 359th, respectively;

(10) the 1st to 24th pixels composing the 10th row of the rectangular pattern are turned on 429th, 243rd, 171st, 219th, 267th, 399th, 435th, 549th, 427th, 241st, 169th, 217th, 265th, 397th, 433rd, 547th, 431st, 245th, 173rd, 221st, 269th, 401st, 437th, and 551st, respectively;

(11) the 1st to 24th pixels composing the 11th row of the rectangular pattern are turned on 507th, 279th, 147th, 51st, 99th, 195th, 363rd, 447th, 505th, 277th, 145th, 49th, 97th, 193rd, 361st, 445th, 509th, 281th, 149th, 53rd, 101st, 197th, 365th, and 449th, respectively;

(12) the 1st to 24th pixels composing the twelfth row of the rectangular pattern are turned on 555th, 291st, 75th, 3rd, 27th, 111th, 303rd, 483rd, 553rd, 289th, 73rd, 1st, 25th, 109th, 301st, 481st, 557th, 293rd, 77th, 5th, 29th, 113th, 305th, and 485th, respectively;

(13) the 1st to 24th pixels composing the 13th row of the rectangular pattern are turned on 498th, 318th, 126th, 42nd, 18th, 90th, 330th, 570th, 494th, 314th, 122nd, 38th, 14th, 86th, 326th, 566th, 496th, 316th, 124th, 40th, 16th, 88th, 328th, and 568th, respectively;

(14) the 1st to 24th pixels composing the 14th row of the rectangular pattern are turned on 462nd, 378th, 210th, 138th, 66th, 162nd, 342nd, 522nd, 458th, 374th, 206th, 134th, 62nd, 158th, 338th, 518th, 460th, 376th, 208th, 136th, 64th, 160th, 340th, and 520th, respectively;

(15) the 1st to 24th pixels composing the 15th row of the rectangular pattern are turned on 540th, 474th, 414th, 354th, 234th, 186th, 258th, 396th, 536th, 470th, 410th, 350th, 230th, 182nd, 254th, 392nd, 538th, 472nd, 412th, 352nd, 232nd, 184th, 256th, and 394th, respectively;

(16) the 1st to 24th pixels composing the 16th row of the rectangular pattern are turned on 276th, 408th, 444th, 546th, 426th, 252nd, 180th, 228th, 272nd, 404th, 440th, 542nd, 422nd, 248th, 176th, 224th, 274th, 406th, 442nd, 544th, 424th, 250th, 178th, and 226th, respectively;

(17) the 1st to 24th pixels composing the 17th row of the rectangular pattern are turned on 108th, 204th, 372nd, 456th, 516th, 288th, 156th, 60th, 104th, 200th, 368th, 452nd, 512th, 284th, 152nd, 56th, 106th, 202nd, 370th, 454th, 514th, 286th, 154th, and 58th, respectively;

(18) the 1st to 24th pixels composing the 18th row of the rectangular pattern are turned on 36th, 120th, 312th, 492nd, 564th, 300th, 84th, 12th, 32nd, 116th, 308th, 488th, 560th, 296th, 80th, 8th, 34th, 118th, 310th, 490th, 562nd, 298th, 82nd, and 10th, respectively;

(19) the 1st to 24th pixels composing the 19th row of the rectangular pattern are turned on 24th, 96th, 336th, 576th, 504th, 324th, 132nd, 48th, 20th, 92nd, 332nd, 572nd, 500th, 320th, 128th, 44th, 22nd, 94th, 334th, 574th, 502nd, 322nd, 130th, and 46th, respectively;

(20) the 1st to 24th pixels composing the 20th row of the rectangular pattern are turned on 72nd, 168th, 348th, 528th, 468th, 384th, 216th, 144th, 68th, 164th, 344th, 524th, 464th, 380th, 212th, 140th, 70th, 166th, 346th, 526th, 466th, 382nd, 214th, and 142nd, respectively;

(21) the 1st to 24th pixels composing the 21st row of the rectangular pattern are turned on 240th, 192nd, 264th, 390th, 534th, 480th, 420th, 360th, 236th, 188th, 260th, 386th, 530th, 476th, 416th, 356th, 238th, 190th, 262nd, 388th, 532nd, 478th, 418th, and 358th, respectively;

(22) the 1st to 24th pixels composing the 22nd row of the rectangular pattern are turned on 432nd, 246th, 174th, 222nd, 270th, 402nd, 438th, 552nd, 428th, 242nd, 170th, 218th, 266th, 398th, 434th, 548th, 430th, 244th, 172nd, 220th, 268th, 400th, 436th, and 550th, respectively;

(23) the 1st to 24th pixels composing the 23rd row of the rectangular pattern are turned on 510th, 282nd, 150th, 54th, 102nd, 198th, 366th, 450th, 506th, 278th, 146th, 50th, 98th, 194th, 362nd, 446th, 508th, 280th, 148th, 52nd, 100th, 196th, 364th, and 448th, respectively; and

(24) the 1st to 24th pixels composing the 24th row of the rectangular pattern are turned on 558th, 294th, 78th, 6th, 30th, 114th, 306th, 486th, 554th, 290th, 74th, 2nd, 26th, 110th, 302nd, 482nd, 556th, 292nd, 76th, 4th, 28th, 112th, 304th, and 484th, respectively.

Furthermore, in binary-form dither matrix patterns 12a through 12p used in a printer of the above-described embodiment, the pixels are turned on in descending numeric order. The present invention should by no means be limited to this. The turning-on sequence may be reversed, so that the pixels are turned on as numbered.

Figure 19:
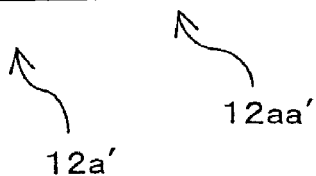
FIG. 19 is another modified example of a binary-coding dither matrix pattern used in a printing apparatus of the embodiment.
Figure 20:
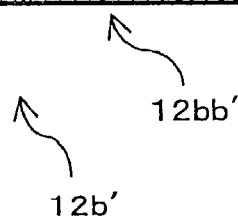
FIG. 20 is another modified example of a binary-coding dither matrix pattern used in a printing apparatus of the embodiment.
Figure 21:
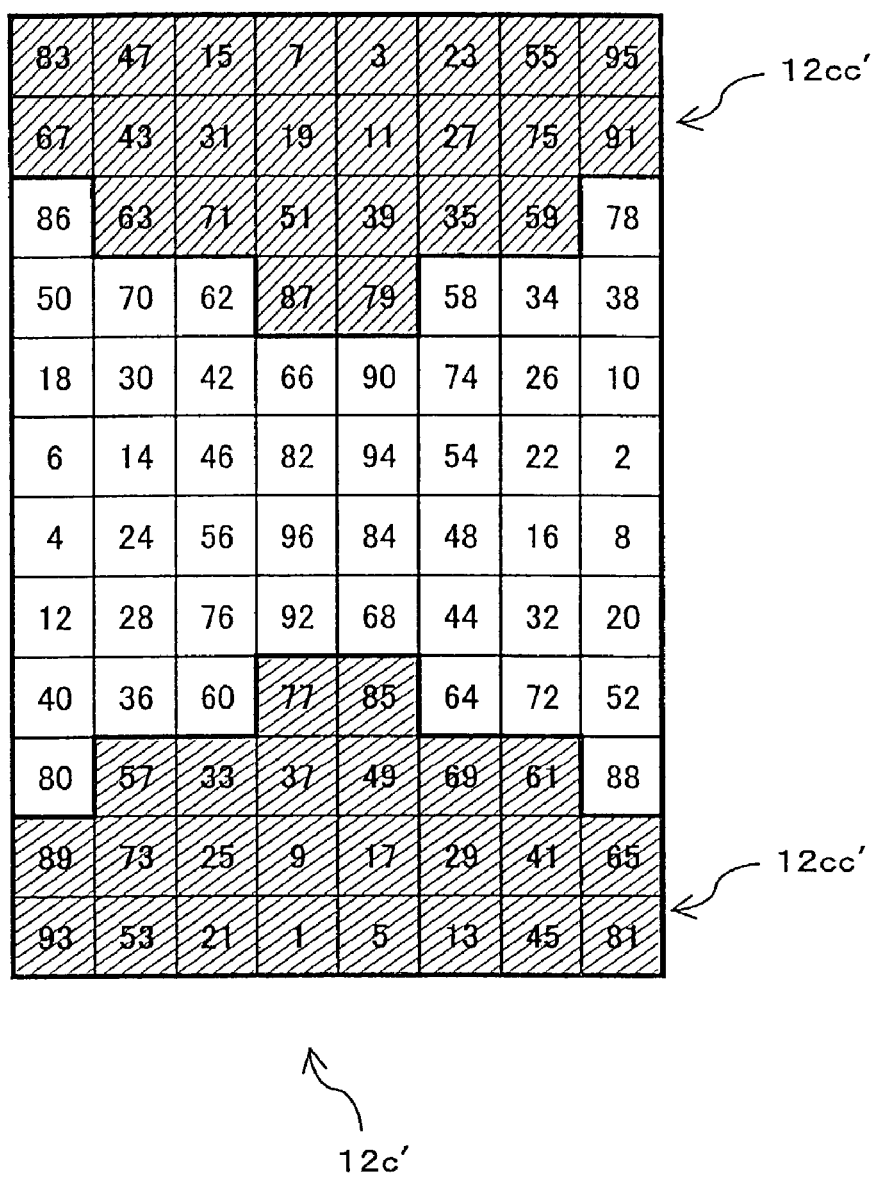
FIG. 21 is another modified example of a binary-coding dither matrix pattern used in a printing apparatus of the embodiment.
Figure 23:
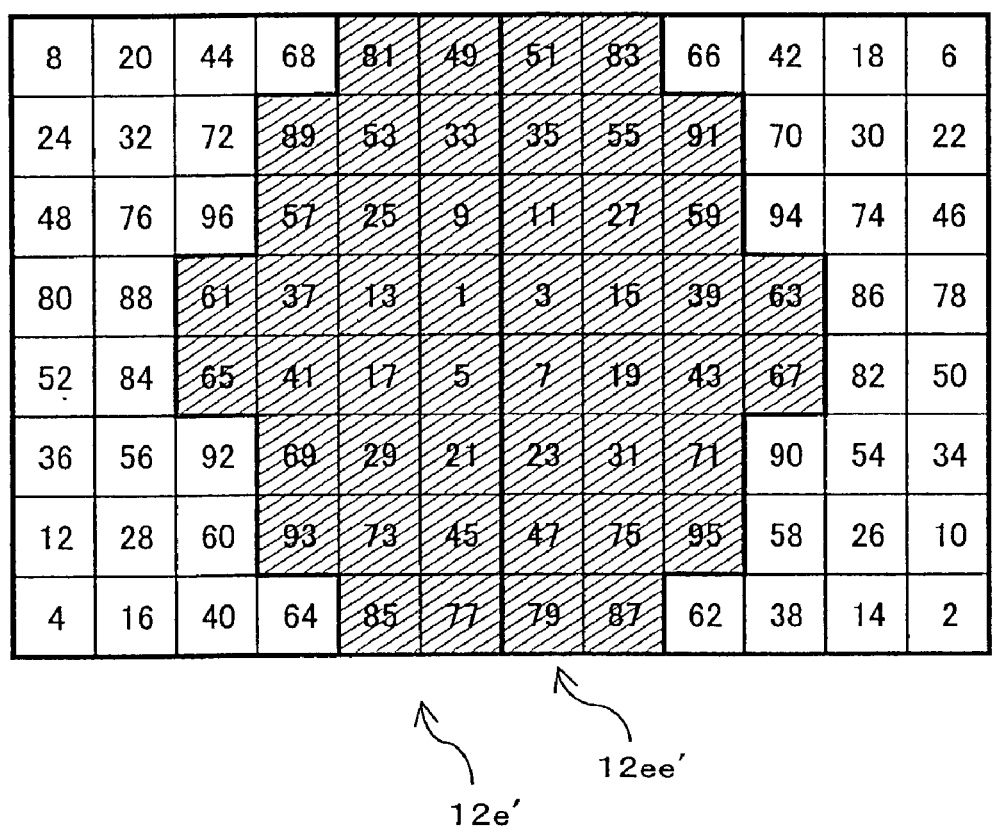
FIG. 23 is another modified example of a binary-coding dither matrix pattern used in a printing apparatus of the embodiment.
Figure 24:
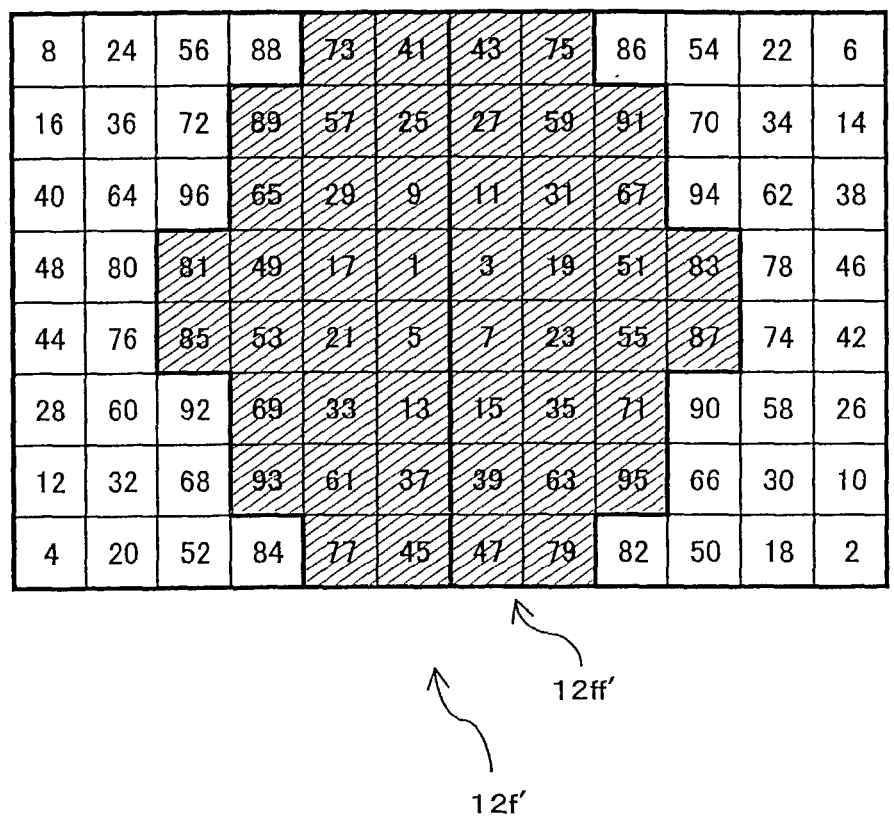
FIG. 24 is another modified example of a binary-coding dither matrix pattern used in a printing apparatus of the embodiment.
Figure 25:
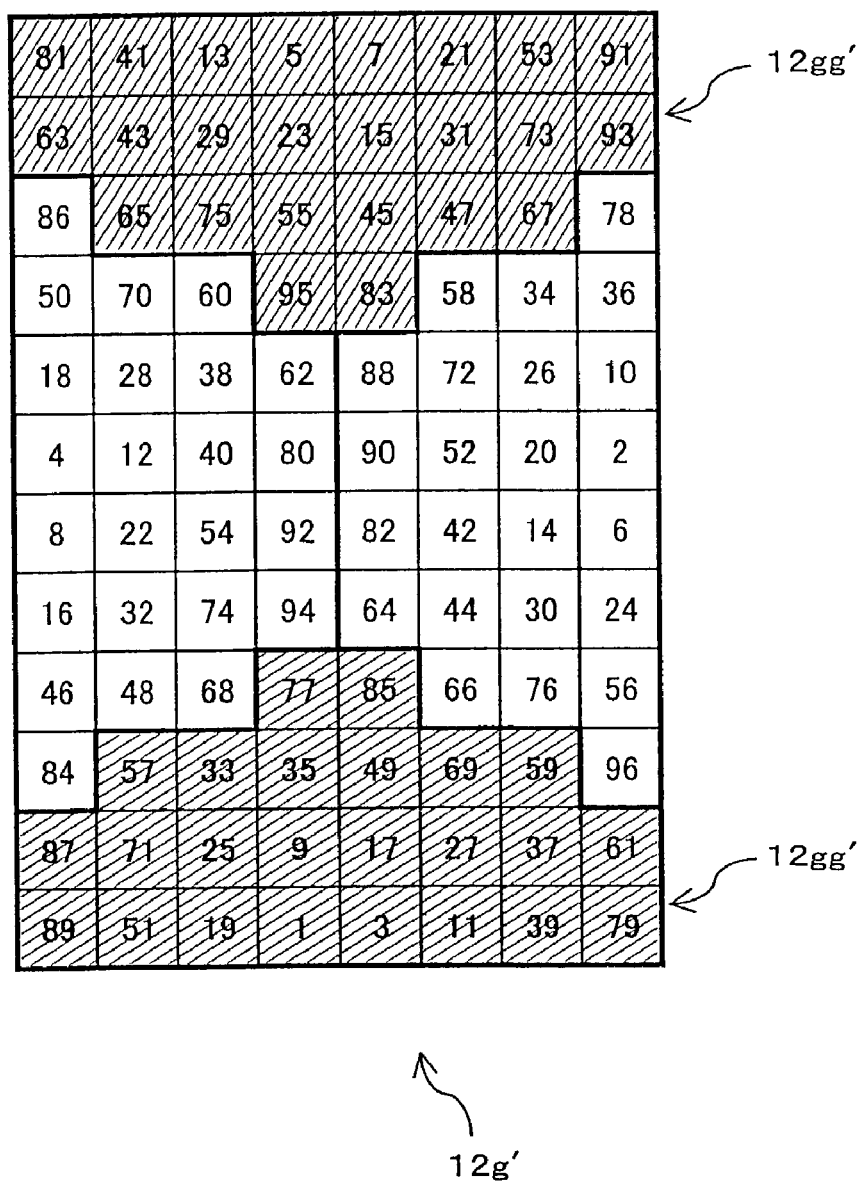
FIG. 25 is another modified example of a binary-coding dither matrix pattern used in a printing apparatus of the embodiment.

FIG. 19 through FIG. 34 show other modified examples of binary-coding patterns for use in printers of one embodiment of the present invention. The turning-on sequence shown in binary-coding pattern 12a' of FIG. 19 is the reverse of the turning-on sequence shown in binary-coding pattern 12a of FIG. 4. Likewise, the turning-on sequence shown in binary-coding patterns, 12b', 12c', 12d', 12e', 12f', 12g', 12h', 12i', 12j', 12k', 12l', 12m', 12n', 12o', and 12p', of FIG. 20 through FIG. 34, respectively, is the reverse of the turning-on sequence shown in binary-coding patterns, 12b, 12c, 12d, 12e, 12f, 12g, 12h, 12i, 12j, 12k, 12l, 12m, 12n, 12o, and 12p, of FIG. 5 through FIG. 18, respectively. In other words, in binary coding patterns, 12a', 12b', 12c', 12d', 12e', 12f', 12g', 12h', 12i', 12j', 12k', 12l', 12m', 12n', 12o', and 12p', of FIG. 19 through FIG. 34, the turning on of the pixels is carried out in ascending numeric order, and thereby these binary-coding patterns function as dot clustered binary-coding patterns (dither patterns, binary-form dither matrix patterns).

With use of a binary-coding pattern, 12a' through 12'h, it is possible to represent the pixel values (e.g., 0 to 255) of the individual pixels of an object multilevel image (original image) in 96 levels of gray. Using binary-coding pattern, 12i' through 12p', it is possible to represent the pixel values of the pixels of an object multilevel image (original image) in 576 levels of gray. For the sake of convenience, some of the unit patterns are diagonally shaded in FIG. 19 through FIG. 34.

As illustrated in binary-coding patterns, 12*b*, 12*d*, 12*f*, 12*h*, 12*j*, 12*l*, 12*n*, 12*p*, 12*b'*, 12*d'*, 12*f'*, 12*h'*, 12*j'*, 12*l'*, 12*n'*, 12*p'* of FIG. 4, FIG. 6, FIG. 8, FIG. 10, FIG. 12, FIG. 14, FIG. 16, FIG. 18, FIG. 20, FIG. 22, FIG. 24, FIG. 26, FIG. 28, FIG. 30, FIG. 32, and FIG. 34, respectively, the sequence of turning on the pixels is set in such a way that a dot having a roughly oval shape grows in each unit pattern, 12*bb*, 12*dd*, 12*ff*, 12*hh*, 12*jj*, 12*ll*, 12*nn*, 12*pp*, 12*bb'*, 12*dd'*, 12*ff'*, 12*hh'*, 12*jj'*, 12*ll'*, 12*nn'*, and 12*pp'*. Hence it is possible to absorb displacement, if any, caused for any reason in image forming unit 15 of a printer, thereby ensuring high-quality printouts.

Further, as illustrated in binary-coding patterns, 12*a*, 12*b*, 12*c*, 12*d*, 12*i*, 12*j*, 12*k*, 12*l*, 12*a'*, 12*b'*, 12*c'*, 12*d'*, 12*i'*, 12*j'*, 12*k'*, and 12*l'*, of FIG. 2, FIG. 4 through FIG. 6, FIG. 11 through FIG. 14, FIG. 19 through FIG. 22, and FIG. 27 through FIG. 30, respectively, the sequence of turning on the pixels is set in such a way that, in each unit pattern, 12*aa*, 12*bb*, 12*cc*, 12*dd*, 12*ii*, 12*jj*, 12*kk*, 12*ll*, 12*aa'*, 12*bb'*, 12*cc'*, 12*dd'*, 12*ii'*, 12*jj'*, 12*kk'*, and 12*ll'*, two pixels disposed diametrically symmetrically to one another with respect to the center of the unit pattern are first turned on successively. It is thus possible to minimize moiré and other artifacts, thereby ensuring high-quality printouts.

Still further, as illustrated in binary-coding pattern 12*e*, 12*f*, 12*g*, 12*h*, 12*m*, 12*n*, 12*o*, 12*p*, 12*e'*, 12*f'*, 12*g'*, 12*h'*, 12*m'*, 12*n'*, 12*o'*, and 12*p'*, of FIG. 7 through FIG. 10, FIG. 15 through FIG. 18, FIG. 23 through FIG. 26, and FIG. 31 through FIG. 34, respectively, the sequence of turning on the pixels is set in such a way that, in each unit pattern, 12*ee*, 12*ff*, 12*gg*, 12*hh*, 12*mm*, 12*nn*, 12*oo*, 12*pp*, 12*ee'*, 12*ff'*, 12*gg'*, 12*hh'*, 12*mm'*, 12*nn'*, 12*oo'*, and 12*pp'*, two pixels adjoining one another and being disposed adjacently to the center of the unit pattern are first turned on successively. As a result, such neighboring spots of color material fix with one another, so that the fixing of color material to a printing medium would be facilitated, thereby ensuring high-quality printouts.

Moreover, the order of turning-on that is set for an arbitrary pixel in binary-coding pattern, 12*a* through 12*p* and 12*a'* through 12*p'*, and the order of turning-on that is set for the pixel disposed in a position diametrically symmetrical to the arbitrary pixel with respect to the center of binary-coding pattern, 12*a* through 12*p* and 12*a'* through 12*p'*, or to the center of each unit pattern, 12*aa* through 12*pp* and 12*aa'* through 12*pp'*, can be substituted for each other.

Using the forgoing binary-coding pattern, 12*b* through 12*p* and 12*a'* through 12*p'*, dot data generating unit 14 selects the pixels of binary-coding pattern, 12*b* through 12*p* and 12*a'* through 12*p'*, in accordance with the given turning-on sequence, from the start pixel to the pixel which is numbered a predetermined sequence number, so that the pixels on which color material is to be formed are determined, thereby generating dot data. In accordance with the thus generated dot data, image forming unit 15 forms (prints) the image (image forming step).

Further, the foregoing color operation unit 10, image signal memory 11, gradation characteristics changing unit 13, pattern memory 12, and dot data generating unit 14 may be provided outside the present printer (for example, a computer (not shown) coupled with the present printer). The computer executes programs (including the one for creating the aforementioned binary-coding pattern, 12*a* through 12 and 12*a'* through 12P'), thereby serving as at least some of the above-mentioned color operation unit 10, image signal memory 11, gradation characteristics changing unit 13, pattern memory 12, and dot data generating unit 14.

What is claimed is:

1. A method of printing a given multivalue image in a binary-form out put pattern, said method comprising the steps of: (a) providing a binary-form dither matrix pattern which is used to obtain the binary-form output pattern, said binary-form dither matrix pattern having a rectangular pattern in which a plurality of pattern elements that are numbered to be successively turned on are arranged in matrix, the sequence of turning on of said plural pattern which groups are substantially identical in shape, grow successively from a plurality of local points associated with the respective groups and successively from a center dot element in each group; (b) expanding the given multivalue image in a memory area of a storage device; and (c) forming a binary image of said output dot elements in accordance with said binary-form output pattern obtained by turning on the individual pattern elements of said binary-form dither matrix pattern, based on the given multivalue image which has been expanded in the memory area, in such a manner that said output dot elements of an individual print dot of the binary image which correspond to said pattern elements of said binary-form dither matrix pattern grow successively from said center dot element at the associated local point in each group in the sequence the corresponding pattern elements of said binary-form dither matrix pattern are numbered.

2. A printing method according to claim 1, further comprising the step of changing said sequence of turning on said plural pattern elements using a look-up table.

3. A method of printing a given multivalue image in a binary-form output pattern, said method comprising the steps of: (a) providing a binary-form dither matrix pattern which is used to obtain the binary-form output pattern, said binary-form dither matrix pattern having a rectangular pattern in which a plurality of pattern elements that are numbered to be successively turned on are arranged in matrix, the sequence of turning on of said plural pattern elements being set in such a way that a plurality of groups of prospective output dot elements, which groups are substantially identical in shape, grow successively from a plurality of local points associated with the respective groups and successively from a center dot element in each group; and (b) forming a binary image of said output dot elements in accordance with said binary-form output pattern obtained by turning on the individual pattern elements of said binary-form dither matrix pattern, based on the given multivalue image, in such a manner that said output dot elements of an individual print dot of the binary image which correspond to said pattern elements of said binary-form dither matrix pattern grow successively from said center dot element at the associated local point in each group in the sequence the corresponding pattern elements of said binary-form dither matrix pattern are numbered.

4. A printing method according to claim 3, further comprising the step of changing said sequence of turning on said plural pattern elements using a look-up table.

5. An apparatus for printing a given multivalue image in a binary-form output pattern, said apparatus comprising: (a) means for providing a binary-form dither matrix pattern which is used to obtain the binary-form output pattern, said binary-form dither matrix pattern having a rectangular pattern in which a plurality of pattern elements that are numbered to be successively turned on are arranged in matrix, the sequence of turning on of said plural pattern elements being set in such a way that a plurality of groups of prospective output dot elements, which dot elements are substantially identical in shape, grow successively from a plurality of local points associated with the respective groups and successively from a center dot element in each group; (b) a storage device having a memory area in which the given multivalue image is to be expanded; and (c) means for forming a binary image of said output dot elements in accordance with said binary-form output pattern obtained by turning on the individual pattern elements of said binary-form dither matrix pattern, based on the given multivalue image which has been expanded in the memory area, in such a manner that said output dot elements of an individual print dot of the binary image which correspond to said pattern elements of said binary-form dither matrix pattern grow successively from said center dot element at the associated local point in each group in the sequence the corresponding pattern elements of said binary-form dither matrix pattern are numbered.

6. A printing apparatus according to claim 5, further comprising a turning-on sequence changing section for changing said sequence of turning on said plural pattern elements using a look-up table.

7. An apparatus for printing a given multivalue image in a binary-form output pattern, said apparatus comprising: (a) means for providing a binary-form dither matrix pattern which is used to obtain the binary-form output pattern, said binary-form dither matrix pattern having a rectangular pattern in which a plurality of pattern elements that are numbered to be successively turned on are arranged in matrix, the sequence of turning on of said plural pattern elements being set in such a way that a plurality of groups of prospective output dot elements, which dot elements are substantially identical in shape, grow successively from a plurality of local points associated with the respective groups and successively from a center dot element in each group; and (b) means for forming a binary image of said output dot elements in accordance with said binary-form output pattern obtained by turning on the individual pattern elements of said binary-form dither matrix pattern, based on the given multivalue image, in such a manner that said output dot elements of an individual print dot of the binary image which correspond to said pattern elements of said binary-form dither matrix pattern grow successively from said center dot element at the associated local point in each group in the sequence the corresponding pattern elements of said binary-form dither matrix pattern are numbered.

8. A printing apparatus according to claim 7, further comprising a turning-on sequence changing section for changing said sequence of turning on said plural pattern elements using a look-up table.

9. A computer-readable recording medium in which a program for controlling the printing of a given multivalue image in a binary-fonn output pattern is recorded, wherein said printing program instructs a computer to execute the following steps of: (a) providing a binary-form dither matrix pattern which is used to obtain the binary-form output pattern, said binary-form dither matrix pattern having a rectangular pattern in which a plurality of pattern elements that are numbered to be successively turned on are arranged in matrix, the sequence of turning on of said plural pattern elements being set in such a way that a plurality of groups of prospective output dot elements, which groups are substantially identical in shape, grow successively from a plurality of local points associated with the respective groups and successively from a center dot element in each group; (b) expanding the given multivalue image in a memory area of a storage device; and (c) forming a binary image of said output dot elements in accordance with said binary-form output pattern obtained by turning on the individual pattern elements of said binary-form dither matrix pattern, based on the given multivalue image which has been expended in the memory area, in such a manner that said output dot elements of an individual print dot of the binary image which correspond to said pattern elements of said binary-form dither matrix pattern grow successively from said center dot element at the associated local point in each group in the sequence the corresponding pattern elements of said binary-form dither matrix pattern are numbered.

10. A computer-readable recording medium according to claim 9, wherein said printing program further instructs the computer to execute the step of changing said sequence of turning on said plural pattern elements using a look-up table.

11. A computer-readable recording medium in which a program for controlling the printing of a given multivalue image in a binary-form output pattern is recorded, wherein said printing program instructs a computer to execute the following steps of: (a) providing a binary-form dither matrix pattern which is used to obtain the binary-form output pattern, said binary-form dither matrix pattern having a rectangular pattern in which a plurality of pattern elements that are numbered to be successively turned on are arranged in matrix, the sequence of turning on of said plural pattern elements being set in such a way that a plurality of groups of prospective output dot elements, which groups are substantially identical in shape, grow successively from a plurality of local points associated with the respective groups and successively from a center dot element in each group; and (b) forming a binary image of said output dot elements in accordance with said binary-form output pattern obtained by turning on the individual pattern elements of said binary-form dither matrix pattern, based on the given multivalue image, in such a manner that said output dot elements of an individual print dot of the binary image which correspond to said pattern elements of said binary-form dither matrix pattern grow successively from said center dot element at the associated local point in each group in the sequence the corresponding pattern elements of said binary-form dither matrix pattern are numbered.

12. A computer-readable recording medium according to claim 11, wherein said printing program further instructs the computer to execute the step of changing said sequence of turning on said plural pattern elements using a look-up table.

13. A computer-readable recording medium in which a program for converting a given multivalue image into a binary image is recorded, wherein said binarizing program instructs a computer to execute the following steps of: (a) providing a binary-form dither matrix pattern which is used to obtain the binary-form output pattern, said binary-form dither matrix pattern having a rectangular pattern in which a plurality of pattern elements that are numbered to be successively turned on are arranged in matrix, the sequence of turning on of said plural pattern elements being set in such a way that a plurality of groups of prospective output dot elements, which groups are substantially identical in shape, grow successively from a plurality of local points associated with the respective groups and successively from a center dot element in each group; (b) expanding the given multivalue image in a memory area of a storage device; and (c) forming a binary image of said output dot elements in accordance with said binary-form output pattern obtained by turning on the individual pattern elements of said binary-form dither matrix pattern, based on the given multivalue image which has been expended in the memory area, in such a manner that said output dot elements of an individual print dot of the binary image which correspond to said pattern elements of said binary-form dither matrix pattern grow successively from said center dot element at the associated local point in each group in the sequence the corresponding pattern elements of said binary-form dither matrix pattern are numbered.

14. A computer-readable recording medium according to claim 13, wherein said binarizing program further instructs the computer to execute the step of changing said sequence of turning on said plural pattern elements using a look-up table.

15. A computer-readable recording medium in which a program for converting a given multivalue image into a binary image is recorded, wherein said binarizing program instructs a computer to execute the following steps of: (a) providing a binary-form dither matrix pattern which is used to obtain the binary-form output pattern, said binary-form dither matrix pattern having a rectangular pattern in which a plurality of pattern elements that are numbered to be successively turned on are arranged in matrix, the sequence of turning on of said plural pattern elements being set in such a way that a plurality of groups of prospective output dot elements, which groups are substantially identical in shape, grow successively from a plurality of local points associated with the respective groups and successively from a center dot element in each group; and (b) forming a binary image of said output dot elements in accordance with said binary-form output pattern obtained by turning on the individual pattern elements of said binary-form dither matrix pattern, based on the given multivalue image, in such a manner that said output dot elements of an individual print dot of the binary image which correspond to said pattern elements of said binary-form dither matrix pattern grow successively from said center dot element at the associated local point in each group in the sequence the corresponding pattern elements of said binary-form dither matrix pattern are numbered.

16. A computer-readable recording medium according to claim 15, wherein said binarizing program further instructs the computer to execute the step of changing said sequence of turning on said plural pattern elements using a look-up table.

17. A computer-readable medium encoded with a data structure used for printing a given multivalue image in a binary-form output pattern, comprising:

a binary-form dither matrix pattern having a rectangular pattern in which a plurality of pattern elements that are numbered to be successively turned on are arranged in matrix, the sequence of turning on of said plural pattern elements being set in such a way that a plurality of groups of prospective output dot elements, which groups are substantially identical in shape, grow successively from a plurality of local points associated with the respective groups and successively from a center dot element in each group, wherein said rectangular pattern is composed of 96 pattern elements arranged in a matrix of 8 rows×12 columns that are turned on in the following manner: the 1st to 12th pattern elements composing the first row of the rectangular pattern are turned on 4th, 20th, 44th, 76th, 81st, 49th, 53rd, 85th, 80th, 48th, 24th, and 8th, respectively; the 1st to 12th pattern elements composing the second row of the rectangular pattern are turned on 12th, 28th, 68th, 89th, 57th, 33rd, 37th, 61st, 93rd, 72nd, 32nd, and 16th, respectively; the 1st to 12th pattern elements composing the third row of the rectangular pattern are turned on 36th, 60th, 92nd, 65th, 25th, 9th, 13th, 29th, 69th, 96th, 64th, and 40th, respectively; the 1st to 12th pattern elements composing the fourth row of the rectangular pattern are turned on 52nd, 84th, 73rd, 41st, 17th, 1st, 5th, 21st, 45th, 77th, 88th, and 56th, respectively; the 1st to 12th pattern elements composing the fifth row of the rectangular pattern are turned on 54th, 86th, 79th, 47th, 23rd, 7th, 3rd, 19th, 43rd, 75th, 82nd, and 50th, respectively; the 1st to 12th pattern elements composing the sixth row of the rectangular pattern are turned on 38th, 62nd, 94th, 71st, 31st, 15th, 11th, 27th, 67th, 90th, 58th, and 34th, respectively; the 1st to 12th pattern elements composing the seventh row of the rectangular pattern are turned on 14th, 30th, 70th, 95th, 63rd, 39th, 35th, 59th, 91st, 66th, 26th, and 10th, respectively; and the 1st to 12th pattern elements composing the eighth row of the rectangular pattern are turned on 6th, 22nd, 46th, 78th, 87th, 55th, 51st, 83rd, 74th, 42nd, 18th, and 2nd, respectively.

18. The computer-readable medium according to claim 17, wherein said rectangular pattern is composed of 96 pattern elements arranged in a matrix of 8 rows×12 columns that are turned on in the following manner: the 1st to 12th pattern elements composing the first row of the rectangular pattern are turned on 4th, 20th, 52nd, 84th, 73rd, 41st, 45th, 77th, 88th, 56th, 24th, and 8th, respectively; the 1st to 12th pattern elements composing the second row of the rectangular pattern are turned on 12th, 36th, 68th, 89th, 57th, 25th, 29th, 61st, 93rd, 72nd, 40th, and 16th, respectively the 1st to 12th pattern elements composing the third row of the rectangular pattern are turned on 28th, 60th, 92nd, 65th, 33rd, 9th, 13th, 37th, 69th, 96th, 64th, and 32nd, respectively; the 1st to 12th pattern elements composing the fourth row of the rectangular pattern are turned on 44th, 76th, 81st, 49th, 17th, 1st, 5th, 21st, 53rd, 85th, 80th, and 48th, respectively; the 1st to 12th pattern elements composing the fifth row of the rectangular pattern are turned on 46th, 78th, 87th, 55th, 23rd, 7th, 3rd, 19th, 51st, 83rd, 74th, and 42nd, respectively; the 1st to 12th pattern elements composing the sixth row of the rectangular pattern are turned on 30th, 62nd, 94th, 71st, 39th, 15th, 11th, 35th, 67th, 90th, 58th, and 26th, respectively; the 1st to 12th pattern elements composing the seventh row of the rectangular pattern are turned on 14th, 38th, 70th, 95th, 63rd, 31st, 27th, 59th, 91st, 66th, 34th, and 10th, respectively; and the 1st to 12th pattern elements composing the eighth row of the rectangular pattern are turned on 6th, 22nd, 54th, 86th, 79th, 47th, 43rd, 75th, 82nd, 50th, 18th, and 2nd, respectively.

19. The computer-readable medium according to claim 17, wherein said rectangular pattern is composed of 96 pattern elements arranged in a matrix of 12 rows×8 columns that are turned on in the following manner: the 1st to 8th pattern elements composing the first row of the rectangular pattern are turned on 83rd, 47th, 15th, 7th, 3rd, 23rd, 55th, and 95th, respectively; the 1st to 8th pattern elements composing the second row of the rectangular pattern are turned on 67th, 43rd, 31st, 19th, 11th, 27th, 75th, and 91st, respectively; the 1st to 8th pattern elements composing the third row of the rectangular pattern are turned on 86th, 63rd, 71st, 51st, 39th, 35th, 59th, and 78th, respectively; the 1st to 8th pattern elements composing the fourth row of the rectangular pattern are turned on 50th, 70th, 62nd, 87th, 79th, 58th, 34th, and 38th, respectively; the 1st to 8th pattern elements composing the fifth row of the rectangular pattern are turned on 18th, 30th, 42nd, 66th, 90th, 74th, 26th, and 10th, respectively; the 1st to 8th pattern elements composing the sixth row of the rectangular pattern are turned on 6th, 14th, 46th, 82nd, 94th, 54th, 22nd, and 2nd, respectively; the 1st to 8th pattern elements composing the seventh row of the rectangular pattern are turned on 4th, 24th, 56th, 96th, 84th, 48th, 16th, and 8th, respectively; the 1st to 8th pattern elements composing the eighth row of the rectangular pattern are turned on 12th, 28th, 76th, 92nd, 68th, 44th, 32nd, and 20th, respectively; the 1st to 8th pattern elements composing the ninth row of the rectangular pattern are turned on 40th, 36th, 60th, 77th, 85th, 64th, 72nd, and 52nd, respectively; the 1st to 8th pattern elements composing the 10th row of the rectangular pattern are turned on 80th, 57th, 33rd, 37th, 49th, 69th, 61st, and 88th, respectively; the 1st to 8th pattern elements composing the 11th row of the rectangular pattern are turned on 89th, 73rd, 25th, 9th, 17th, 29th, 41st, and 65th, respectively; and the 1st to 8th pattern elements composing the twelfth row of the rectangular pattern are turned on 93rd, 53rd, 21st,1st, 5th, 13th, 45th, and 81st, respectively.

20. The computer-readable medium according to claim 17, wherein said rectangular pattern is composed of 96 pattern elements arranged in a matrix of 12 rows×8 columns that are turned on in the following manner: the 1st to 8th pattern elements composing the first row of the rectangular pattern are turned on 83rd, 59th, 23rd, 7th, 3rd, 15th, 55th, and 95th, respectively; the 1st to 8th pattern elements composing the second row of the rectangular pattern are turned on 79th, 63rd, 35th, 19th, 11th, 27th, 51st, and 87th, respectively; the 1st to 8th pattern elements composing the third row of the rectangular pattern are turned on 90th, 75th, 71st, 47th, 39th, 31st, 43rd, and 66th, respectively; the 1st to 8th pattern elements composing the fourth row of the rectangular pattern are turned on 46th, 70th, 74th, 91st, 67th, 42nd, 30th, and 38th, respectively; the 1st to 8th pattern element composing the fifth row of the rectangular pattern are turned on 18th, 34th, 62nd, 78th, 86th, 50th, 26th, and 10th, respectively; the 1st to 8th pattern elements composing the sixth row of the rectangular pattern are turned on 6th, 22nd, 58th, 82nd, 94th, 54th, 14th, and 2nd, respectively; the 1st to 8th pattern elements composing the seventh row of the rectangular pattern are turned on 4th, 16th, 56th, 96th, 84th, 60th, 24th, and 8th, respectively; the 1st to 8th pattern elements composing the eighth row of the rectangular pattern are turned on 12th, 28th, 52nd, 88th, 80th, 64th, 36th, and 20th, respectively; the 1st to 8th pattern elements composing the ninth row of the rectangular pattern are turned on 40th, 32nd, 44th, 65th, 89th, 76th, 72nd, and 48th, respectively; the 1st to 8th pattern elements composing the 10th row of the rectangular pattern are turned on 68th, 41st, 29th, 37th, 45th, 69th, 73rd, and 92nd, respectively; the 1st to 8th pattern elements composing the 11th row of the rectangular pattern are turned on 85th, 49th, 25th, 9th, 17th, 33rd, 61st, and 77th, respectively; and the 1st to 8th pattern elements composing the twelfth row of the rectangular pattern are turned on 93rd, 53rd, 13th,1st, 5th, 21st, 57th, and 81st, respectively.

21. The computer-readable medium according to claim 17, wherein said rectangular pattern is composed of 96 pattern elements arranged in a matrix of 8 rows×12 columns that are turned on in the following manner: the 1st to 12th pattern elements composing the first row of the rectangular pattern are turned on 8th, 20th, 44th, 68th, 81st, 49th, 51st, 83rd, 66th, 42nd, 18th, and 6th, respectively; the 1st to 12th pattern elements composing the second row of the rectangular pattern are turned on 24th, 32nd, 72nd, 89th, 53rd, 33rd, 35th, 55th, 91st, 70th, 30th, and 22nd, respectively; the 1st to 12th pattern elements composing the third row of the rectangular pattern are turned on 48th, 76th, 96th, 57th, 25th, 9th, 11th, 27th, 59th, 94th, 74th, and 46th, respectively; the 1st to 12th pattern elements composing the fourth row of the rectangular pattern are turned on 80th, 88th, 61st, 37th, 13th, 1st, 3rd, 15th, 39th, 63rd, 86th, and 78th, respectively; the 1st to 12th pattern elements composing the fifth row of the rectangular pattern are turned on 52nd, 84th, 65th, 41st, 17th, 5th, 7th, 19th, 43rd, 67th, 82nd, and 50th, respectively; the 1st to 12th pattern elements composing the sixth row of the rectangular pattern are turned on 36th, 56th, 92nd, 69th, 29th, 21st, 23rd, 31st, 71st, 90th, 54th, and 34th, respectively; the 1st to 12th pattern elements composing the seventh row of the rectangular pattern are turned on 12th, 28th, 60th, 93rd, 73rd, 45th, 47th, 75th, 95th, 58th, 26th, and 10th, respectively; and the 1st to 12th pattern elements composing the eighth row of the rectangular pattern are turned on 4th, 16th, 40th, 64th, 85th, 77th, 79th, 87th, 62nd, 38th, 14th, and 2nd, respectively.

22. The computer-readable medium according to claim 17, wherein said rectangular pattern is composed of 96 pattern elements arranged in a matrix of 8 rows×12 columns that are turned on in the following manner: the 1st to 12th pattern elements composing the first row of the rectangular pattern are turned on 8th, 24th, 56th, 88th, 73rd, 41st, 43rd, 75th, 86th, 54th, 22nd, and 6th, respectively; the 1st to 12th pattern elements composing the second row of the rectangular pattern are turned on 16th, 36th, 72nd, 89th, 57th, 25th, 27th, 59th, 91st, 70th, 34th, and 14th, respectively; the 1st to 12th pattern elements composing the third row of the rectangular pattern are turned on 40th, 64th, 96th, 65th, 29th, 9th, 11th, 31st, 67th, 94th, 62nd, and 38th, respectively; the 1st to 12th pattern elements composing the fourth row of the rectangular pattern are turned on 48th, 80th, 81st, 49th, 17th, 1st, 3rd, 19th, 51st, 83rd, 78th, and 46th, respectively; the 1st to 12th pattern elements composing the fifth row of the rectangular pattern are turned on 44th, 76th, 85th, 53rd, 21st, 5th, 7th, 23rd, 55th, 87th, 74th, and 42nd, respectively; the 1st to 12th pattern elements composing the sixth row of the rectangular pattern are turned on 28th, 60th, 92nd, 69th, 33rd, 13th, 15th, 35th, 71st, 90th, 58th, and 26th, respectively; the 1st to 12th pattern elements composing the seventh row of the rectangular pattern are turned on 12th, 32nd, 68th, 93rd, 61st, 37th, 39th, 63rd, 95th, 66th, 30th, and 10th, respectively; and the 1st to 12th pattern elements composing the eighth row of the rectangular pattern are turned on 4th, 20th, 52nd, 84th, 77th, 45th, 47th, 79th, 82nd, 50th, 18th, and 2nd, respectively.

23. The computer-readable medium according to claim 17, wherein said rectangular pattern is composed of 96 pattern elements arranged in a matrix of 12 rows×8 columns that are turned on in the following manner: the 1st to 8th pattern elements composing the first row of the rectangular pattern are turned on 81st, 41st, 13th, 5th, 7th, 21st, 53rd, and 91st, respectively; the 1st to 8th pattern elements composing the second row of the rectangular pattern are turned on 63rd, 43rd, 29th, 23rd, 15th, 31st, 73rd, and 93rd, respectively; the 1st to 8th pattern elements composing the third row of the rectangular pattern are turned on 86th, 65th, 75th, 55th, 45th, 47th, 67th, and 78th, respectively; the 1st to 8th pattern elements composing the fourth row of the rectangular pattern are turned on 50th, 70th, 60th, 95th, 83rd, 58th, 34th, and 36th, respectively; the 1st to 8th pattern elements composing the fifth row of the rectangular pattern are turned on 18th, 28th, 38th, 62nd, 88th, 72nd, 26th, and 10th, respectively; the 1st to 8th pattern elements composing the sixth row of the rectangular pattern are turned on 4th, 12th, 40th, 80th, 90th, 52nd, 20th, and 2nd, respectively; the 1st to 8th pattern elements composing the seventh row of the rectangular pattern are turned on 8th, 22nd, 54th, 92nd, 82nd, 42nd, 14th, 6th, respectively; the 1st to 8th pattern elements composing the eighth row of the rectangular pattern are turned on 16th, 32nd, 74th, 94th, 64th, 44th, 30th, and 24th, respectively; the 1st to 8th pattern elements composing the ninth row of the rectangular pattern are turned on 46th, 48th, 68th, 77th, 85th, 66th, 76th, and 56th, respectively; the 1st to 8th pattern elements composing the 10th row of the rectangular pattern are turned on 84th, 57th, 33rd, 35th, 49th, 69th, 59th, and 96th, respectively; the 1st to 8th pattern elements composing the 11th row of the rectangular pattern are turned on 87th, 71st, 25th, 9th, 17th, 27th, 37th, and 61st, respectively; and the 1st to 8th pattern elements composing the twelfth row of the rectangular pattern are turned on 89th, 51st, 19th, 1st, 3rd, 11th, 39th, and 79th, respectively.

24. The computer-readable medium according to claim 17, wherein said rectangular pattern is composed of 96 pattern elements arranged in a matrix of 12 rows×8 columns that are turned on in the following manner: the 1st to 8th pattern elements composing the first row of the rectangular pattern are turned on 83rd, 53rd, 21st, 7th, 3rd, 15th, 55th, and 95th, respectively; the 1st to 8th pattern elements composing the second row of the rectangular pattern are turned on 77th, 63rd, 35th, 23rd, 11th, 27th, 57th, and 87th, respectively; the 1st to 8th pattern elements composing the third row of the rectangular pattern are turned on 90th, 79th, 69th, 59th, 39th, 31st, 43rd, and 66th, respectively; the 1st to 8th pattern elements composing the fourth row of the rectangular pattern are turned on 46th, 68th, 74th, 91st, 71st, 42nd, 30th, and 38th, respectively; the 1st to 8th pattern elements composing the fifth row of the rectangular pattern are turned on 18th, 34th, 62nd, 76th, 86th, 48th, 26th, and 10th, respectively; the 1st to 8th pattern elements composing the sixth row of the rectangular pattern are turned on 6th, 20th, 52nd, 82nd, 94th, 50th, 14th, 2nd, respectively; the 1st to 8th pattern elements composing the seventh row of the rectangular pattern are turned on 4th, 16th, 56th, 96th, 84th, 54th, 22nd, and 8th, respectively; the 1st to 8th pattern elements composing the eighth row of the rectangular pattern are turned on 12th, 28th, 58th, 88th, 78th, 64th, 36th, and 24th, respectively; the 1st to 8th pattern elements composing the ninth row of the rectangular pattern are turned on 40th, 32nd, 44th, 65th, 89th, 80th, 70th, and 60th, respectively; the 1st to 8th pattern elements composing the 10th row of the rectangular pattern are turned on 72nd, 41st, 29th, 37th, 45th, 67th, 73rd, and 92nd, respectively; the 1st to 8th pattern elements composing the 11th row of the rectangular pattern are turned on 85th, 47th, 25th, 9th, 17th, 33rd, 61st, and 75th, respectively; and the 1st to 8th pattern elements composing the twelfth row of the rectangular pattern are turned on 93rd, 49th, 13th, 1st, 5th, 19th, 51st, and 81st, respectively.

25. The computer-readable medium according to claim 17, wherein said rectangular pattern is composed of 576 pattern elements arranged in a matrix of 24 rows×24 columns that are turned on in the following manner: the 1st to 24th pattern elements composing the first row of the rectangular pattern are turned on 317th, 509th, 479th, 287th, 143rd, 47th, 23rd, 119th, 263rd, 455th, 485th, 293rd, 316th, 508th, 478th, 286th, 142nd, 46th, 22nd, 118th, 262nd, 454th, 484th, and 292nd, respectively; the 1st to 24th pattern elements composing the second row of the rectangular pattern are turned on 221st, 365th, 557th, 431st, 191st, 95th, 71st, 167th, 407th, 533rd, 341st, 197th, 220th, 364th, 556th, 430th, 190th, 94th, 70th, 166th, 406th, 532nd, 340th, and 196th, respectively; the 1st to 24th pattern elements composing the third row of the rectangular pattern are turned on 77th, 173rd, 413th, 575th, 383rd, 239th, 215th, 359th, 551st, 389th, 149th, 53rd, 76th, 172nd, 412th, 574th, 382nd, 238th, 214th, 358th, 550th, 388th, 148th, 52nd, respectively; the 1st to 24th pattern elements composing the fourth row of the rectangular pattern are turned on 29th, 125th, 269th, 461st, 527th, 335th, 311th, 503rd, 437th, 245th, 101st, 5th, 28th, 124th, 268th, 460th, 526th, 334th, 310th, 502nd, 436th, 244th, 100th, and 4th, respectively; the 1st to 24th pattern elements composing the fifth row of the rectangular pattern are turned on 17th, 113th, 257th, 449th, 491st, 299th, 323rd, 515th, 473rd, 281st, 137th, 41st, 16th, 112th, 256th, 448th, 490th, 298th, 322nd, 514th, 472nd, 280th, 136th, and 40th, respectively; the 1st to 24th pattern elements composing the sixth row of the rectangular pattern are turned on 65th, 161st, 401st, 539th, 347th, 203rd, 227th, 371st, 563rd, 425th, 185th, 89th, 64th, 160th, 400th, 538th, 346th, 202nd, 226th, 370th, 562nd, 424th, 184th, and 88th, respectively; the 1st to 24th pattern elements composing the seventh row of the rectangular pattern are turned on 209th, 353rd, 545th, 395th, 155th, 59th, 83rd, 179th, 419th, 569th, 377th, 233rd, 208th, 352nd, 544th, 394th, 154th, 58th, 82nd, 178th, 418th, 568th, 376th, and 232nd, respectively; the 1st to 24th pattern elements composing the eighth row of the rectangular pattern are turned on 305th, 497th, 443rd, 251st, 107th, 11th, 35th, 131st, 275th, 467th, 521st, 329th, 304th, 496th, 442nd, 250th, 106th, 10th, 34th, 130th, 274th, 466th, 520th, and 328th, respectively; the 1st to 24th pattern elements composing the ninth row of the rectangular pattern are turned on 313th, 505th, 475th, 283rd, 139th, 43rd, 19th, 115th, 259th, 451st, 481st, 289th, 314th, 506th, 476th, 284th, 140th, 44th, 20th, 116th, 260th, 452nd, 482nd, and 290th, respectively; the 1st to 24th pattern elements composing the 10th row of the rectangular pattern are turned on 217th, 361st, 553rd, 427th, 187th, 91st, 67th, 163rd, 403rd, 529th, 337th, 193rd, 218th, 362nd, 554th, 428th, 188th, 92nd, 68th, 164th, 404th, 530th, 338th, and 194th, respectively; the 1st to 24th pattern elements composing the 11th row of the rectangular pattern are turned on 73rd, 169th, 409th, 571st, 379th, 235th, 211th, 355th, 547th,385th, 145th, 49th, 74th, 170th, 410th, 572nd, 380th, 236th, 212th, 356th, 548th, 386th, 146th, and 50th, respectively; the 1st to 24th pattern elements composing the twelfth row of the rectangular pattern are turned on 25th, 121st, 265th, 457th, 523rd, 331st, 307th, 499th, 433rd, 241st, 97th, 1st, 26th, 122nd, 266th, 458th, 524th, 332nd, 308th, 500th, 434th, 242nd, 98th, and 2nd, respectively; the 1st to 24th pattern elements composing the 13th row of the rectangular pattern are turned on 13th, 109th, 253rd, 445th, 487th, 295th, 319th, 511th, 469th, 277th, 133rd, 37th, 14th, 110th, 254th, 446th, 488th, 296th, 320th, 512th, 470th, 278th, 134th, and 38th, respectively; the 1st to 24th pattern elements composing the 14th row of the rectangular pattern are turned on 61st, 157th, 397th, 535th, 343rd, 199th, 223rd, 367th, 559th, 421st, 181st, 85th, 62nd, 158th, 398th, 536th, 344th, 200th, 224th, 368th, 560th, 422nd, 182nd, and 86th, respectively; the 1st to 24th pattern elements composing the 15th row of the rectangular pattern are turned on 205th, 349th, 541st, 391st, 151st, 55th, 79th, 175th, 415th, 565th, 373rd, 229th, 206th, 350th, 542nd, 392nd, 152nd, 56th, 80th, 176th, 416th, 566th, 374th, and 230th, respectively; the 1st to 24th pattern elements composing the 16th row of the rectangular pattern are turned on 301st, 493rd, 439th, 247th, 103rd, 7th, 31st, 127th, 271st, 463rd, 517th, 325th, 302nd, 494th, 440th, 248th, 104th, 8th, 32nd, 128th, 272nd, 464th, 518th, and 326th, respectively; the 1st to 24th pattern elements composing the 17th row of the rectangular pattern are turned on 315th, 507th, 477th, 285th, 141st, 45th, 21st, 117th, 261st, 453rd, 483rd, 291st, 318th, 510th, 480th, 288th, 144th, 48th, 24th, 120th, 264th, 456th, 486th, and 294th, respectively; the 1st to 24th pattern elements composing the 18th row of the rectangular pattern are turned on 219th, 363rd, 555th, 429th, 189th, 93rd, 69th, 165th, 405th, 531st, 339th, 195th, 222nd, 366th, 558th, 432nd, 192nd, 96th, 72nd, 168th, 408th, 534th, 342nd, and 198th, respectively; the 1st to 24th pattern elements composing the 19th row of the rectangular pattern are turned on 75th, 171st, 411th, 573rd, 381st, 237th, 213th, 357th, 549th, 387th, 147th, 51st, 78th, 174th, 414th, 576th, 384th, 240th, 216th, 360th, 552nd, 390th, 150th, and 54th, respectively; the 1st to 24th pattern elements composing the 20th row of the rectangular pattern are turned on 27th, 123rd, 267th, 459th, 525th, 333rd, 309th, 501st, 435th, 243rd, 99th, 3rd, 30th, 126th, 270th, 462nd, 528th, 336th, 312th, 504th, 438th, 246th, 102nd, and 6th, respectively; the 1st to 24th pattern elements composing the 21st row of the rectangular pattern are turned on 15th, 111th, 255th, 447th, 489th, 297th, 321st, 513th, 471st, 279th, 135th, 39th, 18th, 114th, 258th, 450th, 492nd, 300th, 324th, 516th, 474th, 282nd, 138th, and 42nd, respectively; the 1st to 24th pattern elements composing the 22nd row of the rectangular pattern are turned on 63rd, 159th, 399th, 537th, 345th, 201st, 225th, 369th, 561st, 423rd, 183rd, 87th, 66th, 162nd, 402nd, 540th, 348th, 204th, 228th, 372nd, 564th, 426th, 186th, and 90th, respectively; the 1st to 24th pattern elements composing the 23rd row of the rectangular pattern are turned on 207th, 351st, 543rd, 393rd, 153rd, 57th, 81st, 177th, 417th, 567th, 375th, 231st, 210th, 354th, 546th, 396th, 156th, 60th, 84th, 180th, 420th, 570th, 378th, and 234th, respectively; and the 1st to 24th pattern elements composing the 24th row of the rectangular pattern are turned on 303rd, 495th, 441st, 249th, 105th, 9th, 33rd, 129th, 273rd, 465th, 519th, 327th, 306th, 498th, 444th, 252nd, 108th, 12th, 36th, 132nd, 276th, 468th, 522nd, and 330th, respectively.

26. A computer-readable medium according to claim 17, wherein said rectangular pattern is composed of 576 pattern elements arranged in a matrix of 24 rows×24 columns that are turned on in the following manner: the 1st to 24th pattern elements composing the first row of the rectangular pattern are turned on 269th, 461st, 527th, 335th, 143rd, 47ht, 23rd, 119th, 311th, 503rd, 437th, 245th, 268th, 460th, 526th, 334th, 142nd, 46th, 22nd, 118th, 310th, 502nd, 436th, and 244th, respectively; the 1st to 24th pattern elements composing the second row of the rectangular pattern are turned on 173rd, 365th, 557th, 431st, 239th, 95th, 71st, 215th, 407th, 533rd, 341st, 149th, 172nd, 364th, 556th, 430th, 238th, 94th, 70th, 214th, 406th, 532nd, 340th, and 148th, respectively; the 1st to 24th pattern elements composing the third row of the rectangular pattern are turned on 77th, 221st, 413th, 575th, 383rd, 191st, 167th, 359th, 551st, 389th, 197th, 53rd, 76th, 220th, 412th, 574th, 382nd, 190th, 166th, 358th, 550th, 388th, 196th, and 52nd, respectively; the 1st to 24th pattern elements composing the fourth row of the rectangular pattern are turned on 29th, 125th, 317th, 509th, 479th, 287th, 263rd, 455th, 485th, 293rd, 101st, 5th, 28th, 124th, 316th, 508th, 478th, 286th, 262nd, 454th, 484th, 292nd, 100th, and 4th, respectively; the 1st to 24th pattern elements composing the fifth row of the rectangular pattern are turned on 17th, 113th, 305th, 497th, 443rd, 251st, 275th, 467th, 521st, 329th, 137th, 41st, 16th, 112th, 304th, 496th, 442nd, 250th, 274th, 466th, 520th, 328th, 136th, and 40th, respectively; the 1st to 24th pattern elements composing the sixth row of the rectangular pattern are turned on 65th, 209th, 401st, 539th, 347th, 155th, 179th, 371st, 563rd, 425th, 233rd, 89th, 64th, 208th, 400th, 538th, 346th, 154th, 178th, 370th, 562nd, 424th, 232nd, and 88th, respectively; the 1st to 24th pattern elements composing the seventh row of the rectangular pattern are turned on 161st, 353rd, 545th, 395th, 203rd, 59th, 83rd, 227th, 419h, 569th, 377th, 185th, 160th, 352nd, 544th, 394th, 202nd, 58th, 82nd, 226th, 418th, 568th, 376th, and 184th, respectively; the 1st to 24th pattern elements composing the eighth row of the rectangular pattern are turned on 257th, 449th, 491st, 299th, 107th, 11th, 35th, 131st, 323rd, 515th, 473rd, 281st, 256th, 448th, 490th, 298th, 106th, 10th, 34th, 130th, 322nd, 514th, 472nd, and 280th, respectively; the 1st to 24th pattern elements composing the ninth row of the rectangular pattern are turned on 265th, 457th, 523rd, 331st, 139th, 43rd, 19th, 115th, 307th, 499th, 433rd, 241st, 266th, 458th, 524th, 332nd, 140th, 44th, 20th, 116th, 308th, 500th, 434th, and 242nd, respectively; the 1st to 24th pattern elements composing the 10th row of the rectangular pattern are turned on 169th, 361st, 553rd, 427th, 235th, 91st, 67th, 211th, 403rd, 529th, 337th, 145th, 170th, 362nd, 554th, 428th, 236th, 92nd, 68th, 212th, 404th, 530th, 338th, and 146th, respectively; the 1st to 24th pattern elements composing the 11th row of the rectangular pattern are turned on 73rd, 217th, 409th, 571st, 379th, 187th, 163rd, 355th, 547th, 385th, 193rd, 49th, 74th, 218th, 410th, 572nd, 380th, 188th, 164th, 356th, 548th, 386th, 194th, and 50th, respectively; the 1st to 24th pattern elements composing the twelfth row of the rectangular pattern are turned on 25th, 121st, 313th, 505th, 475th, 283rd, 259th, 451st, 481st, 289th, 97th, 1st, 26th, 122nd, 314th, 506th, 476th, 284th, 260th, 452nd, 482nd, 290th, 98th, and 2nd, respectively; the 1st to 24th pattern elements composing the 13th row of the rectangular pattern are turned on 13th, 109th, 301st, 493rd, 439th, 247th, 271st, 463rd, 517th, 325th, 133rd, 37th, 14th, 110th, 302nd, 494th, 440th, 248th, 272nd, 464th, 518th, 326th, 134th, and 38th, respectively; the 1st to 24th pattern elements composing the 14th row of the rectangular pattern are turned on 61st, 205th, 397th, 535th, 343rd, 151st, 175th, 367th, 559th, 421st, 229th, 85th, 62nd, 206th, 398th, 536th, 344th, 152nd, 176th, 368th, 560th, 422nd, 230th, and 86th, respectively; the 1st to 24th pattern elements composing the 15th row of the rectangular pattern are turned on 157th, 349th, 541st, 391st, 199th, 55th, 79th, 223rd, 415th, 565th, 373rd, 181st, 158th, 350th, 542nd, 392nd, 200th, 56th, 80th, 224th, 416th, 566th, 374th, and 182nd, respectively; the 1st to 24th pattern elements composing the 16th row of the rectangular pattern are turned on 253rd, 445th, 487th, 295th, 103rd, 7th, 31st, 127th, 319th, 511th, 469th, 277th, 254th, 446th, 488th, 296th, 104th, 8th, 32nd, 128th, 320th, 512th, 470th, and 278th, respectively; the 1st to 24th pattern elements composing the 17th row of the rectangular pattern are turned on 267th, 459th, 525th, 333rd, 141st, 45th, 21st, 117th, 309th, 501st, 435th, 243rd, 270th, 462nd, 528th, 336th, 144th, 48th, 24th, 120th, 312th, 504th, 438th, and 246th, respectively; the 1st to 24th pattern elements composing the 18th row of the rectangular pattern are turned on 171st, 363rd, 555th, 429th, 237th, 93rd, 69th, 213th, 405th, 531st, 339th, 147th, 174th, 366th, 558th, 432nd, 240th, 96th, 72nd, 216th, 408th, 534th, 342nd, and 150th, respectively; the 1st to 24th pattern elements composing the 19th row of the rectangular pattern are turned on 75th, 219th, 411th, 573rd, 381st, 189th, 165th, 357th, 549th, 387th, 195th, 51st, 78th, 222nd, 414th, 576th, 384th, 192nd, 168th, 360th, 552nd, 390th, 198th, and 54th, respectively; the 1st to 24th pattern elements composing the 20th row of the rectangular pattern are turned on 27th, 123rd, 315th, 507th, 477th, 285th, 261st, 453rd, 483rd, 291st, 99th, 3rd, 30th, 126th, 318th, 510th, 480th, 288th, 264th, 456th, 486th, 294th, 102nd, and 6th, respectively; the 1st to 24th pattern elements composing the 21st row of the rectangular pattern are turned on 15th, 111th, 303rd, 495th, 441st, 249th, 273rd, 465th, 519th, 327th, 135th, 39th, 18th, 114th, 306th, 498th, 444th, 252nd, 276th, 468th, 522nd, 330th, 138th, and 42nd, respectively; the 1st to 24th pattern elements composing the 22nd row of the rectangular pattern are turned on 63rd, 207th, 399th, 537th, 345th, 153rd, 177th, 369th, 561st, 423rd, 231st, 87th, 66th, 210th, 402nd, 540th, 348th, 156th, 180th, 372nd, 564th, 426th, 234th, and 90th, respectively; the 1st to 24th pattern elements composing the 23rd row of the rectangular pattern are turned on 159th, 351st, 543rd, 393rd, 201st, 57th, 81st, 225th, 417th, 567th, 375th, 183rd, 162nd, 354th, 546th, 396th, 204th, 60th, 84th, 228th, 420th, 570th, 378th, and 186th, respectively; and the 1st to 24th pattern elements composing the 24th row of the rectangular pattern are turned on 255th, 447th, 489th, 297th, 105th, 9th, 33rd, 129th, 321st, 513th, 471st, 279th, 258th, 450th, 492nd, 300th, 108th, 12th, 36th, 132nd, 324th, 516th, 474th, and 282nd, respectively.

27. The computer-readable medium according to claim 17, wherein said rectangular pattern is composed of 576 pattern elements arranged in a matrix of 24 rows×24 columns that are turned on in the following manner: the 1st to 24th pattern elements composing the first row of the rectangular pattern are turned on 495th, 279th, 87th, 39th, 15th, 135th, 327th, 567th, 493rd, 277th, 85th, 37th, 13th, 133rd, 325th, 565th, 497th, 281st, 89th, 41st, 17th, 137th, 329th, and 569th, respectively; the 1st to 24th pattern elements composing the second row of the rectangular pattern are turned on 399th, 255th, 183rd, 111th, 63rd, 159th, 447th, 543rd, 397th, 253rd, 181st, 109th, 61st, 157th, 445th, 541st, 401st, 257th, 185th, 113th, 65th, 161st, 449th, and 545th, respectively; the 1st to 24th pattern elements composing the third row of the rectangular pattern are turned on 513th, 375th, 423rd, 303rd, 231st, 207th, 351st, 465th, 511th, 373rd, 421st, 301st, 229th, 205th, 349th, 463rd, 515th, 377th, 425th, 305th, 233rd, 209th, 353rd, and 467th, respectively; the 1st to 24th pattern elements composing the fourth row of the rectangular pattern are turned on 297th, 417th, 369th, 519th, 471st, 345th, 201st, 225th, 295th, 415th, 367th, 517th, 469th, 343rd, 199th, 223rd, 299th, 419th, 371st, 521st, 473rd, 347th, 203rd, and 227th, respectively; the 1st to 24th pattern elements composing the fifth row of the rectangular pattern are turned on 105th, 177th, 249th, 393rd, 537th, 441st, 153rd, 57th, 103rd, 175th, 247th, 391st, 535th, 439th, 151st, 55th, 107th, 179th, 251st, 395th, 539th, 443rd, 155th, and 59th, respectively; the 1st to 24th pattern elements composing the sixth row of the rectangular pattern are turned on 33rd, 81st, 273rd, 489th, 561st, 321st, 129th, 9th, 31st, 79th, 271st, 487th, 559th, 319th, 127th, 7th, 35th, 83rd, 275th, 491st, 563rd, 323rd, 131st, and 11th, respectively; the 1st to 24th pattern elements composing the seventh row of the rectangular pattern are turned on 21st, 141st, 333rd, 573rd, 501st, 285th, 93rd, 45th, 19th, 139th, 331st, 571st, 499th, 283rd, 91st, 43rd, 23rd, 143rd, 335th, 575th, 503rd, 287th, 95th, and 47th, respectively; the 1st to 24th pattern elements composing the eighth row of the rectangular pattern are turned on 69th, 165th, 453rd, 549th, 405th, 261st, 189th, 117th, 67th, 163rd, 451st, 547th, 403rd, 259th, 187th, 115th, 71st, 167th, 455th, 551st, 407th, 263rd, 191st, and 119th, respectively; the 1st to 24th pattern elements composing the ninth row of the rectangular pattern are turned on 237th, 213th, 357th, 459th, 507th, 381st, 429th, 309th, 235th, 211th, 355th, 457th, 505th, 379th, 427th, 307th, 239th, 215th, 359th, 461st, 509th, 383rd, 431st, and 311th, respectively; the 1st to 24th pattern elements composing the 10th row of the rectangular pattern are turned on 477th, 339th, 195th, 219th, 291st, 411th, 363rd, 525th, 475th, 337th, 193rd, 217th, 289th, 409th, 361st, 523rd, 479th, 341st, 197th, 221st, 293rd, 413th, 365th, and 527th, respectively; the 1st to 24th pattern elements composing the 11th row of the rectangular pattern are turned on 531st, 435th, 147th, 51st, 99th, 171st, 243rd, 387th, 529th, 433rd, 145th, 49th, 97th, 169th, 241st, 385th, 533rd, 437th, 149th, 53rd, 101st, 173rd, 245th, and 389th, respectively; the 1st to 24th pattern elements composing the twelfth row of the rectangular pattern are turned on 555th, 315th, 123rd, 3rd, 27th, 75th, 267th, 483rd, 553rd, 313th, 121st, 1st, 25th, 73rd, 265th, 481st, 557th, 317th, 125th, 5th, 29th, 77th, 269th, and 485th, respectively; the 1st to 24th pattern elements composing the 13th row of the rectangular pattern are turned on 498th, 282nd, 90th, 42nd, 18th, 138th, 330th, 570th, 494th, 278th, 86th, 38th, 14th, 134th, 326th, 566th, 496th, 280th, 88th, 40th, 16th, 136th, 328th, and 568th, respectively; the 1st to 24th pattern elements composing the 14th row of the rectangular pattern are turned on 402nd, 258th, 186th, 114th, 66th, 162nd, 450th, 546th, 398th, 254th, 182nd, 110th, 62nd, 158th, 446th, 542nd, 400th, 256th, 184th, 112th, 64th, 160th, 448th, and 544th, respectively; the 1st to 24th pattern elements composing the 15th row of the rectangular pattern are turned on 516th, 378th, 426th, 306th, 234th, 210th, 354th, 468th, 512th, 374th, 422nd, 302nd, 230th, 206th, 350th, 464th, 514th, 376th, 424th, 304th, 232nd, 208th, 352nd, and 466th, respectively; the 1st to 24th pattern elements composing the 16th row of the rectangular pattern are turned on 300th, 420th, 372nd, 522nd, 474th, 348th, 204th, 228th, 296th, 416th, 368th, 518th, 470th, 344th, 200th, 224th, 298th, 418th, 370th, 520th, 472nd, 346th, 202nd, and 226th, respectively; the 1st to 24th pattern elements composing the 17th row of the rectangular pattern are turned on 108th, 180th, 252nd, 396th, 540th, 444th, 156th, 60th, 104th, 176th, 248th, 392nd, 536th, 440th, 152nd, 56th, 106th, 178th, 250th, 394th, 538th, 442nd, 154th, and 58th, respectively; the 1st to 24th pattern elements composing the 18th row of the rectangular pattern are turned on 36th, 84th, 276th, 492nd, 564th, 324th, 132nd, 12th, 32nd, 80th, 272nd, 488th, 560th, 320th, 128th, 8th, 34th, 82nd, 274th, 490th, 562nd, 322nd, 130th, and 10th, respectively; the 1st to 24th pattern elements composing the 19th row of the rectangular pattern are turned on 24th, 144th, 336th, 576th, 504th, 288th, 96th, 48th, 20th, 140th, 332nd, 572nd, 500th, 284th, 92nd, 44th, 22nd, 142nd, 334th, 574th, 502nd, 286th, 94th, and 46th, respectively; the 1st to 24th pattern elements composing the 20th row of the rectangular pattern are turned on 72nd, 168th, 456th, 552nd, 408th, 264th, 192nd, 120th, 68th, 164th, 452nd, 548th, 404th, 260th, 188th, 116th, 70th, 166th, 454th, 550th, 406th, 262nd, 190th, and 118th, respectively; the 1st to 24th pattern elements composing the 21st row of the rectangular pattern are turned on 240th, 216th, 360th, 462nd, 510th, 384th, 432nd, 312th, 236th, 212th, 356th, 458th, 506th, 380th, 428th, 308th, 238th, 214th, 358th, 460th, 508th, 382nd, 430th, and 310th, respectively; the 1st to 24th pattern elements composing the 22nd row of the rectangular pattern are turned on 480th, 342nd, 198th, 222nd, 294th, 414th, 366th, 528th, 476th, 338th, 194th, 218th, 290th, 410th, 362nd, 524th, 478th, 340th, 196th, 220th, 292nd, 412th, 364th, and 526th, respectively; the 1st to 24th pattern elements composing the 23rd row of the rectangular pattern are turned on 534th, 438th, 150th, 54th, 102nd, 174th, 246th, 390th, 530th, 434th, 146th, 50th, 98th, 170th, 242nd, 386th, 532nd, 436th, 148th, 52nd, 100th, 172nd, 244th, and 388th, respectively; and the 1st to 24th pattern elements composing the 24th row of the rectangular pattern are turned on 558th, 318th, 126th, 6th, 30th, 78th, 270th, 486th, 554th, 314th, 122nd, 2nd, 26th, 74th, 266th, 482nd, 556th, 316th, 124th, 4th, 28th, 76th, 268th, and 484th, respectively.

28. The computer-readable medium according to claim 17, wherein said rectangular pattern is composed of 576 pattern elements arranged in a matrix of 24 rows×24 columns that are turned on in the following manner: the 1st to 24th pattern elements composing the first row of the rectangular pattern are turned on 495th, 351st, 135th, 39th, 15th, 87th, 327th, 567th, 493rd, 349th, 133rd, 37th, 13th, 85th, 325th, 565th, 497th, 353rd, 137th, 41st, 17th, 89th, 329th, and 569th, respectively; the 1st to 24th pattern elements composing the second row of the rectangular pattern are turned on 471st, 375th, 207th, 111th, 63rd, 159th, 303rd, 519th, 469th, 373rd, 205th, 109th, 61st, 157th, 301st, 517th, 473rd, 377th, 209th, 113th, 65th, 161st, 305th, and 521st, respectively; the 1st to 24th pattern elements composing the third row of the rectangular pattern are turned on 537th, 447th, 423rd, 279th, 231st, 183rd, 255th, 393rd, 535th, 445th, 421st, 277th, 229th, 181st, 253rd, 391st, 539th, 449th, 425th, 281st, 233rd, 185th, 257th, and 395th, respectively; the 1st to 24th pattern elements composing the fourth row of the rectangular pattern are turned on 273rd, 417th, 441st, 543rd, 399th, 249th, 177th, 225th, 271st, 415th, 439th, 541st, 397th, 247th, 175th, 223rd, 275th, 419th, 443rd, 545th, 401st, 251st, 179th, and 227th, respectively; the 1st to 24th pattern elements composing the fifth row of the rectangular pattern are turned on 105th, 201st, 369th, 465th, 513th, 297th, 153rd, 57th, 103rd, 199th, 367th, 463rd, 511th, 295th, 151st, 55th, 107th, 203rd, 371st, 467th, 515th, 299th, 155th, and 59th, respectively; the 1st to 24th pattern elements composing the sixth row of the rectangular pattern are turned on 33rd, 129th, 345th, 489th, 561st, 321st, 81st, 9th, 31st, 127th, 343rd, 487th, 559th, 319th, 79th, 7th, 35th, 131st, 347th, 491st, 563rd, 323rd, 83rd, and 11th, respectively; the 1st to 24th pattern elements composing the seventh row of the rectangular pattern are turned on 21st, 93rd, 333rd, 573rd, 501st, 357th, 141st, 45th, 19th, 91st, 331st, 571st, 499th, 355th, 139th, 43rd, 23rd, 95th, 335th, 575th, 503rd, 359th, 143rd, and 47th, respectively; the 1st to 24th pattern elements composing the eighth row of the rectangular pattern are turned on 69th, 165th, 309th, 525th, 477th, 381st, 213th, 117th, 67th, 163rd, 307th, 523rd, 475th, 379th, 211th, 115th, 71st, 167th, 311th, 527th, 479th, 383rd, 215th, and 119th, respectively; the 1st to 24th pattern elements composing the ninth row of the rectangular pattern are turned on 237th, 189th, 261st, 387th, 531st, 453rd, 429th, 285th, 235th, 187th, 259th, 385th, 529th, 451st, 427th, 283rd, 239th, 191st, 263rd, 389th, 533rd, 455th, 431st, and 287th, respectively; the 1st to 24th pattern elements composing the 10th row of the rectangular pattern are turned on 405th, 243rd, 171st, 219th, 267th, 411th, 435th, 549th, 403rd, 241st, 169th, 217th, 265th, 409th, 433rd, 547th, 407th, 245th, 173rd, 221st, 269th, 413th, 437th, and 551st, respectively; the 1st to 24th pattern elements composing the 11th row of the rectangular pattern are turned on 507th, 291st, 147th, 51st, 99th, 195th, 363rd, 459th, 505th, 289th, 145th, 49th, 97th, 193rd, 361st, 457th, 509th, 293rd, 149th, 53rd, 101st, 197th, 365th, and 461st, respectively; the 1st to 24th pattern elements composing the twelfth row of the rectangular pattern are turned on 555th, 315th, 75th, 3rd, 27th, 123rd, 339th, 483rd, 553rd, 313th, 73rd, 1st, 25th, 121st, 337th, 481st, 557th, 317th, 77th, 5th, 29th, 125th, 341st, and 485th, respectively; the 1st to 24th pattern elements composing the 13th row of the rectangular pattern are turned on 498th, 354th, 138th, 42nd, 18th, 90th, 330th, 570th, 494th, 350th, 134th, 38th, 14th, 86th, 326th, 566th, 496th, 352nd, 136th, 40th, 16th, 88th, 328th, and 568th, respectively; the 1st to 24th pattern elements composing the 14th row of the rectangular pattern are turned on 474th, 378th, 210th, 114th, 66th, 162nd, 306th, 522nd, 470th, 374th, 206th, 110th, 62nd, 158th, 302nd, 518th, 472nd, 376th, 208th, 112th, 64th, 160th, 304th, and 520th, respectively; the 1st to 24th pattern elements composing the 15th row of the rectangular pattern are turned on 540th, 450th, 426th, 282nd, 234th, 186th, 258th, 396th, 536th, 446th, 422nd, 278th, 230th, 182nd, 254th, 392nd, 538th, 448th, 424th, 280th, 232nd, 184th, 256th, and 394th, respectively; the 1st to 24th pattern elements composing the 16th row of the rectangular pattern are turned on 276th, 420th, 444th, 546th, 402nd, 252nd, 180th, 228th, 272nd, 416th, 440th, 542nd, 398th, 248th, 176th, 224th, 274th, 418th, 442nd, 544th, 400th, 250th, 178th, and 226th, respectively; the 1st to 24th pattern elements composing the 17th row of the rectangular pattern are turned on 108th, 204th, 372nd, 468th, 516th, 300th, 156th, 60th, 104th, 200th, 368th, 464th, 512th, 296th, 152nd, 56th, 106th, 202nd, 370th, 466th, 514th, 298th, 154th, and 58th, respectively; the 1st to 24th pattern elements composing the 18th row of the rectangular pattern are turned on 36th, 132nd, 348th, 492nd, 564th, 324th, 84th, 12th, 32nd, 128th, 344th, 488th, 560th, 320th, 80th, 8th, 34th, 130th, 346th, 490th, 562nd, 322nd, 82nd, and 10th, respectively; the 1st to 24th pattern elements composing the 19th row of the rectangular pattern are turned on 24th, 96th, 336th, 576th, 504th, 360th, 144th, 48th, 20th, 92nd, 332nd, 572nd, 500th, 356th, 140th, 44th, 22nd, 94th, 334th, 574th, 502nd, 358th, 142nd, and 46th, respectively; the 1st to 24th pattern elements composing the 20th row of the rectangular pattern are turned on 72nd, 168th, 312th, 528th, 480th, 384th, 216th, 120th, 68th, 164th, 308th, 524th, 476th, 380th, 212th, 116th, 70th, 166th, 310th, 526th, 478th, 382nd, 214th, and 118th, respectively; the 1st to 24th pattern elements composing the 21st row of the rectangular pattern are turned on 240th, 192nd, 264th, 390th, 534th, 456thh, 432nd, 288th, 236th, 188th, 260th, 386th, 530th, 452nd, 428th, 284th, 238th, 190th, 262nd, 388th, 532nd, 454th, 430th, and 286th, respectively; the 1st to 24th pattern elements composing the 22nd row of the rectangular pattern are turned on 408th, 246th, 174th, 222nd, 270th, 414th, 438th, 552nd 404th, 242nd, 170th, 218th, 266th, 410th, 434th, 548th, 406th, 244th, 172nd, 220th, 268th, 412th, 436th, and 550th, respectively; the 1st to 24th pattern elements composing the 23rd row of the rectangular pattern are turned on 510th, 294th, 150th, 54th, 102nd, 198th, 366th, 462nd, 506th, 290th, 146th, 50th, 98th, 194th, 362nd, 458th, 508th, 292nd, 148th, 52nd, 100th, 196th, 364th, and 460th, respectively; and the 1st to 24th pattern elements composing the 24th row of the rectangular pattern are turned on 558th, 318th, 78th, 6th, 30th, 126th, 342nd, 486th, 554th, 314th, 74th, 2nd, 26th, 122nd, 338th, 482nd, 556th, 316th, 76th, 4th, 28th, 124th, 340th, and 484th, respectively.

29. The computer-readable medium according to claim 17, wherein said rectangular pattern is composed of 576 pattern elements arranged in a matrix of 24 rows×24 columns that are turned on in the following manner: the 1st to 24th pattern elements composing the first row of the rectangular pattern are turned on 305th, 497th, 395th, 251st, 107th, 35th, 47th, 119th, 263rd, 407th, 485th, 293rd, 304th, 496th, 394th, 250th, 106th, 34th, 46th, 118th, 262nd, 406th, 484th, and 292nd, respectively; the 1st to 24th pattern elements composing the second row of the rectangular pattern are turned on 209th, 329th, 545th, 419th, 179th, 131st, 143rd, 191st, 431st, 533rd, 317th, 197th, 208th, 328th, 544th, 418th, 178th, 130th, 142nd, 190th, 430th, 532nd, 316th, and 196th, respectively; the 1st to 24th pattern elements composing the third row of the rectangular pattern are turned on 65th, 161st, 353rd, 563rd, 443rd, 275th, 287th, 455th, 575th, 341st, 149th, 53rd, 64th, 160th, 352nd, 562nd, 442nd, 274th, 286th, 454th, 574th, 340th, 148th, and 52nd, respectively; the 1st to 24th pattern elements composing the fourth row of the rectangular pattern are turned on 17th, 89th, 233rd, 377th, 515th, 467th, 479th, 527th, 365th, 221st, 77th, 5th, 16th, 88th, 232nd, 376th, 514th, 466th, 478th, 526th, 364th, 220th, 76th, and 4th, respectively; the 1st to 24th pattern elements composing the fifth row of the rectangular pattern are turned on 41st, 113th, 257th, 401st, 491st, 299th, 311th, 503rd, 389th, 245th, 101st, 29th, 40th, 112th, 256th, 400th, 490th, 298th, 310th, 502nd, 388th, 244th, 100th, and 28th, respectively; the 1st to 24th pattern elements composing the sixth row of the rectangular pattern are turned on 137th, 185th, 425th, 539th, 323rd, 203rd, 215th, 335th, 551st, 413th, 173rd, 125th, 136th, 184th, 424th, 538th, 322nd, 202nd, 214th, 334th, 550th, 412th, 172nd, and 124th, respectively; the 1st to 24th pattern elements composing the seventh row of the rectangular pattern are turned on 281st, 449th, 569th, 347th, 155th, 59th, 71st, 167th, 359th, 557th, 437th, 269th, 280th, 448th, 568th, 346th, 154th, 58th, 70th, 166th, 358th, 556th, 436th, and 268th, respectively; the 1st to 24th pattern elements composing the eighth row of the rectangular pattern are turned on 473rd, 521st, 371st, 227th, 83rd, 11th, 23rd, 95th, 239th, 383rd, 509th, 461st, 472nd, 520th, 370th, 226th, 82nd, 10th, 22nd, 94th, 238th, 382nd, 508th, and 460th, respectively; the 1st to 24th pattern elements composing the ninth row of the rectangular pattern are turned on 301st, 493rd, 391st, 247th, 103rd, 31st, 43rd, 115th, 259th, 403rd, 481st, 289th, 302nd, 494th, 392nd, 248th, 104th, 32nd, 44th, 116th, 260th, 404th, 482nd, and 290th, respectively; the 1st to 24th pattern elements composing the 10th row of the rectangular pattern are turned on 205th, 325th, 541st, 415th, 175th, 127th, 139th, 187th, 427th, 529th, 313th, 193rd, 206th, 326th, 542nd, 416th, 176th, 128th, 140th, 188th, 428th, 530th, 314th, and 194th, respectively; the 1st to 24th pattern elements composing the 11th row of the rectangular pattern are turned on 61st, 157th, 349th, 559th, 439th, 271st, 283rd, 451st, 571st, 337th, 145th, 49th, 62nd, 158th, 350th, 560th, 440th, 272nd, 284th, 452nd, 572nd, 338th, 146th, and 50th, respectively; the 1st to 24th pattern elements composing the twelfth row of the rectangular pattern are turned on 13th, 85th, 229th, 373rd, 511th, 463rd, 475th, 523rd, 361st, 217th, 73rd, 1st, 14th, 86th, 230th, 374th, 512th, 464th, 476th, 524th, 362nd, 218th, 74th, and 2nd, respectively; the 1st to 24th pattern elements composing the 13th row of the rectangular pattern are turned on 37th, 109th, 253rd, 397th, 487th, 295th, 307th, 499th, 385th, 241st, 97th, 25th, 38th, 110th, 254th, 398th, 488th, 296th, 308th, 500th, 386th, 242nd, 98th, and 26th, respectively; the 1st to 24th pattern elements composing the 14th row of the rectangular pattern are turned on 133rd, 181st, 421st, 535th, 319th, 199th, 211th, 331st, 547th, 409th, 169th, 121st, 134th, 182nd, 422nd, 536th, 320th, 200th, 212th, 332nd, 548th, 410th, 170th, and 122nd, respectively; the 1st to 24th pattern elements composing the 15th row of the rectangular pattern are turned on 277th, 445th, 565th, 343rd, 151st, 55th, 67th, 163rd, 355th, 553rd, 433rd, 265th, 278th, 446th, 566th, 344th, 152nd, 56th, 68th, 164th, 356th, 554th, 434th, and 266th, respectively; the 1st to 24th pattern elements composing the 16th row of the rectangular pattern are turned on 469th, 517th, 367th, 223rd, 79th, 7th, 19th, 91st, 235th, 379th, 505th, 457th, 470th, 518th, 368th, 224th, 80th, 8th, 20th, 92nd, 236th, 380th, 506th, and 458th, respectively; the 1st to 24th pattern elements composing the 17th row of the rectangular pattern are turned on 303rd, 495th, 393rd, 249th, 105th, 33rd, 45th, 117th, 261st, 405th, 483, 291st, 306th, 498th, 396th, 252nd, 108th, 36th, 48th, 120th, 264th, 408th, 486th, and 294th, respectively; the 1st to 24th pattern elements composing the 18th row of the rectangular pattern are turned on 207th, 327th, 543rd, 417th, 177th, 129th, 141st, 189th, 429th, 531st, 315th, 195th, 210th, 330th, 546th, 420th, 180th, 132nd, 144th, 192nd, 432nd, 534th, 318th, and 198th, respectively; the 1st to 24th pattern elements composing the 19th row of the rectangular pattern are turned on 63rd, 159th, 351st, 561st, 441st, 273rd, 285th, 453rd, 573rd, 339th, 147th, 51st, 66th, 162nd, 354th, 564th, 444th, 276th, 288th, 456th, 576th, 342nd, 150th, and 54th, respectively; the 1st to 24th pattern elements composing the 20th row of the rectangular pattern are turned on 15th, 87th, 231st, 375th, 513th, 465th, 477th, 525th, 363rd, 219th, 75th, 3rd, 18th, 90th, 234th, 378th, 516th, 468th, 480th, 528th, 366th, 222nd, 78th, and 6th, respectively; the 1st to 24th pattern elements composing the 21st row of the rectangular pattern are turned on 39th, 111th, 255th, 399th, 489th, 297th, 309th, 501st, 387th, 243rd, 99th, 27th, 42nd, 114th, 258th, 402nd, 492nd, 300th, 312th, 504th, 390th, 246th, 102nd, and 30th, respectively; the 1st to 24th pattern elements composing the 22nd row of the rectangular pattern are turned on 135th, 183rd, 423rd, 537th, 321st, 201st, 213th, 333rd, 549th, 411th, 171st, 123rd, 138th, 186th, 426th, 540th, 324th, 204th, 216th, 336th, 552nd, 414th, 174th, and 126th, respectively; the 1st to 24th pattern elements composing the 23rd row of the rectangular pattern are turned on 279th, 447th, 567th, 345th, 153rd, 57th, 69th, 165th, 357th, 555th, 435th, 267th, 282nd, 450th, 570th, 348th, 156th, 60th, 72nd, 168th, 360th, 558th, 438th, and 270th, respectively; and the 1st to 24th pattern elements composing the 24th row of the rectangular pattern are turned on 471st, 519th, 369th, 225th, 81st, 9th, 21st, 93rd, 237th, 381st, 507th, 459th, 474th, 522nd, 372nd, 228th, 84th, 12th, 24th, 96th, 240th, 384th, 510th, and 462nd, respectively.

30. The computer-readable medium according to claim 17, wherein said rectangular pattern is composed of 576 pattern elements arranged in a matrix of 24 rows×24 columns that are turned on in the following manner: the 1st to 24th pattern elements composing the first row of the rectangular pattern are turned on 257th, 449th, 515th, 323rd, 131st, 35th, 47th, 143rd, 335th, 527th, 437th, 245th, 256th, 448th, 514th, 322nd, 130th, 34th, 46th, 142nd, 334th, 526th, 436th, and 244th, respectively; the 1st to 24th pattern elements composing the second row of the rectangular pattern are turned on 161st, 353rd, 545th, 419th, 203rd, 83rd, 95th, 215th, 431st, 533rd, 341st, 149th, 160th, 352nd, 544th, 418th, 202nd, 82nd, 94th, 214th, 430th, 532nd, 340th, and 148th, respectively; the 1st to 24th pattern elements composing the third row of the rectangular pattern are turned on 65th, 185th, 401st, 563rd, 371st, 227th, 239th, 383rd, 575th, 389th, 173rd, 53rd, 64th, 184th, 400th, 562nd, 370th, 226th, 238th, 382nd, 574th, 388th, 172nd, and 52nd, respectively; the 1st to 24th pattern elements composing the fourth row of the rectangular pattern are turned on 17th, 113th, 305th, 497th, 467th, 275th, 287th, 479th, 485th, 293rd, 101st, 5th, 16th, 112th, 304th, 496th, 466th, 274th, 286th, 478th, 484th, 292nd, 100th, and 4th, respectively; the 1st to 24th pattern elements composing the fifth row of the rectangular pattern are turned on 41st, 137th, 329th, 521st, 443rd, 251st, 263rd, 455th, 509th, 317th, 125th, 29th, 40th, 136th, 328th, 520th, 442nd, 250th, 262nd, 454th, 508th, 316th, 124th, and 28th, respectively; the 1st to 24th pattern elements composing the sixth row of the rectangular pattern are turned on 89th, 209th, 425th, 539th, 347th, 155th, 167th, 359th, 551st, 413th, 197th, 77th, 88th, 208th, 424th, 538th, 346th, 154th, 166th, 358th, 550th, 412th, 196th, and 76th, respectively; the 1st to 24th pattern elements composing the seventh row of the rectangular pattern are turned on 233rd, 377th, 569th, 395th, 179th, 59th, 71st, 191st, 407th, 557th, 365th, 221st, 232nd, 376th, 568th, 394th, 178th, 58th, 70th, 190th, 406th, 556th, 364th, and 220th, respectively; the 1st to 24th pattern elements composing the eighth row of the rectangular pattern are turned on 281st, 473rd, 491st, 299th, 107th, 11th, 23rd, 119th, 311th, 503rd, 461st, 269th, 280th, 472nd, 490th, 298th, 106th, 10th, 22nd, 118th, 310th, 502nd, 460th, and 268th, respectively; the 1st to 24th pattern elements composing the ninth row of the rectangular pattern are turned on 253rd, 445th, 511th, 319th, 127th, 31st, 43rd, 139th, 331st, 523rd, 433rd, 241st, 254th, 446th, 512th, 320th, 128th, 32nd, 44th, 140th, 332nd, 524th, 434th, and 242nd, respectively; the 1st to 24th pattern elements composing the 10th row of the rectangular pattern are turned on 157th, 349th, 541st, 415th, 199th, 79th, 91st, 211th, 427th, 529th, 337th, 145th, 158th, 350th, 542nd, 416th, 200th, 80th, 92nd, 212th, 428th, 530th, 338th, and 146th, respectively; the 1st to 24th pattern elements composing the 11th row of the rectangular pattern are turned on 61st, 181st, 397th, 559th, 367th, 223rd, 235th, 379th, 571st, 385th, 169th, 49th, 62nd, 182nd, 398th, 560th, 368th, 224th, 236th, 380th, 572nd, 386th, 170th, and 50th, respectively; the 1st to 24th pattern elements composing the twelfth row of the rectangular pattern are turned on 13th, 109th, 301st, 493rd, 463rd, 271st, 283rd, 475th, 481st, 289th, 97th, 1st, 14th, 110th, 302nd, 494th, 464th, 272nd, 284th, 476th, 482nd, 290th, 98th, and 2nd, respectively; the 1st to 24th pattern elements composing the 13th row of the rectangular pattern are turned on 37th, 133rd, 325th, 517th, 439th, 247th, 259th, 451st, 505th, 313th, 121st, 25th, 38th, 134th, 326th, 518th, 440th, 248th, 260th, 452nd, 506th, 314th, 122nd, and 26th, respectively; the 1st to 24th pattern elements composing the 14th row of the rectangular pattern are turned on 85th, 205th, 421st, 535th, 343rd, 151st, 163rd, 355th, 547th, 409th, 193rd, 73rd, 86th, 206th, 422nd, 536th, 344th, 152nd, 164th, 356th, 548th, 410th, 194th, and 74th, respectively; the 1st to 24th pattern elements composing the 15th row of the rectangular pattern are turned on 229th, 373rd, 565th, 391st, 175th, 55th, 67th, 187th, 403rd, 553rd, 361st, 217th, 230th, 374th, 566th, 392nd, 176th, 56th, 68th, 188th, 404th, 554th, 362nd, and 218th, respectively; the 1st to 24th pattern elements composing the 16th row of the rectangular pattern are turned on 277th, 469th, 487th, 295th, 103rd, 7th, 19th, 115th, 307 th, 499th, 457th, 265th, 278th, 470th, 488th, 296th, 104th, 8th, 20th, 116th, 308th, 500th, 458th, and 266th, respectively; the 1st to 24th pattern elements composing the 17th row of the rectangular pattern are turned on 255th, 447th, 513th, 321st, 129th, 33rd, 45th, 141st, 333rd, 525th, 435th, 243rd, 258th, 450th, 516th, 324th, 132nd, 36th, 48th, 144th, 336th, 528th, 438th, and 246th, respectively; the 1st to 24th pattern elements composing the 18th row of the rectangular pattern are turned on 159th, 351st, 543rd, 417th, 201st, 81st, 93rd, 213th, 429th, 531st, 339th, 147th, 162nd, 354th, 546th, 420th, 204th, 84th, 96th, 216th, 432nd, 534th, 342nd, and 150th, respectively; the 1st to 24th pattern elements composing the 19th row of the rectangular pattern are turned on 63rd, 183rd, 399th, 561st, 369th, 225th, 237th, 381st, 573rd, 387th, 171st, 51st, 66th, 186th, 402nd, 564th, 372nd, 228th, 240th, 384th, 576th, 390th, 174th, and 54th, respectively; the 1st to 24th pattern elements composing the 20th row of the rectangular pattern are turned on 15th, 111th, 303rd, 495th, 465th, 273rd, 285th, 477th, 483rd, 291st, 99th, 3rd, 18th, 114th, 306th, 498th, 468th, 276th, 288th, 480th, 486th, 294th, 102nd, and 6th, respectively; the 1st to 24th pattern elements composing the 21st row of the rectangular pattern are turned on 39th, 135th, 327th, 519th, 441st, 249th, 261st, 453rd, 507th, 315th, 123rd, 27th, 42nd, 138th, 330th, 522nd, 444th, 252nd, 264th, 456th, 510th, 318th, 126th, and 30th, respectively; the 1st to 24th pattern elements composing the 22nd row of the rectangular pattern are turned on 87th, 207th, 423rd, 537th, 345th, 153rd, 165th, 357th, 549th, 411th, 195th, 75th, 90th, 210th, 426th, 540th, 348th, 156th, 168th, 360th, 552nd, 414th, 198th, and 78th, respectively; the 1st to 24th pattern elements composing the 23rd row of the rectangular pattern are turned on 231st, 375th, 567th, 393rd, 177th, 57th, 69th, 189th, 405th, 555th, 363rd, 219th, 234th, 378th, 570th, 396th, 180th, 60th, 72nd, 192nd, 408th, 558th, 366th, and 222nd, respectively; and the 1st to 24th pattern elements composing the 24th row of the rectangular pattern are turned on 279th, 471st, 489th, 297th, 105th, 9th, 21st, 117th, 309th, 501st, 459th, 267th, 282nd, 474th, 492nd, 300th, 108th, 12th, 24th, 120th, 312th, 504th, 462nd, and 270th, respectively.

31. The computer-readable medium according to claim 17, wherein said rectangular pattern is composed of 576 pattern elements arranged in a matrix of 24 rows×24 columns that are turned on in the following manner: the 1st to 24th pattern elements composing the first row of the rectangular pattern are turned on 483rd, 243rd, 75th, 27th, 39th, 123rd, 315th, 543rd, 481st, 241st, 73rd, 25th, 37th, 121st, 313th, 541st, 485th, 245th, 77th, 29th, 41st, 125th, 317th, and 545th, respectively; the 1st to 24th pattern elements composing the second row of the rectangular pattern are turned on 375th, 255th, 171st, 135th, 87th, 183rd, 435th, 555th, 373rd, 253rd, 169th, 133rd, 85th, 181st, 433rd, 553rd, 377th, 257th, 173rd, 137th, 89th, 185th, 437th, and 557th, respectively; the 1st to 24th pattern elements composing the third row of the rectangular pattern are turned on 513th, 387th, 447th, 327th, 267th, 279th, 399th, 465th, 511th, 385th, 445th, 325th, 265th, 277th, 397th, 463rd, 515th, 389th, 449th, 329th, 269th, 281st, 401st, and 467th, respectively; the 1st to 24th pattern elements composing the fourth row of the rectangular pattern are turned on 297th, 417th, 357th, 567th, 495th, 345th, 201st, 213th, 295th, 415th, 355th, 565th, 493rd, 343rd, 199th, 211th, 299th, 419th, 359th, 569th, 497th, 347th, 203rd, and 215th, respectively; the 1st to 24th pattern elements composing the fifth row of the rectangular pattern are turned on 105th, 165th, 225th, 369th, 525th, 429th, 153rd, 57th, 103rd, 163rd, 223rd, 367th, 523rd, 427th, 151st, 55th, 107th, 167th, 227th, 371st, 527th, 431st, 155th, and 59th, respectively; the 1st to 24th pattern elements composing the sixth row of the rectangular pattern are turned on 21st, 69th, 237th, 477th, 537th, 309th, 117th, 9th, 19th, 67th, 235th, 475th, 535th, 307th, 115th, 7th, 23rd, 71st, 239th, 479th, 539th, 311th, 119th, and 11th, respectively; the 1st to 24th pattern elements composing the seventh row of the rectangular pattern are turned on 45th, 129th, 321st, 549th, 489th, 249th, 81st, 33rd, 43rd, 127th, 319th, 547th, 487th, 247th, 79th, 31st, 47th, 131st, 323rd, 551st, 491st, 251st, 83rd, and 35th, respectively; the 1st to 24th pattern elements composing the eighth row of the rectangular pattern are turned on 93rd, 189th, 441st, 561st, 381st, 261st, 177th, 141st, 91st, 187th, 439th, 559th, 379th, 259th, 175th, 139th, 95th, 191st, 443rd, 563rd, 383rd, 263rd, 179th, and 143rd, respectively; the 1st to 24th pattern elements composing the ninth row of the rectangular pattern are turned on 273rd, 285th, 405th, 459th, 507th, 393rd, 453rd, 333rd, 271st, 283rd, 403rd, 457th, 505th, 391st, 451st, 331st, 275th, 287th, 407th, 461st, 509th, 395th, 455th, and 335th, respectively; the 1st to 24th pattern elements composing the 10th row of the rectangular pattern are turned on 501st, 339th, 195th, 207th, 291st, 411th, 351st, 573rd, 499th, 337th, 193rd, 205th, 289th, 409th, 349th, 571st, 503rd, 341st, 197th, 209th, 293rd, 413th, 353rd, and 575th, respectively; the 1st to 24th pattern elements composing the 11th row of the rectangular pattern are turned on 519th, 423rd, 147th, 51st, 99th, 159th, 219th, 363rd, 517th, 421st, 145th, 49th, 97th, 157th, 217th, 361st, 521st, 425th, 149th, 53rd, 101st, 161st, 221st, and 365th, respectively; the 1st to 24th pattern elements composing the twelfth row of the rectangular pattern are turned on 531st, 303rd, 111th, 3rd, 15th, 63rd, 231st, 471st, 529th, 301st, 109th, 1st, 13th, 61st, 229th, 469th, 533rd, 305th, 113th, 5th, 17th, 65th, 233rd, and 473rd, respectively; the 1st to 24th pattern elements composing the 13th row of the rectangular pattern are turned on 486th, 246th, 78th, 30th, 42nd, 126th, 318th, 546th, 482nd, 242nd, 74th, 26th, 38th, 122nd, 314th, 542nd, 484th, 244th, 76th, 28th, 40th, 124th, 316th, and 544th, respectively; the 1st to 24th pattern elements composing the 14th row of the rectangular pattern are turned on 378th, 258th, 174th, 138th, 90th, 186th, 438th, 558th, 374th, 254th, 170th, 134th, 86th, 182nd, 434th, 554th, 376th, 256th, 172nd, 136th, 88th, 184th, 436th, and 556th, respectively; the 1st to 24th pattern elements composing the 15th row of the rectangular pattern are turned on 516th, 390th, 450th, 330th, 270th, 282nd, 402nd, 468th, 512th, 386th, 446th, 326th, 266th, 278th, 398th, 464th, 514th, 388th, 448th, 328th, 268th, 280th, 400th, and 466th, respectively; the 1st to 24th pattern elements composing the 16th row of the rectangular pattern are turned on 300th, 420th, 360th, 570th, 498th, 348th, 204th, 216th, 296th, 416th, 356th, 566th, 494th, 344th, 200th, 212th, 298th, 418th, 358th, 568th, 496th, 346th, 202nd, and 214th, respectively; the 1st to 24th pattern elements composing the 17th row of the rectangular pattern are turned on 108th, 168th, 228th, 372nd, 528th, 432nd, 156th, 60th, 104th, 164th, 224th, 368th, 524th, 428th, 152nd, 56th, 106th, 166th, 226th, 370th, 526th, 430th, 154th, and 58th, respectively; the 1st to 24th pattern elements composing the 18th row of the rectangular pattern are turned on 24th, 72nd, 240th, 480th, 540th, 312th, 120th, 12th, 20th, 68th, 236th, 476th, 536th, 308th, 116th, 8th, 22nd, 70th, 238th, 478th, 538th, 310th, 118th, and 10th, respectively; the 1st to 24th pattern elements composing the 19th row of the rectangular pattern are turned on 48th, 132nd, 324th, 552nd, 492nd, 252nd, 84th, 36th, 44th, 128th, 320th, 548th, 488th, 248th, 80th, 32nd, 46th, 130th, 322nd, 550th, 490th, 250th, 82nd, and 34th, respectively; the 1st to 24th pattern elements composing the 20th row of the rectangular pattern are turned on 96th, 192nd, 444th, 564th, 384th, 264th, 180th, 144th, 92nd, 188th, 440th, 560th, 380th, 260th, 176th, 140th, 94th, 190th, 442nd, 562nd, 382nd, 262nd, 178th, and 142nd, respectively; the 1st to 24th pattern elements composing the 21st row of the rectangular pattern are turned on 276th, 288th, 408th, 462nd, 510th, 396th, 456th, 336th, 272nd, 284th, 404th, 458th, 506th, 392nd, 452nd, 332nd, 274th, 286th, 406th, 460th, 508th, 394th, 454th, and 334th, respectively; the 1st to 24th pattern elements composing the 22nd row of the rectangular pattern are turned on 504th, 342nd, 198th, 210th, 294th, 414th, 354th, 576th, 500th, 338th, 194th, 206th, 290th, 410th, 350th, 572nd, 502nd, 340th, 196th, 208th, 292nd, 412th, 352nd, and 574th, respectively; the 1st to 24th pattern elements composing the 23rd row of the rectangular pattern are turned on 522nd, 426th, 150th, 54th, 102nd, 162nd, 222nd, 366th, 518th, 422nd, 146th, 50th, 98th, 158th, 218th, 362nd, 520th, 424th, 148th, 52nd, 100th, 160th, 220th, and 364th, respectively; and the 1st to 24th pattern elements composing the 24th row of the rectangular pattern are turned on 534th, 306th, 114th, 6th, 18th, 66th, 234th, 474th, 530th, 302nd, 110th, 2nd, 14th, 62nd, 230th, 470th, 532nd, 304th, 112th, 4th, 16th, 64th, 232nd, and 472nd, respectively.

32. The computer-readable medium according to claim 17, wherein said rectangular pattern is composed of 576 pattern elements arranged in a matrix of 24 rows×24 columns that are turned on in the following manner: the 1st to 24th pattern elements composing the first row of the rectangular pattern are turned on 495th, 315th, 123rd, 39th, 15th, 87th, 327th, 567th, 493rd, 313th, 121st, 37th, 13th, 85th, 325th, 565th, 497th, 317th, 125th, 41st, 17th, 89th, 329th, and 569th, respectively; the 1st to 24th pattern elements composing the second row of the rectangular pattern are turned on 459th, 375th, 207th, 135th, 63rd, 159th, 339th, 519th, 457th, 373rd, 205th, 133rd, 61st, 157th, 337th, 517th, 461st, 377th, 209th, 137th, 65th, 161st, 341st, and 521st, respectively; the 1st to 24th pattern elements composing the third row of the rectangular pattern are turned on 537th, 471st, 411th, 351st, 231st, 183rd, 255th, 393rd, 535th, 469th, 409th, 349th, 229th, 181st, 253rd, 391st, 539th, 473rd, 413th, 353rd, 233rd, 185th, 257th, and 395th, respectively; the 1st to 24th pattern elements composing the fourth row of the rectangular pattern are turned on 273rd, 405th, 441st, 543rd, 423rd, 249th, 177th, 225th, 271st, 403rd, 439th, 541st, 421st, 247th, 175th, 223rd, 275th, 407th, 443rd, 545th, 425th, 251st, 179th, and 227th, respectively; the 1st to 24th pattern elements composing the fifth row of the rectangular pattern are turned on 105th, 201st, 369th, 453rd, 513th, 285th, 153rd, 57th, 103rd, 199th, 367th, 451st, 511th, 283rd, 151st, 55th, 107th, 203rd, 371st, 455th, 515th, 287th, 155th, and 59th, respectively; the 1st to 24th pattern elements composing the sixth row of the rectangular pattern are turned on 33rd, 117th, 309th, 489th, 561st, 297th, 81st, 9th, 31st, 115th, 307th, 487th, 559th, 295th, 79th, 7th, 35th, 119th, 311th, 491st, 563rd, 299th, 83rd, and 11th, respectively; the 1st to 24th pattern elements composing the seventh row of the rectangular pattern are turned on 21st, 93rd, 333rd, 573rd, 501st, 321st, 129th, 45th, 19th, 91st, 331st, 571st, 499th, 319th, 127th, 43rd, 23rd, 95th, 335th, 575th, 503rd, 323rd, 131st, and 47th, respectively; the 1st to 24th pattern elements composing the eighth row of the rectangular pattern are turned on 69th, 165th, 345th, 525th, 465th, 381st, 213th, 141st, 67th, 163rd, 343rd, 523rd, 463rd, 379th, 211th, 139th, 71st, 167th, 347th, 527th, 467th, 383rd, 215th, and 143rd, respectively; the 1st to 24th pattern elements composing the ninth row of the rectangular pattern are turned on 237th, 189th, 261st, 387th, 531st, 477th, 417th, 357th, 235th, 187th, 259th, 385th, 529th, 475th, 415th, 355th, 239th, 191st, 263rd, 389th, 533rd, 479th, 419th, and 359th, respectively; the 1st to 24th pattern elements composing the 10th row of the rectangular pattern are turned on 429th, 243rd, 171st, 219th, 267th, 399th, 435th, 549th, 427th, 241st, 169th, 217th, 265th, 397th, 433rd, 547th, 431st, 245th, 173rd, 221st, 269th, 401st, 437th, and 551st, respectively; the 1st to 24th pattern elements composing the 11th row of the rectangular pattern are turned on 507th, 279th, 147th, 51st, 99th, 195th, 363rd, 447th, 505th, 277th, 145th, 49th, 97th, 193rd, 361st, 445th, 509th, 281st, 149th, 53rd, 101st, 197th, 365th, and 449th, respectively; the 1st to 24th pattern elements composing the twelfth row of the rectangular pattern are turned on 555th, 291st, 75th, 3rd, 27th, 111th, 303rd, 483rd, 553rd, 289th, 73rd, 1st, 25th, 109th, 301st, 481st, 557th, 293rd, 77th, 5th, 29th, 113th, 305th, and 485th, respectively; the 1st to 24th pattern elements composing the 13th row of the rectangular pattern are turned on 498th, 318th, 126th, 42nd, 18th, 90th, 330th, 570th, 494th, 314th, 122nd, 38th, 14th, 86th, 326th, 566th, 496th, 316th, 124th, 40th, 16th, 88th, 328th, and 568th, respectively; the 1st to 24th pattern elements composing the 14th row of the rectangular pattern are turned on 462nd, 378th, 210th, 138th, 66th, 162nd, 342nd, 522nd, 458th, 374th, 206th, 134th, 62nd, 158th, 338th, 518th, 460th, 376th, 208th, 136th, 64th, 160th, 340th, and 520th, respectively; the 1st to 24th pattern elements composing the 15th row of the rectangular pattern are turned on 540th, 474th, 414th, 354th, 234th, 186th, 258th, 396th, 536th, 470th, 410th, 350th, 230th, 182nd, 254th, 392nd, 538th, 472nd, 412th, 352nd, 232nd, 184th, 256th, and 394th, respectively; the 1st to 24th pattern elements composing the 16th row of the rectangular pattern are turned on 276th, 408th, 444th, 546th, 426th, 252nd, 180th, 228th, 272nd, 404th, 440th, 542nd, 422nd, 248th, 176th, 224th, 274th, 406th, 442nd, 544th, 424th, 250th, 178th, and 226th, respectively; the 1st to 24th pattern elements composing the 17th row of the rectangular pattern are turned on 108th, 204th, 372nd, 456th, 516th, 288th, 156th, 60th, 104th, 200th, 368th, 452nd, 512th, 284th, 152nd, 56th, 106th, 202nd, 370th, 454th, 514th, 286th, 154th, and 58th, respectively; the 1st to 24th pattern elements composing the 18th row of the rectangular pattern are turned on 36th, 120th, 312th, 492nd, 564th, 300th, 84th, 12th, 32nd, 116th, 308th, 488th, 560th, 296th, 80th, 8th, 34th, 118th, 310th, 490th, 562nd, 298th, 82nd, and 10th, respectively; the 1st to 24th pattern elements composing the 19th row of the rectangular pattern are turned on 24th, 96th, 336th, 576th, 504th, 324th, 132nd, 48th, 20th, 92nd, 332nd, 572nd, 500th, 320th, 128th, 44th, 22nd, 94th, 334th, 574th, 502nd, 322nd, 130th, and 46th, respectively; the 1st to 24th pattern elements composing the 20th row of the rectangular pattern are turned on 72nd, 168th, 348th, 528th, 468th, 384th, 216th, 144th, 68th, 164th, 344th, 524th, 464th, 380th, 212th, 140th, 70th, 166th, 346th, 526th, 466th, 382nd, 214th, and 142nd, respectively; the 1st to 24th pattern elements composing the 21st row of the rectangular pattern are turned on 240th, 192nd, 264th, 390th, 534th, 480th, 420th, 360th, 236th, 188th, 260th, 386th, 530th, 476th, 416th, 356th, 238th, 190th, 262nd, 388th, 532nd, 478th, 418th, and 358th, respectively; the 1st to 24th pattern elements composing the 22nd row of the rectangular pattern are turned on 432nd, 246th, 174th, 222nd, 270th, 402nd, 438th, 552nd, 428th, 242nd, 170th, 218th, 266th, 398th, 434th, 548th, 430th, 244th, 172nd, 220th, 268th, 400th, 436th, and 550th, respectively; the 1st to 24th pattern elements composing the 23rd row of the rectangular pattern are turned on 510th, 282nd, 150th, 54th, 102nd, 198th, 366th, 450th, 506th, 278th, 146th, 50th, 98th, 194th, 362nd, 446th, 508th, 280th, 148th, 52nd, 100th, 196th, 364th, and 448th, respectively; and the 1st to 24th pattern elements composing the 24th row of the rectangular pattern are turned on 558th, 294th, 78th, 6th, 30th, 114th, 306th, 486th, 554th, 290th, 74th, 2nd, 26th, 110th, 302nd, 482nd, 556th, 292nd, 76th, 4th, 28th, 112th, 304th, and 484th, respectively.

33. The computer-readable medium according to claim 17, wherein the order of turning-on set for an arbitrary pattern element in said rectangular pattern and that set for the pattern element disposed in a position diametrically symmetrical to said arbitrary pattern element with respect to the center of said rectangular pattern are substituted for each other.

34. The computer-readable medium according to claim 17, wherein said rectangular pattern for which the sequence of turning-on is set is angularly moved about the pattern center by 90°, clockwise or counterclockwise.

\* \* \* \* \*